(12) United States Patent
Kozuka et al.

(10) Patent No.: US 9,166,980 B2
(45) Date of Patent: Oct. 20, 2015

(54) CONTENT MANAGEMENT SYSTEM, MANAGEMENT SERVER, MEMORY MEDIA DEVICE AND CONTENT MANAGEMENT METHOD

(75) Inventors: Masayuki Kozuka, Osaka (JP); Toshihisa Nakano, Osaka (JP); Takahiro Yamaguchi, Osaka (JP); Motoji Ohmori, Osaka (JP); Kaoru Murase, Nara (JP); Masataka Minami, Tokyo (JP); Makoto Morise, Saratoga, CA (US)

(73) Assignee: PANASONIC CORPORATION, Osaka (JP)

( * ) Notice: Subject to any disclaimer, the term of this patent is extended or adjusted under 35 U.S.C. 154(b) by 162 days.

(21) Appl. No.: 13/994,960

(22) PCT Filed: Apr. 26, 2012

(86) PCT No.: PCT/JP2012/002892
§ 371 (c)(1),
(2), (4) Date: Jun. 17, 2013

(87) PCT Pub. No.: WO2012/153486
PCT Pub. Date: Nov. 15, 2012

(65) Prior Publication Data
US 2013/0283357 A1  Oct. 24, 2013

Related U.S. Application Data

(60) Provisional application No. 61/483,884, filed on May 9, 2011.

(51) Int. Cl.
*H04L 29/06* (2006.01)
*G06F 21/10* (2013.01)
*G11B 20/00* (2006.01)

(52) U.S. Cl.
CPC ............... *H04L 63/10* (2013.01); *G06F 21/10* (2013.01); *G11B 20/0021* (2013.01); *G11B 20/00862* (2013.01); *G11B 2220/2562* (2013.01)

(58) Field of Classification Search
None
See application file for complete search history.

(56) References Cited

U.S. PATENT DOCUMENTS 5,260,999 A 11/1993 Wyman
2002/0067371 A1* 6/2002 Wu ............................... 345/748
(Continued)

FOREIGN PATENT DOCUMENTS

JP  10-111856  4/1998
JP  2003-58660  2/2003
(Continued)

OTHER PUBLICATIONS

International Search Report issued Jun. 5, 2012 in International (PCT) Application No. PCT/JP2012/002892.
(Continued)

*Primary Examiner* — Michael R Vaughan
(74) *Attorney, Agent, or Firm* — Wenderoth, Lind & Ponack, L.L.P.

(57) ABSTRACT

A terminal device includes a transmission/reception unit that transmits, to a server device, information necessary for judgment as to whether to permit use of content. The server device includes a judgment unit that judges whether to permit the terminal device to use the content, based on terminal device management information set by a content provider, and the information necessary for the judgment and received from the terminal device. A notification data storage unit stores notifications to be presented to a user of the terminal device; and a transmission/reception unit transmits either information necessary for use of the content or one of the notifications according to a result of the judgment by the judgment unit.

16 Claims, 39 Drawing Sheets

(56) References Cited

U.S. PATENT DOCUMENTS

| | | |
|---|---|---|
| 2003/0061165 A1 | 3/2003 | Okamoto et al. |
| 2004/0088510 A1 | 5/2004 | Hori |
| 2004/0215568 A1* | 10/2004 | Fukushima et al. ............ 705/51 |
| 2005/0004875 A1* | 1/2005 | Kontio et al. ................... 705/52 |
| 2006/0277598 A1* | 12/2006 | Ahn ................................. 726/5 |
| 2007/0044159 A1* | 2/2007 | Ishiguro ......................... 726/27 |
| 2007/0083561 A1* | 4/2007 | Lai et al. ..................... 707/104.1 |
| 2007/0088945 A1* | 4/2007 | Ohmori et al. ................ 713/153 |
| 2007/0112676 A1* | 5/2007 | Kontio et al. ................... 705/50 |
| 2007/0283151 A1* | 12/2007 | Nakano et al. ................ 713/168 |
| 2008/0032668 A1 | 2/2008 | Alvarado et al. |
| 2008/0101604 A1* | 5/2008 | Kocher et al. ................. 380/210 |
| 2009/0024849 A1 | 1/2009 | Nakano et al. |
| 2009/0038007 A1 | 2/2009 | Ahn et al. |
| 2010/0115565 A1* | 5/2010 | Fujihira et al. ................. 725/91 |
| 2013/0145481 A1* | 6/2013 | Kozuka et al. ................. 726/27 |

FOREIGN PATENT DOCUMENTS

| | | |
|---|---|---|
| JP | 2007-519994 | 7/2007 |
| JP | 2008-304712 | 12/2008 |
| WO | 2005/121980 | 12/2005 |
| WO | 2008/154309 A1 | 12/2008 |

OTHER PUBLICATIONS

Partial Supplementary European Search Report issued Apr. 1, 2015, in European Application No. 12782999.2.

Extended European Search Report issued Aug. 4, 2015 in corresponding European Application No. 12782999.2.

\* cited by examiner

FIG. 6

Terminal device management information

| Content provider name | Terminal device ID | Type of notification data |
|---|---|---|
| Movie company A | 0x20···011 – 0x20···F20 | Type 1 |
| | 0x32···5B2 | |
| Movie company B | 0x20···011 – 0x20···F20 | Type 2 |
| ·· | ·· | ·· |

Content management information — 701

| Title | Content provider | Server connection requirement | Resolution | Window |
|---|---|---|---|---|
| PPP in QP | Movie company A | Necessary at all times | FHD | Video window |
| 1234 to BCG | Movie company B | Necessary once every three times | HD | Video window |
| XYZ | Movie company C | Not necessary | HD | Video window |
| UP | Movie company D | Necessary until MM/DD/YY | HD | Video window |
| XYZ-3 | Movie company C | Necessary at all times | HD | Early window |

FIG. 16A Terminal device management information — 1601

| Content provider name | Title | Terminal device ID | Type of notification data |
|---|---|---|---|
| Movie company A | 1234 | 0x20···011 – 0x20···F20 | Type 1 |
| | ABC | 0x20···011 – 0x20···F20 | Type 1 |
| | XYZ | 0x20···011 – 0x20···F20 | Type 1 |
| ... | | ... | ... |

FIG. 16B Content management information — 1602

| Title | Content provider | Server connection requirement | Resolution | Window |
|---|---|---|---|---|
| 1234 | Movie company A | Necessary at all times | FHD | Early window |
| ABC | Movie company A | Necessary once every three times | HD | Video window |
| XYZ | Movie company A | Not necessary | HD | Video window |
| ... | ... | | | ... |

FIG. 31

Content management information ⟋ 3101

| Title | Content provider | Server connection requirement | | Resolution | Window |
|---|---|---|---|---|---|
| | | Move | Playback | | |
| 1234 | Movie company A | Necessary | Necessary | FHD | Early window |
| ABC | Movie company A | Necessary | Not necessary | HD | Video window |
| T1 | Movie company B | Not necessary | Not necessary | HD | Video window |
| .. | .. | .. | .. | .. | .. |

FIG. 34

User management information

| User ID | Terminal device ID |
|---|---|
| User A 0x11⋯620 | 0x3A⋯5F2 |
| | 0xB2⋯892 |
| | 0x20⋯011 |
| ‥ | ‥ |

3401

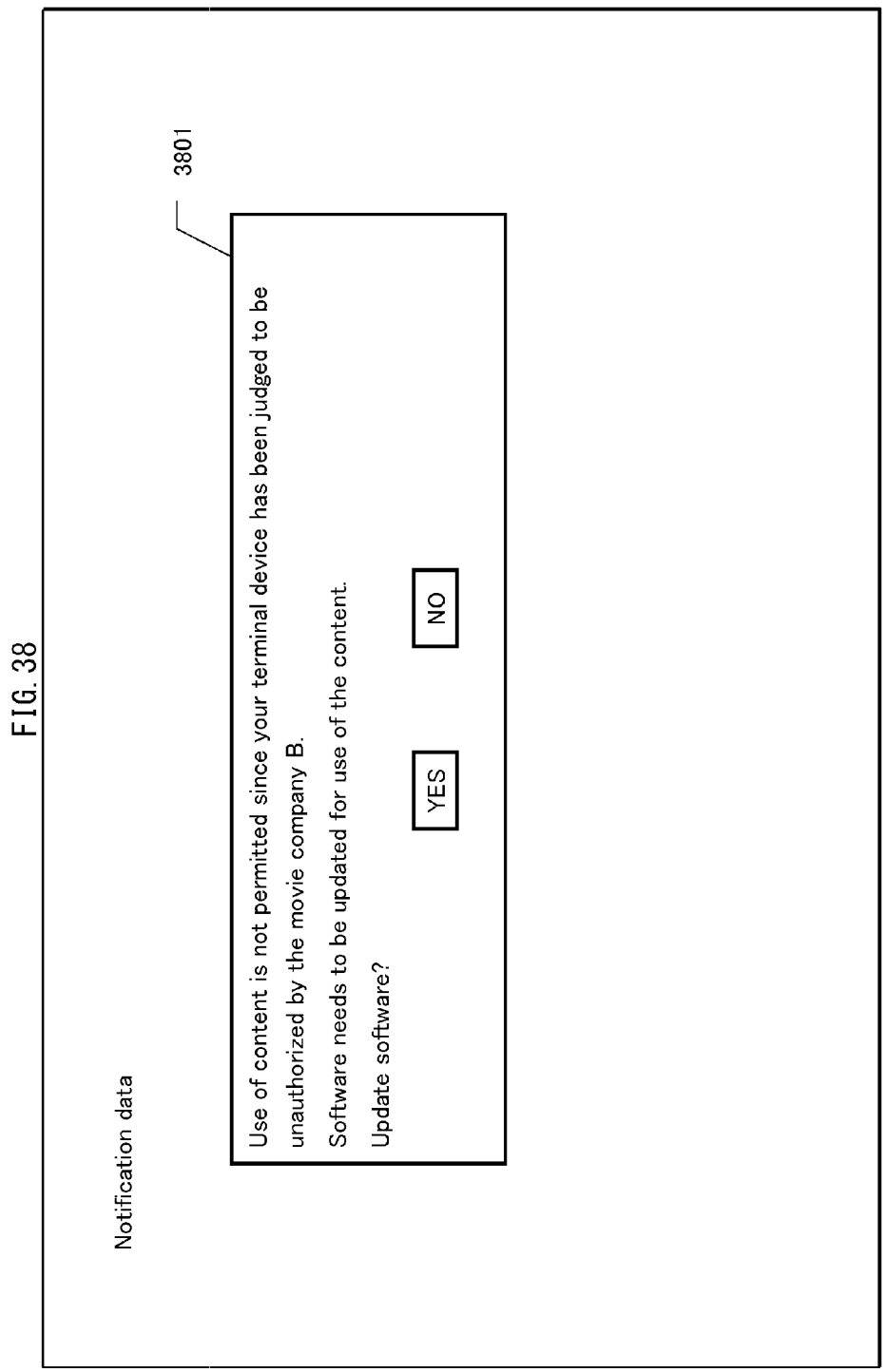

FIG. 39

| Title | Content provider | Server connection requirement | Acquisition method | Notification data display requirement | Playback permission | Resolution | Window |
|---|---|---|---|---|---|---|---|
| PPP in QP | Movie company A | Not necessary | Digital copy | Necessary | Not permitted | FHD | |
| 1234 | Movie company B | Not necessary | Digital copy | Necessary | Permitted | HD | Video window |
| XYZ | Movie company C | Not necessary | Distribution service V | Necessary | Permitted | HD | Video window |
| ABC | Movie company D | Not necessary | Distribution service N | Not necessary | Permitted | HD | Early window |

3901

CONTENT MANAGEMENT SYSTEM, MANAGEMENT SERVER, MEMORY MEDIA DEVICE AND CONTENT MANAGEMENT METHOD

This application claims benefit to the U.S. Provisional Application No. 61/483,884, filed May 9, 2011.

TECHNICAL FIELD

The present invention relates to a content management system, and in particular to a technology for controlling use of content in a terminal device communicable with a server.

BACKGROUND OF INVENTION

Background Art

Copying of data related to digital contents, such as movies, music, games, and electronic books, is relatively easy. As such, there is a risk that such contents are copied and used without authorization. In order to protect the rights of copyright holders, it is necessary to prevent the contents from being copied and used without authorization (hereinafter "unauthorized use of contents").

As an example of technology for preventing unauthorized use of contents, the following technology is known. That is, a terminal device for use of content includes a virtual machine. A recording medium stores thereon content and a detection program for detecting an unauthorized terminal device. When the content on the recording medium device is to be used in the terminal device, the detection program is executed in the virtual machine of the terminal device to judge whether the terminal device is unauthorized. When the terminal device is judged to be unauthorized, the use of the content is restricted (Patent Literature 1).

CITATION LIST

Patent Literature

[Patent Literature 1]
Japanese Patent Application Publication No. 2007-519994

SUMMARY OF INVENTION

According to the above technology, however, unauthorized use of content cannot be prevented if the detection program is hacked and deactivated. Also, the technology cannot prevent unauthorized use of content caused by the exposure of a decryption key used to decrypt encrypted content already distributed on the market. Content already distributed and on the market over a longer period of time has a higher risk of being used without authorization by hacking or the like. Accordingly, there is a demand for a content management system that allows a content provider to flexibly respond to various situations in which content is used without authorization, and that can prevent unauthorized use of content in a terminal device.

The present invention has been achieved in view of the above problems, and an aim thereof is to provide a content management system that can prevent unauthorized use of content in a terminal device by flexibly responding to various situations in which the content is used without authorization.

In order to solve the above problems, one aspect of the present invention is a content management system including: a recording medium for storing content; a terminal device for using the content; and a server for communicating with the terminal device and judging whether to permit use of the content, the server comprising: a notification storage unit storing notifications to be presented to a user of the terminal device; a usage permission judgment unit configured to receive, from the terminal device, (i) a request for permission to use the content and (ii) information necessary for judgment of whether to permit use of the content, and to judge whether to permit use of the content based on the request and the information; and a communication unit configured to transmit, to the terminal device, information necessary for use of the content when the usage permission judgment unit judges affirmatively, and to transmit, to the terminal device, a corresponding one of the notifications when the usage permission judgment unit judges negatively, the recording medium comprising a request unit configured to output, to the terminal device, the request and the information necessary for the judgment of whether to permit use of the content, and the terminal device comprising: a transmission/reception unit configured to transmit the request and the information necessary for the judgment to the server, and receive either the information necessary for use of the content or the notification from the server; and a presentation unit configured to present the notification.

According to the above aspect of the present invention, the server judges whether to permit use of content. This prevents unauthorized use of content in the terminal device by flexibly responding to various situations in which the content is used without authorization.

BRIEF DESCRIPTION OF DRAWINGS

FIG. 6 shows an example of terminal device management information 601.

FIG. 7 shows an example of content management information 701.

FIG. 16A shows an example of terminal device management information 1601, and FIG. 16B shows an example of content management information 1602.

FIG. 31 shows an example of content management information 3101.

FIG. 34 shows an example of user management information 3401.

FIG. 38 shows an example of notification data 3801.

FIG. 39 shows an example of control data 3901.

Figure 1:
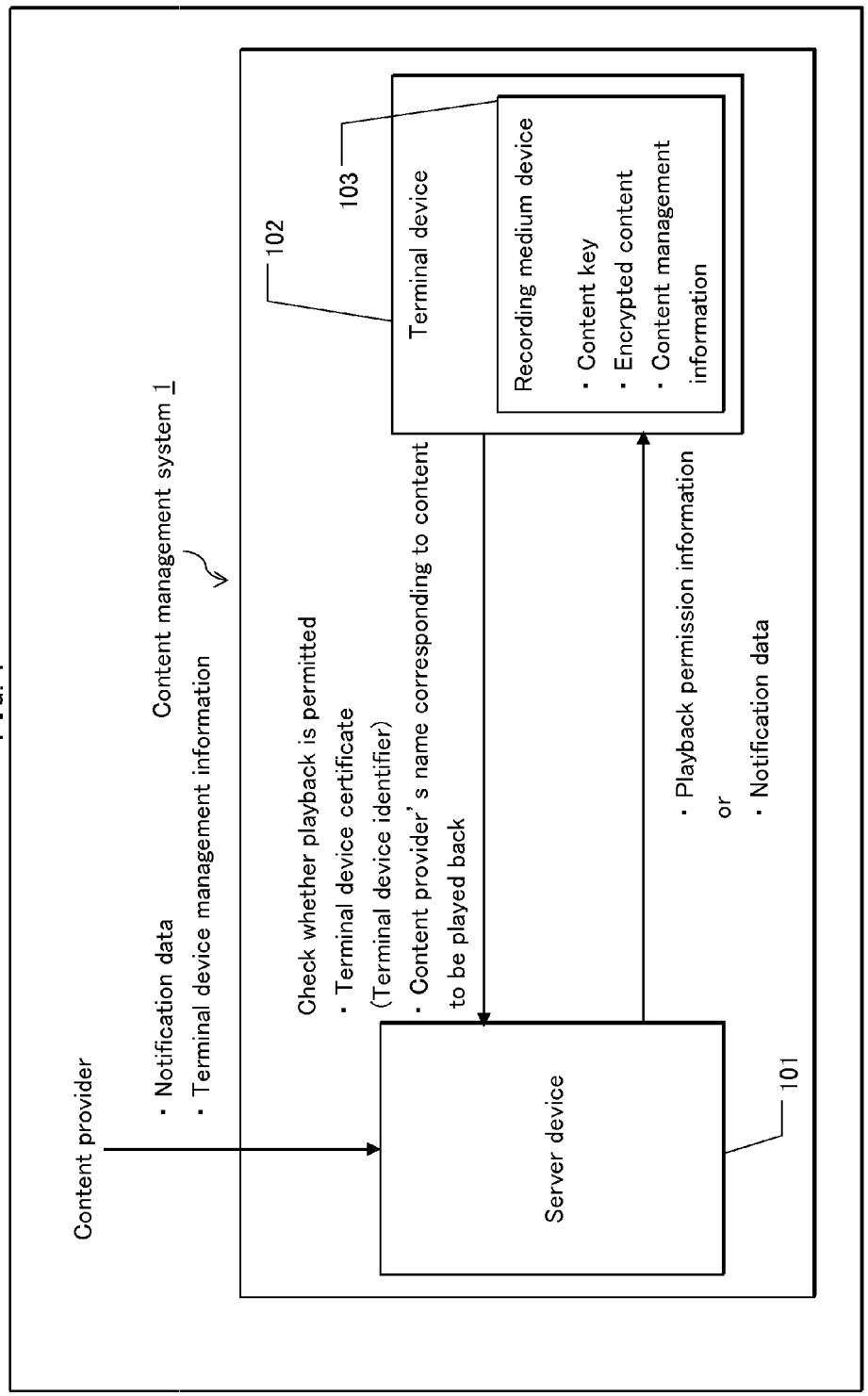
FIG. 1 schematically shows the structure of a content management system 1 according to Embodiment 1 of the present invention.

DETAILED DESCRIPTION OF INVENTION (Process by which an Aspect According to the Present Invention was Achieved)

According to conventional copyright protection technologies (e.g., Content Scrambling System (CSS) for DVD-Video discs, Advanced Access Content System (AACS) for Blu-ray Discs™, etc.), content is protected with use of a content key for encrypting the content, and a device key for encrypting the content key. If the content key or the device key is exposed, the exposed key may be used without authorization to decrypt the content. Also, if a malicious attacker uses the content key without authorization by, for example, avoiding a check function for a copyright protection implemented in a terminal device, the terminal device cannot prevent unauthorized use of the content. If content already distributed on the market is in a situation of being used without authorization as described above, it will be difficult for the provider of the content to prevent unauthorized use of the content.

Accordingly, the present inventors have conceived of a content management system that can prevent unauthorized use of content even if the content has already been on the market, and that does not require a terminal device to judge whether use of content is permitted.

This content management system includes a server. A provider of content can access the server as necessary, and set information used to judge whether to permit use of the content. This server receives a request for permission to use content from a terminal device, judges whether to permit use of the content, and transmits a result of the judgment to the terminal device. The terminal device can use the content only if the server permits use of the content.

The information used by the server to judge whether to permit use of the content can be flexibly set by the content provider. Examples of the information include: information indicating terminal devices not permitted to use the content; information indicating usage rights; and information indicating a period during which use of the content is permitted.

The terminal device cannot use the content if the server does not permit use of the content based on such information. The present inventors considered that it is also necessary to allow the content provider to flexibly set a notification for the user of the terminal device in case the server does not permit the terminal device to use the content. Accordingly, the present inventors have provided the terminal device with a function to present the user a notification according to a result of the judgment regarding whether to permit use of the content (e.g., the reason why use of the content is not permitted, troubleshooting tips, and so on).

The following describes embodiments pertaining to the present invention, with reference to the drawings.

Embodiment 1

1-1. Outline

In a content management system 1 according to Embodiment 1 of the present invention, there is a case where a terminal device attempts to play back encrypted content (e.g., a movie) stored in a recording medium device connected to the terminal device. In such a case, the recording medium device makes an inquiry via the terminal device to a server device, which is on a network such as the Internet, and checks whether playback of the content is permitted.

The server device judges whether playback of the content is permitted, based on (i) terminal device management information set by a content provider (e.g., a movie company), and (ii) information pertaining to the content, which is transmitted from the terminal device. When permitting the playback, the server device transmits, to the recording medium device, playback permission information indicating that playback is permitted. When not permitting the playback, the server device transmits notification data to the recording medium device.

When receiving the playback permission information from the server device, the recording medium device transmits the encrypted content and a content key stored in the recording medium device to the terminal device. The terminal device decrypts the encrypted content to obtain the content with use of the content key, and plays back the content. When playback of the content is not permitted and, as a result, the recording medium device receives the notification data from the server device, the recording medium device transmits the notification data to the terminal device. Upon receiving the notification data, the terminal device displays the notification data without playing back the content.

The terminal device management information indicates attributes of contents, and associates each attribute with a terminal device not permitted to play back the content having the attribute, and notification data to be transmitted to the terminal device when the server device does not permit the playback of the content.

These data pieces in the terminal device management information can be set by the content provider accessing the server device. For example, the content provider may set, as the notification data, contact information to be reached (e.g., information indicating the content provider) when playback of the content is not permitted. In this way, the user can clearly identify where to make an inquiry when playback of the content is not permitted.

The following describes the content management system 1 with reference to the drawings.

1-2. Structure

FIG. 1 schematically shows the structure of the content management system 1.

The content management system 1 includes a server device 101, a terminal device 102, and a recording medium device 103.

(Server Device 101)

Figure 2:
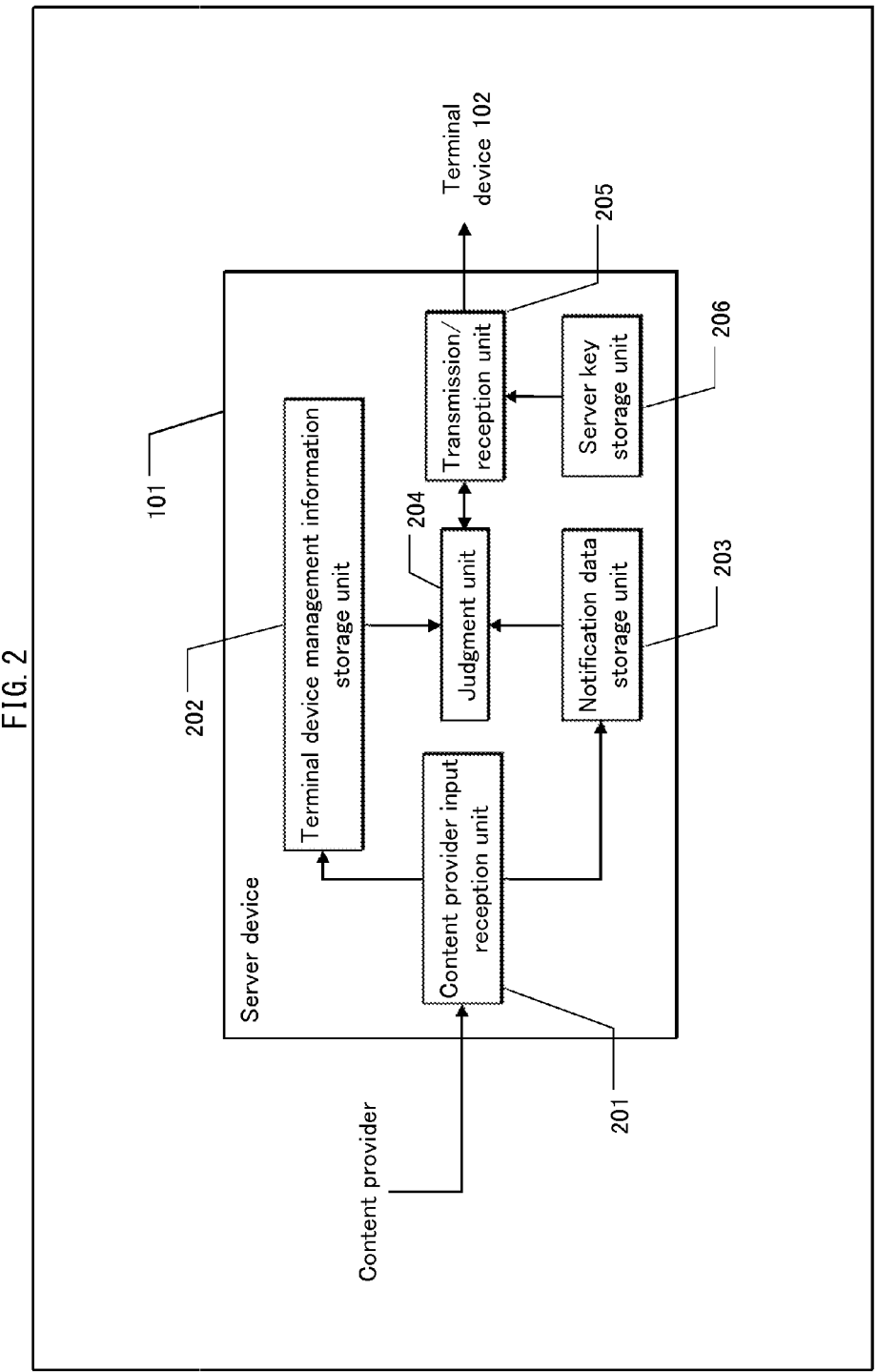
FIG. 2 is a functional block diagram showing the structure of a server device 101.

FIG. 2 shows the structure of functional blocks of the server device 101.

The server device 101 includes a content provider input reception unit 201, a terminal device management information storage unit 202, a notification data storage unit 203, a judgment unit 204, a transmission/reception unit 205, and a server key storage unit 206.

The server device 101 includes a processor, a RAM (Random Access Memory), a ROM (Read Only Memory), and a hard disk which are not illustrated. The functions of the judgment unit 204 and the transmission/reception unit 205 in the server device 101 are typically realized by an LSI (Large Scale Integration), which is an integrated circuit. Specifically, the LSI executes programs stored in a memory, thereby realizing the functions of the judgment unit 204 and the transmission/reception unit 205.

The content provider input reception unit 201 is an interface for receiving data provided by a content provider. The content provider input reception unit 201 receives notification data set by the content provider, and terminal device management information. The notification data and the terminal device management information thus received are then stored in the notification data storage unit 203 and the terminal device management information storage unit 202, respectively.

Figure 5:
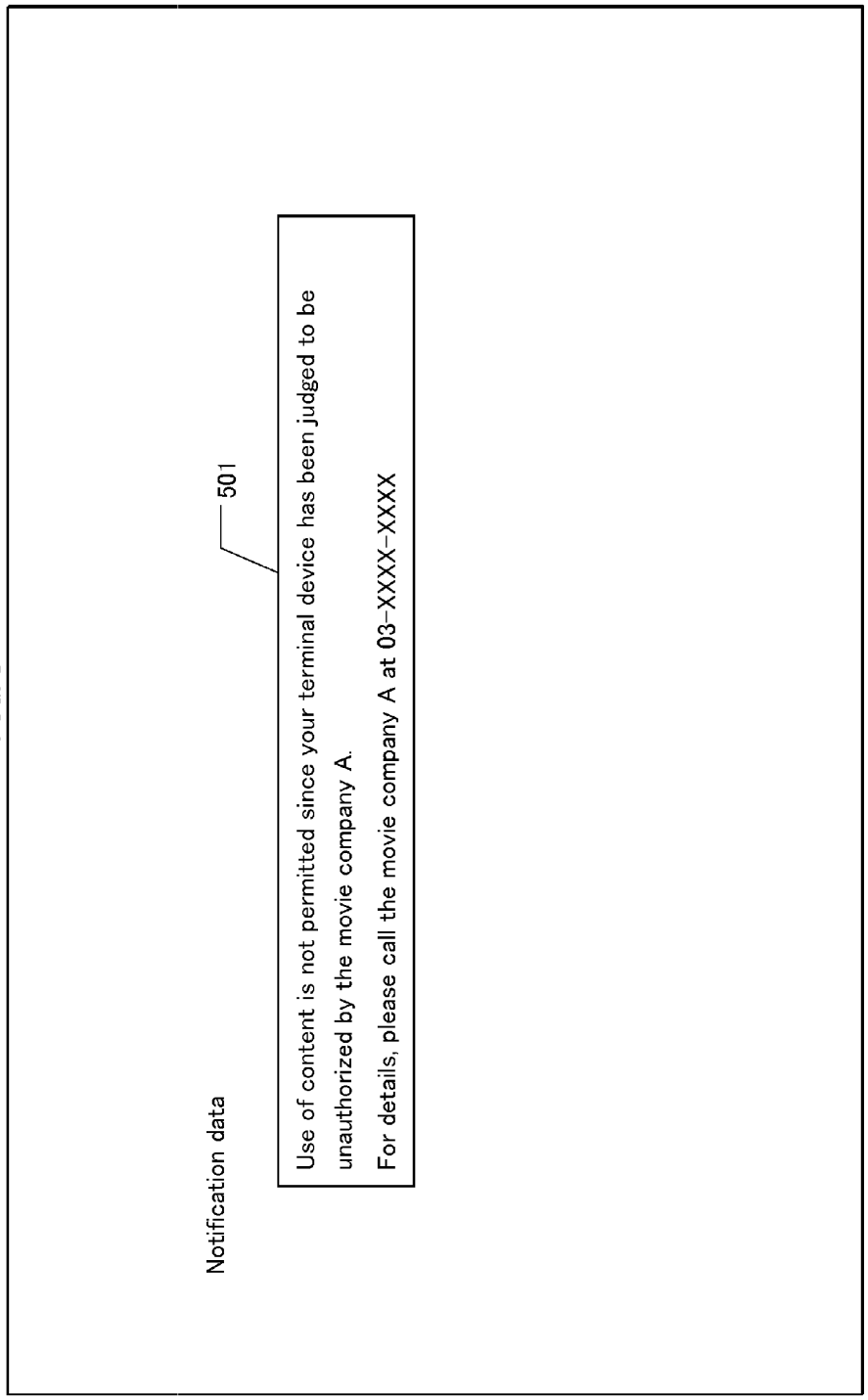
FIG. 5 shows an example of notification data 501.

The notification data storage unit 203 is a recording medium such as a non-volatile memory. FIG. 5 shows an example of notification data 501 stored in the notification data storage unit 203. The notification data 501 is notification data set by a movie company A, which is a content provider, through means of the content provider input reception unit 201. In this example, the notification data by the movie company A indicates the following message: "Use of content is not permitted since your terminal device has been judged to be unauthorized by the movie company A. For details, please call the movie company A at 03-XXXX-XXXX".

The terminal device management information storage unit 202 is a recording medium such as a non-volatile memory. FIG. 6 shows terminal device management information 601 stored in the terminal device management information storage unit 202. The terminal device management information 601 is a management table for managing the following information pieces in correspondence with each other: a content provider name; a terminal device identifier; and a type of notification data.

The content provider name is an item for identifying the provider of content (e.g., a movie company) which is to be used by a user. The terminal device identifier is an item for identifying a terminal device not permitted to use the content of the content provider. The type of notification data is an item for identifying notification data to be presented to the user when the content provider does not permit use of the corresponding content.

For example, as shown in FIG. 6, the terminal device management information stores the content provider name "movie company A"; the terminal device identifiers "0x20 . . . 011" to "0x20 . . . F20" each identifying a terminal device not permitted to play back the content of this content provider; and the type of notification data "type 1", which are in correspondence with each other. FIG. 5 shows an example of notification data of type 1.

The transmission/reception unit 205 includes an interface for exchanging data with the terminal device 102. The transmission/reception unit 205 receives, from the terminal device 102, a terminal device certificate that includes a terminal device identifier, and content provider information (e.g., content provider name), and transmits, to the judgment unit 204, the terminal device certificate and the content provider information, together with a request for permission to play back content. Then, based on a result of judgment by the judgment unit 204, the transmission/reception unit 205 transmits either playback permission information, which indicates that playback is permitted, or notification data to the terminal device 102. The transmission/reception unit 205 also performs mutual authentication processing with the terminal device 102 and key sharing processing to share a key with the terminal device 102, based on the information stored in the server key storage unit 206 which is described below. Functions of performing the mutual authentication processing and the key sharing processing are realized by the processor operating in accordance with the computer program stored on the RAM, the ROM, or the hard disk.

Upon receiving the terminal device certificate including the terminal device identifier and the content provider information (e.g., content provider name) from the transmission/reception unit 205, the judgment unit 204 compares the terminal device certificate and the content provider information with the terminal device management information 601, and judges whether to transmit playback permission information or notification data to the terminal device 102. Then, based on a result of judgment, the judgment unit 204 transmits either the playback permission information or the notification data 501 to the transmission/reception unit 205. For example, suppose that the judgment unit 204 receives a request for permission to play back the content of the movie company A, from the terminal device having the terminal device identifier "0x32 . . . 5B2". In this case, according to the terminal device management information 601, the terminal device having the terminal device identifier "0x32 . . . 5B2" is not permitted to play back the content of the movie company A. Accordingly, the judgment unit 204 judges that the terminal device is not permitted to play back the content, and transmits the notification data 501 to the terminal device. On the other hand, suppose that the judgment unit 204 receives a request for permission to play back the content of a movie company B, from the same terminal device, i.e., the device having the terminal device identifier "0x32 . . . 5B2". In this case, according to the terminal device management information 601, this terminal device is not listed as a terminal device not permitted to play back the content of the movie company B. Accordingly, the judgment unit 204 judges that the terminal device is permitted to play back the content, and transmits playback permission information. Functions of the judgment unit 204 are realized by the processor operating in accordance with the computer program stored on the RAM, the ROM, or the hard disk.

The server key storage unit 206 stores a key used by the server device 101 during the mutual authentication processing and the key sharing processing, which are performed in order to establish a secure communication channel when the server device 101 and the terminal device 102 exchange data. For example, the server key storage unit 206 stores a pair of (i) a server device certificate including an identifier that uniquely identifies the server device 101 and (ii) a private key corresponding to the server device certificate. The server device certificate and the private key are used for the server device 101 and the terminal device 102 to communicate securely with each other through a public key encryption scheme. The mutual authentication processing and the key sharing processing for establishing a secure communication channel between the server device 101 and the terminal device 102 can be performed with use of a well-known technology, such as ECDSA (Elliptic Curve Digital Signature Algorithm), ECDH (Elliptic curve Diffie-Hellman), or AES (Advanced Encryption Standard); therefore, descriptions thereof are omitted here.

(Terminal Device 102)

Figure 3:
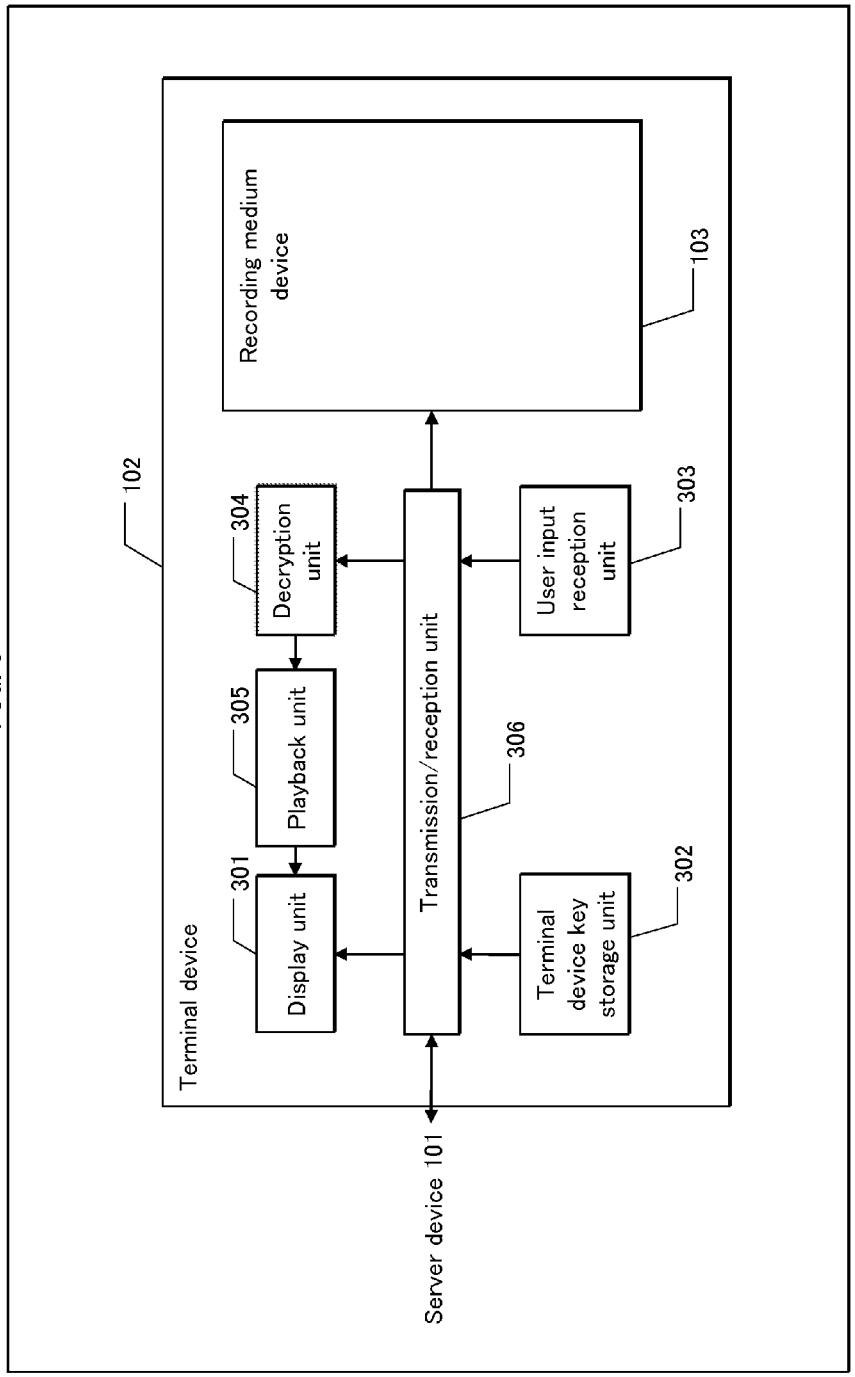
FIG. 3 is a functional block diagram showing the structure of a terminal device 102.

FIG. 3 shows the structure of functional blocks of the terminal device 102.

As shown in FIG. 3, the terminal device 102 includes a display unit 301, a terminal device key storage unit 302, a user input reception unit 303, a decryption unit 304, a playback unit 305, and a transmission/reception unit 306.

The terminal device 102 includes a processor, a RAM, a ROM, and a hard disk that are not illustrated.

In the terminal device 102, functions of the user input reception unit 303, the decryption unit 304, the playback unit 305, and the transmission/reception unit 306 are typically realized by LSIs that are integrated circuits.

The display unit 301 is a liquid crystal display (LCD), for example, and displays: a list of contents stored in the recording medium device 103; notification data received from the server device 101; and any of the contents.

Upon receiving the notification data 501 from the transmission/reception unit 205 of the server device 101, the terminal device 102 displays the notification data 501 on the display unit 301 without playing back content.

The user input reception unit 303 is an interface for receiving an instruction from a user. For example, the user input reception unit 303 receives an input of content specified by the user from a list of contents (not illustrated) stored in the recording medium device 103 and displayed on the display unit 301.

The transmission/reception unit 306 includes an interface for exchanging data with the server device 101 and the recording medium device 103. The transmission/reception unit 306 transmits, to the recording medium device 103, (i) the name of a content provider corresponding to the content specified by the user via the user input reception unit 303 and (ii) the terminal device certificate (including the terminal device identifier) stored in the terminal device key storage unit 302. Furthermore, the transmission/reception unit 306 transmits a request for playing back the content to the server device 101. When receiving playback permission information from the server device 101 in response to the request, the transmission/reception unit 306 outputs the playback permission information to the recording medium device 103, and receives encrypted content and a content key corresponding to the content from the recording medium device 103. Also, the transmission/reception unit 306 performs mutual authentication processing and key sharing processing. Functions of the transmission/reception unit 306 are realized by the processor operating in accordance with the computer program stored on the RAM, the ROM, or the hard disk.

The terminal device key storage unit 302 is a recording medium such as a non-volatile memory, and stores a key used by the terminal device 102 during the mutual authentication processing and the key sharing processing. The mutual authentication processing and the key sharing processing are performed in order to establish a secure communication channel when the terminal device 102 exchanges data with the server device 101 or the recording medium device 103. For example, in a case where a public key encryption scheme is used for authentication, the terminal key storage unit 302 stores a pair of (i) a terminal device certificate including an identifier that uniquely identifies the terminal device 102 and (ii) a private key corresponding to the terminal device certificate.

When the transmission/reception unit 306 receives the playback permission information from the server device 101, the decryption unit 304 decrypts the encrypted content received by the transmission/reception unit 306 from the recording medium device 103, with use of the content key also received by the transmission/reception unit 306 from the recording medium device 103.

The playback unit 305 performs playback processing for displaying the content decrypted by the decryption unit 304 on the display unit 301, and transmits data necessary for playback to the display unit 301.

Functions of the decryption unit 304 and the playback unit 305 are realized by the processor operating in accordance with the computer program stored on the RAM, the ROM, or the hard disk.

(Recording Medium Device 103)

Figure 4:
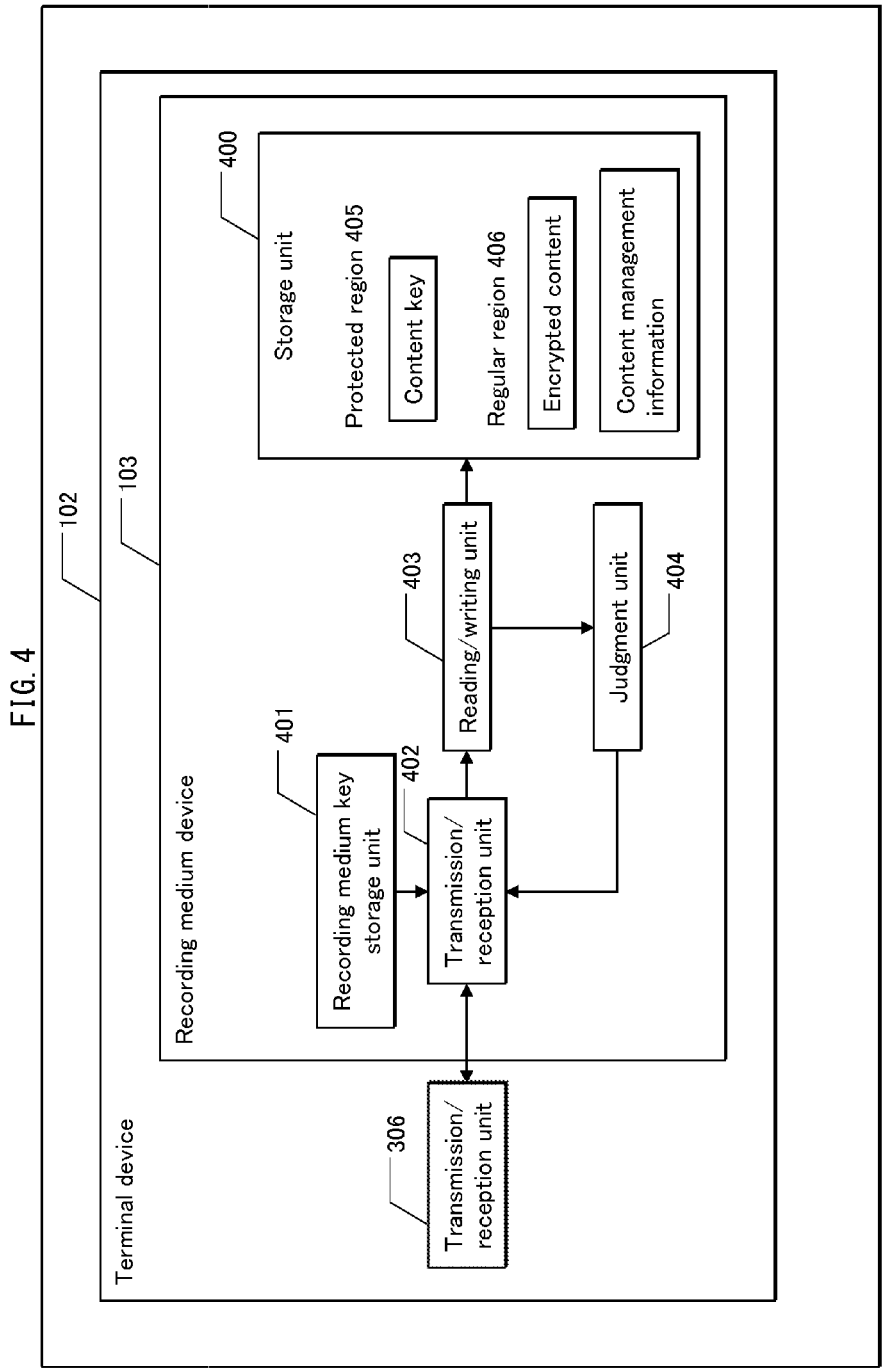
FIG. 4 is a functional block diagram showing the structure of a recording medium device 103.

As shown in FIG. 4, the recording medium device 103 includes a recording medium key storage unit 401, a transmission/reception unit 402, a reading/writing unit 403, a judgment unit 404, and a storage unit 400.

Specifically, the recording medium device 103 includes a processor, a RAM, a ROM, and a hard disk that are not illustrated.

In the recording medium device 103, functions of the transmission/reception unit 402, the reading/writing unit 403, and the judgment unit 404 are typically realized by LSIs that are integrated circuits.

The storage unit 400 is a recording medium such as a non-volatile memory (e.g., SD card) or a hard disk, and includes a protected region 405 and a regular region 406. The protected region 405 stores a content key, which can be read therefrom only by the terminal device 102 authenticated by the transmission/reception unit 402. The regular region 406 stores encrypted content and content management information.

FIG. 7 shows an example of the content management information stored in the regular region 406. Content management information 701 is a management table for managing the following information pieces in correspondence with each other: a title; a content provider name; a server connection requirement; resolution; and a window.

The title is an item for identifying the title of content. The content provider name is an item for identifying the provider of the content.

The content provider name is transmitted from the terminal device 102 to the server device 101, together with a request for playing back the content. The content provider name is used by the server device 101 to judge whether playback of the content is permitted.

The server connection requirement is an item for judging whether it is necessary to transmit a request for permission to play back the content to the server device, when the content is to be used. Specifically, the item "server connection requirement" is used when the judgment unit 404 in the recording medium device 103 judges whether to connect to the server device 101 in order to transmit the request for permission to play back the content. For example, if the server connection requirement indicates "necessary at all times", the judgment unit 404 judges that the recording medium device 103 needs to connect to the server device 101 at all times. If the server connection requirement indicates "necessary once every three times", the judgment unit 404 judges that every three times the content is used in the terminal device 102, the recording medium device 103 needs to connect to the server device 101.

For example, suppose that the user attempts to play back the content identified by the title "PPP in QP" in FIG. 7. In this case, since the item "server connection requirement" indicates "necessary at all times", the judgment unit 404 instructs the transmission/reception unit 402 to connect to the server device 101. Accordingly, the transmission/reception unit 402 connects to the server device 101, and transmits, to the server device 101, "movie company A", which is information in the item "content provider name".

The resolution is an item indicating information on the resolution of the content. The window is an item indicating a period during which the content is provided for the user. Note that content corresponding to "early window" under the item "window" is provided within a short period (e.g. approximately three months) from the theatrical closing to the distribution of the content with a medium, such as a DVD. Since such content has not yet been released in the market by means of a DVD or the like, there are only limited ways to acquire the content. In other words, early window contents are commercially valuable. On the other hand, content corresponding to "video window" under the item "window" indicates content other than early window content.

The recording medium key storage unit 401 is a recording medium such as a non-volatile memory. The recording medium key storage unit 401 stores a key used by the recording medium device 103 during the mutual authentication processing and the key sharing processing, which are performed in order to establish a secure communication channel when the recording medium device 103 and the terminal device 102 exchange data. For example, in a case where a public key encryption scheme is used for authentication, the recording medium key storage unit 401 stores a pair of (i) a recording medium device certificate including an identifier that uniquely identifies the recording medium device 103 and (ii) a private key corresponding to the recording medium device certificate.

The transmission/reception unit 402 includes an interface for exchanging data with the terminal device 102 and exchanging data with the transmission/reception unit 205 of the server device 101 via the transmission/reception unit 306 of the terminal device 102. The transmission/reception unit 402 receives a request for playback of content from the terminal device 102. Then, based on a result of judgment by the judgment unit 404, the transmission/reception unit 402 transmits encrypted content and a content key corresponding to the content to the terminal device 102. Also, the transmission/reception unit 402 transmits data received from the terminal device 102 to the server device 101, and receives either playback permission information or the notification data 501 from the server device 101. Furthermore, the transmission/reception unit 402 performs mutual authentication processing and key sharing processing, both being for exchanging encrypted data.

Functions of the transmission/reception unit 402 are realized by the processor operating in accordance with the computer program stored on the RAM, the ROM, or the hard disk.

The reading/writing unit 403 writes, into the storage unit 400, the content key, the encrypted content, and the content management information. Also, the reading/writing unit 403 reads, from the storage unit 400, the content key, the encrypted content, and the content management information.

The judgment unit 404 judges whether the connection to the server device 101 is necessary when the content is played back. This judgment is performed based on (i) the content management information read by the reading/writing unit 403 from the regular region 406 of the storage unit 400 and (ii) information that pertains to the content specified by the user and that is received by the transmission/reception unit 402.

Functions of the reading/writing unit 403 and the judgment unit 404 are realized by the processor operating in accordance with the computer program stored on the RAM, the ROM, or the hard disk.

When the judgment unit 404 judges that the connection to the server device 101 is necessary, the terminal device 102 connects to the server device 101, and transmits a terminal device identifier and information indicating a content provider, together with a request for permission for use of the content. When the judgment unit 404 judges that the connection to the server device 101 is not necessary, the transmission/reception unit 402 transmits the content key and the encrypted content stored in the storage unit 400 to the terminal device 102.

For example, when the user has selected playback of the content with the title "PPP in QP", the judgment unit 404 makes a judgment based on the content management information 701. Based on the content management information 701, the server connection requirement regarding the content with the title "PPP in QP" indicates "necessary at all times". Accordingly, the judgment unit 404 judges that the connection to the server device 101 is necessary. The transmission/reception unit 402 transmits this judgment result to the terminal device 102. Also, when the user has selected playback of the content with the title "XYZ", the judgment unit 404 judges that the connection to the server device 101 is not necessary. When the judgment unit 404 judges that the connection to the server device 101 is not necessary, the transmission/reception unit 402 transmits, to the terminal device 102, the content key and the encrypted content that each correspond to the title "XYZ" and that are stored in the storage unit 400.

1-3. Operations

Figure 8:
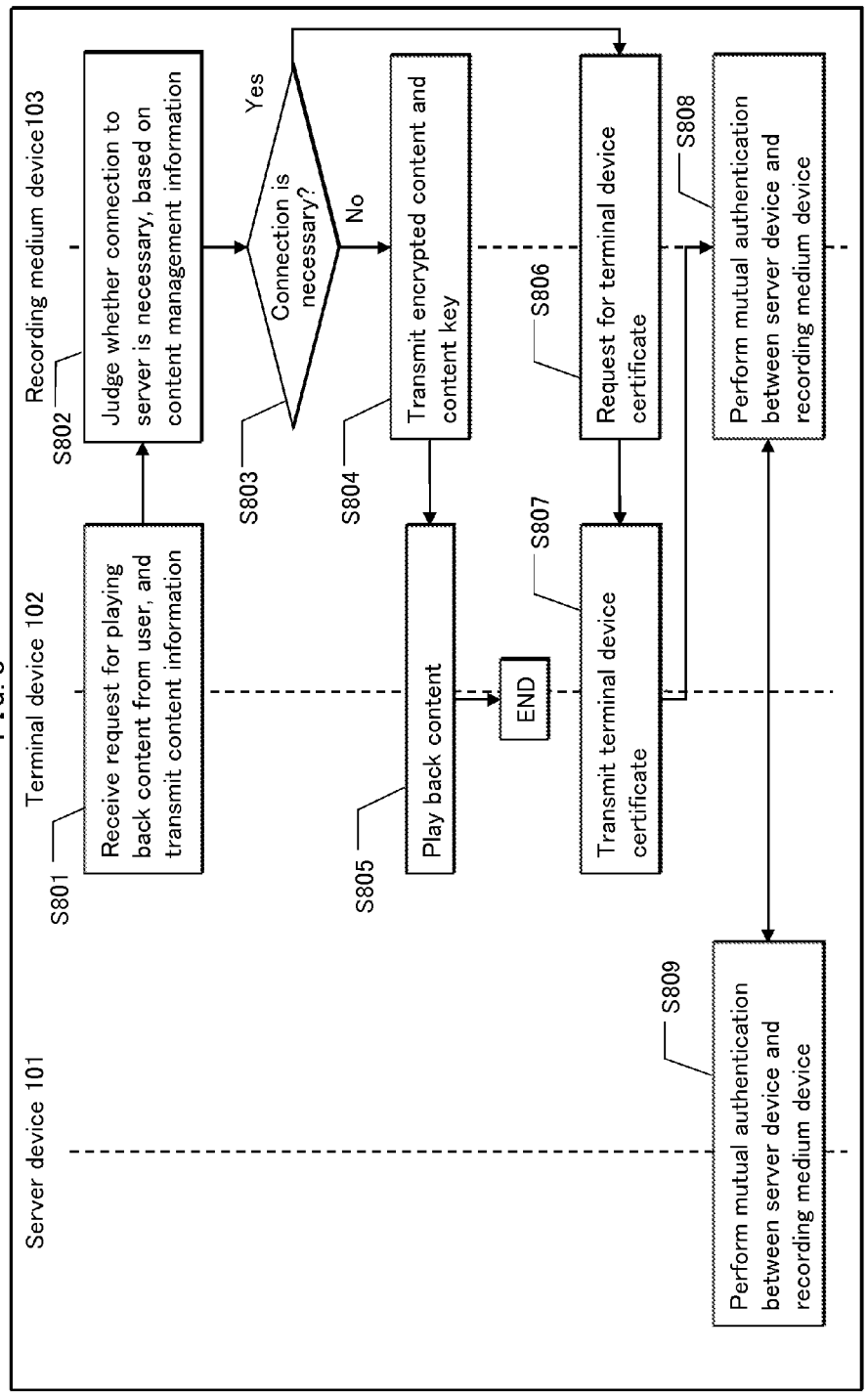
FIG. 8 is a flowchart showing operations at the time of playing back content according to Embodiment 1, and is continued to FIG. 9.
Figure 9:
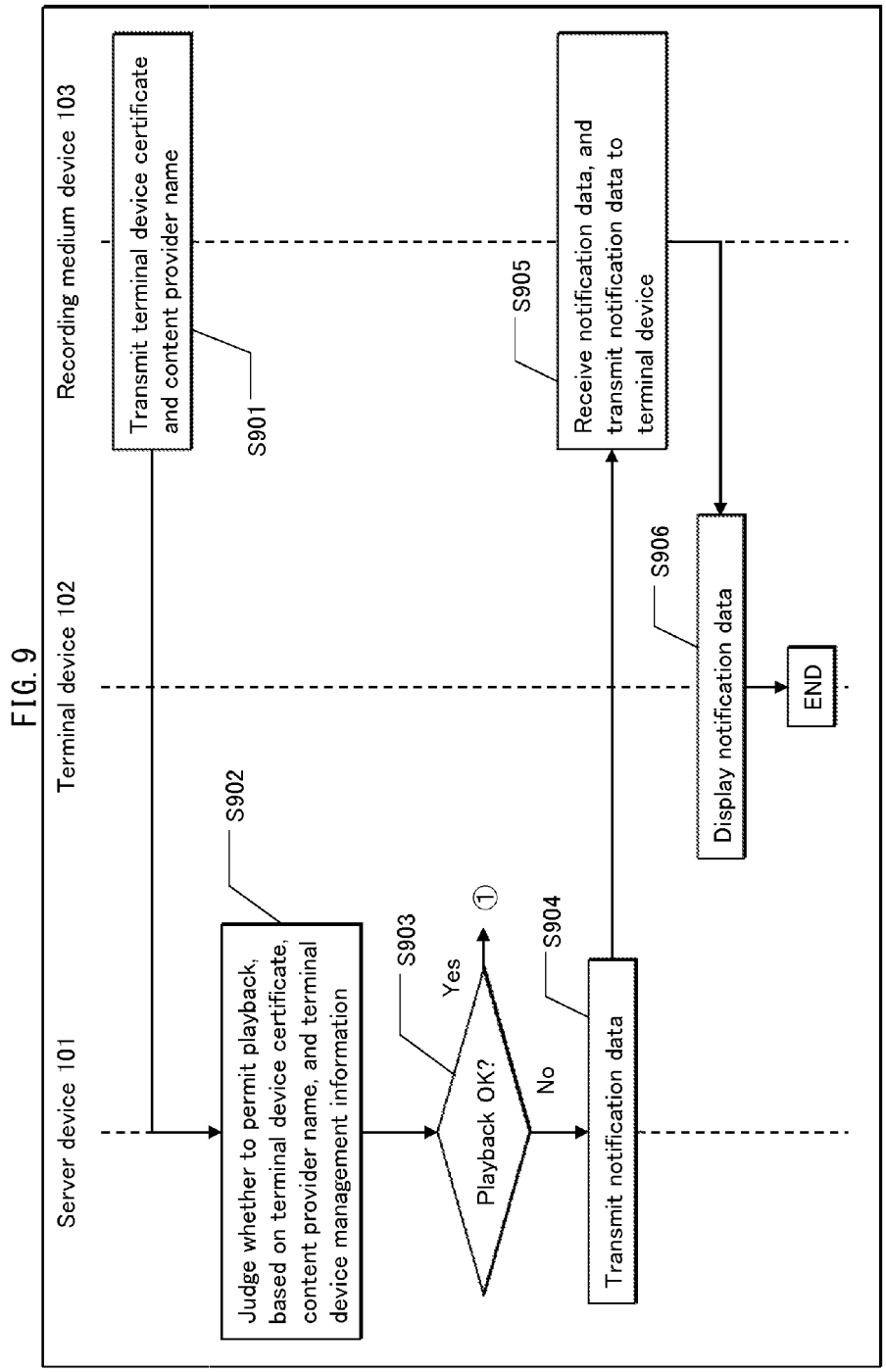
FIG. 9 is a flowchart showing operations at the time of playing back content according to Embodiment 1, and is continued from FIG. 8 and to FIG. 10.
Figure 10:
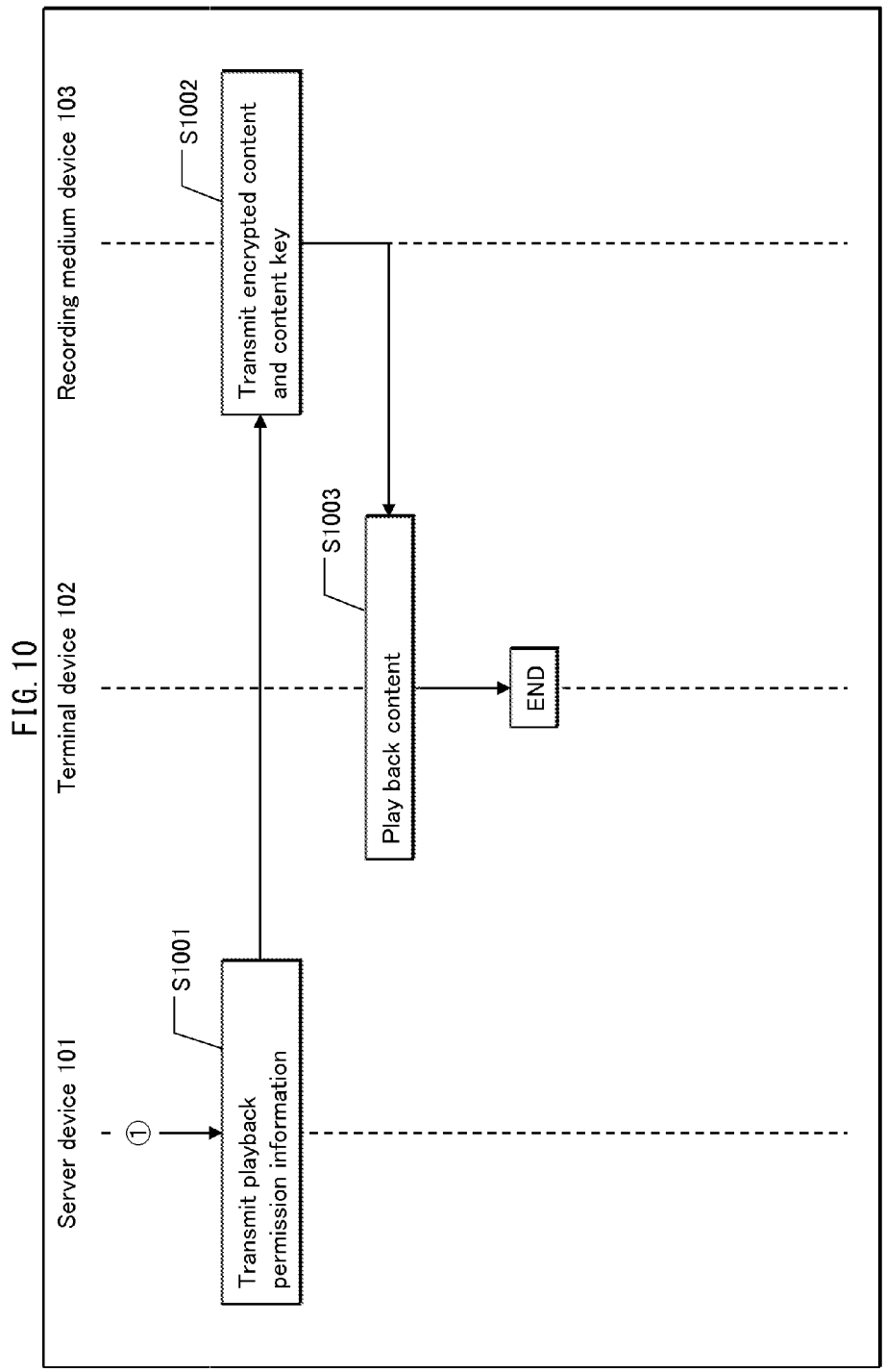
FIG. 10 is a flowchart showing operations at the time of playing back content according to Embodiment 1, and is continued from FIG. 9.

The following describes operations of the server device 101, the terminal device 102, and the recording medium device 103 when content is played back in the terminal device 102, with reference to the flowcharts of FIGS. 8 to 10.

First, the user input reception unit 303 of the terminal device 102 receives a request for playing back content from a user, and the transmission/reception unit 306 transmits information indicating the content corresponding to the request to the recording medium device 103 (step S801). Specifically, for example, the display unit 301 of the terminal device 102 displays a list of the titles of the contents stored in the recording medium device 103. The user selects the title of the content to be played back from the list. The user input reception unit 303 acquires the title selected by the user, and transmits the title to the recording medium device 103.

Upon receiving the request for playing back the content, the judgment unit 404 of the recording medium device 103 judges whether the connection to the server device 101 is necessary, based on the content management information 701 stored in the regular region 406 of the storage unit 400 (step S802). Specifically, the judgment unit 404 judges whether the connection to the server device 101 is necessary, based on the information under the item "server connection requirement", in the content management information 701, corresponding to the title of the content selected by the user. For example, if the information that is under the item "server connection requirement" and that corresponds to the title of the content selected by the user indicates that the connection is necessary, the judgment unit 404 judges that the connection to the server device 101 is necessary.

When the judgment unit 404 judges that the connection to the server device 101 is not necessary (step S803: No), the recording medium device 103 reads the content key stored in the protected region 405 of the storage unit 400, and the encrypted content stored in the regular region 406 of the storage unit 400, and transmits the content key and the encrypted content to the terminal device 102 via the transmission/reception unit 402 (step S804).

When the terminal device 102 receives the content key and the encrypted content, the decryption unit 304 of the terminal device 102 decrypts the encrypted content with use of the content key, and transmits the content thus decrypted to the playback unit 305. The playback unit 305 performs processing so as to enable the display unit 301 to display the content thus decrypted, and transmits the content to the display unit 301. The display unit 301 displays the content transmitted from the playback unit 305 (step S805).

On the other hand, when the judgment unit 404 judges that the connection to the server device 101 is necessary (step S803: Yes), the transmission/reception unit 402 of the recording medium device 103 transmits a request for a terminal device certificate to the terminal device 102 (step S806).

When the terminal device 102 receives the request for the terminal device certificate, the transmission/reception unit 306 of the terminal device 102 transmits the terminal device certificate to the transmission/reception unit 402 of the recording medium device 103 (step S807).

The transmission/reception unit 402 of the recording medium device 103 and the transmission/reception unit 205 of the server device 101 perform mutual authentication processing and key sharing processing for establishing a secure communication channel (steps S808 and S809).

When the secure communication channel is established between the recording medium device 103 and the server device 101, the transmission/reception unit 402 of the recording medium device 103 transmits, to the server device 101, the terminal device certificate and the provider name of the content selected by the user for playback (step S901).

When the server device 101 receives the terminal device certificate and the provider name from the recording medium device 103, the judgment unit 204 of the server device 101 judges whether to permit the terminal device 102 to play back the content, based on the terminal device certificate, the content provider name, and the terminal device management information 601 stored in the terminal device management information storage unit 202 (step S902). Specifically, the judgment unit 204 compares the terminal device identifier included in the terminal device certificate to the terminal device identifiers that are under the item "terminal device identifier" in the terminal device management information 601 and that correspond to the content provider name. If there is a match, the judgment unit 204 does not permit playback. If there is no match, the judgment unit 204 permits playback.

When not permitting playback (step S903: No), the judgment unit 204 reads, from the notification data storage unit 203, notification data that is indicated under the item "type of notification data" in the terminal device management information 601 and that corresponds to the content provider name. The transmission/reception unit 205 transmits the notification data read by the judgment unit 204 to the terminal device 102 (step S904).

When the recording medium device 103 receives the notification data, the transmission/reception unit 402 of the recording medium device 103 transmits the notification data to the transmission/reception unit 306 of the terminal device 102 (step S905).

The transmission/reception unit 306 transmits the notification data to the display unit 301, and the display unit 301 receives and displays the notification data (step S906).

On the other hand, when the judgment unit 204 permits playback (step S903: Yes), the judgment unit 204 generates playback permission information indicating that playback of the content is permitted, and transmits the playback permission information to the transmission/reception unit 205. The transmission/reception unit 205 transmits the playback permission information to the transmission/reception unit 402 of the recording medium device 103 (step S1001).

Upon receiving the playback permission information, the transmission/reception unit 402 of the recording medium device 103 transmits, to the transmission/reception unit 306 of the terminal device 102, the content key and the encrypted content that are stored in the storage unit 400 of the recording medium device 103 and that correspond to the content selected by the user for playback (step S1002).

Upon receiving the content key and the encrypted content, the terminal device 102 performs the same processing as in step S805 so as to play back content obtained by decryption of the encrypted content (step S1003).

1-4 Summary

In the content management system according to Embodiment 1, the above processing is performed when the terminal device attempts to play back the encrypted content in the recording medium device connected to the terminal device. In this processing, the terminal device makes an inquiry to the server device as to whether playback of the content is permitted. The terminal device cannot play back the content without permission by the server device. The server device judges whether to permit playback of the content, based on the terminal device management information that is set by the content provider and indicates a terminal device not permitted to play back the content. If not permitting playback of the content, the server device transmits the notification data to the terminal device.

The content provider can set, for each of his contents, an identifier identifying a terminal device not permitted to play back the content. In addition, in case of not permitting playback, the content provider can set a type of notification data for each of the attributes of the contents. In this way, when the terminal device is not permitted to play back content, the terminal device can display notification data that corresponds to the content and that has been set to the server device by the content provider.

Embodiment 2

2-1. Outline

A content management system according to Embodiment 2 is similar to the content management system 1 according to Embodiment 1 but differs therefrom with respect to the following point. That is, in the content management system 1, the server device 101 and the recording medium device 103 establish a secure communication channel to exchange data. In the content management system according to Embodiment 2, however, the server device 101 and the terminal device 102 establish a secure communication channel to exchange data.

The following describes only the difference between the content management system according to Embodiment 2 and the content management system 1 according to Embodiment 1.

2-2. Structure

In Embodiment 2, the transmission/reception unit 402 of the terminal device 102 and the transmission/reception unit 205 of the server device 101 establish a secure communication channel to exchange data. This differs from the structure in Embodiment 1 in which the transmission/reception unit 402 of the recording medium device 103 and the transmission/reception unit 205 of the server device 101 establish a secure communication channel to exchange data.

2-3. Operations

Figure 11:
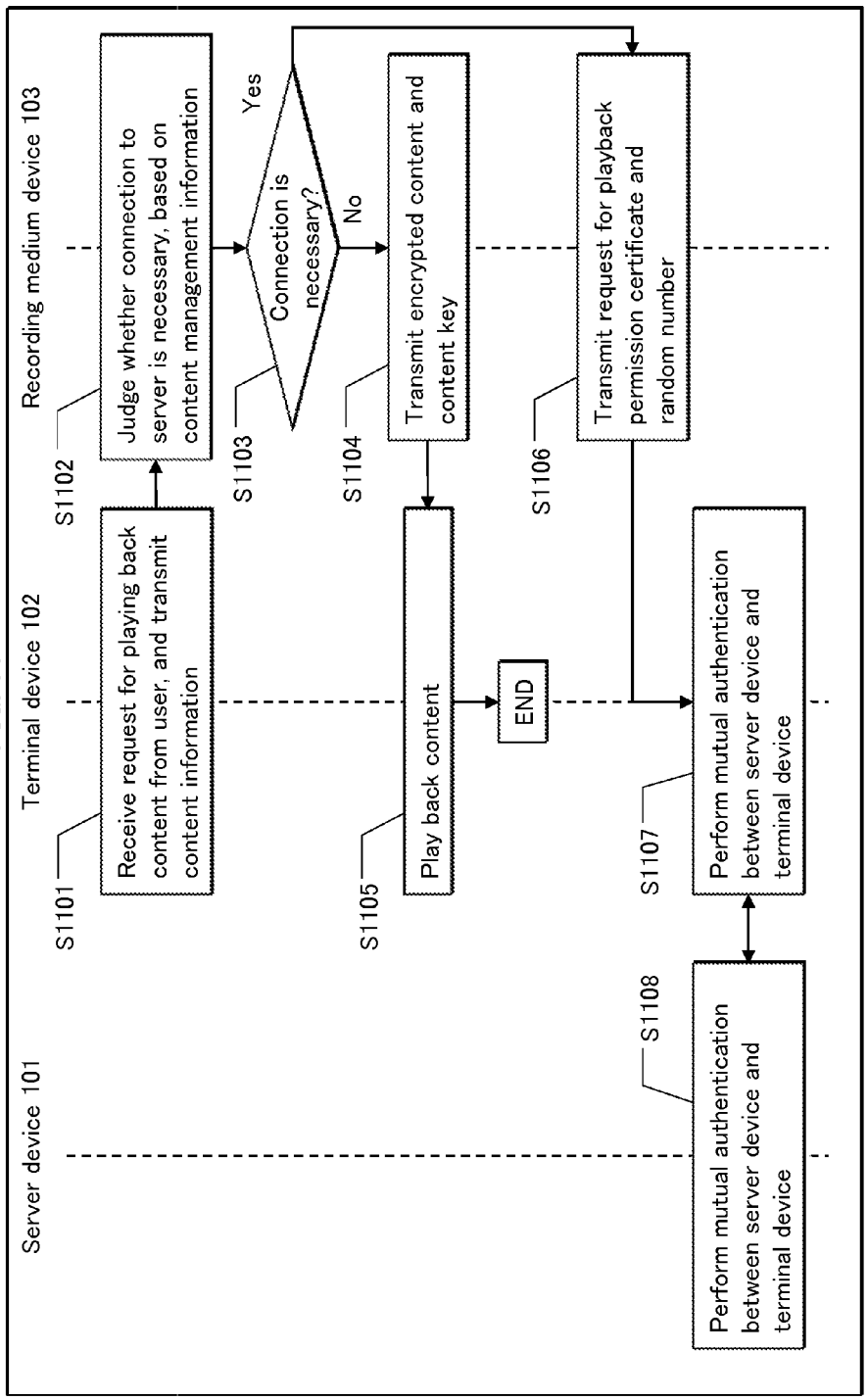
FIG. 11 is a flowchart showing operations at the time of playing back content according to Embodiment 2, and is continued to FIG. 12.
Figure 12:
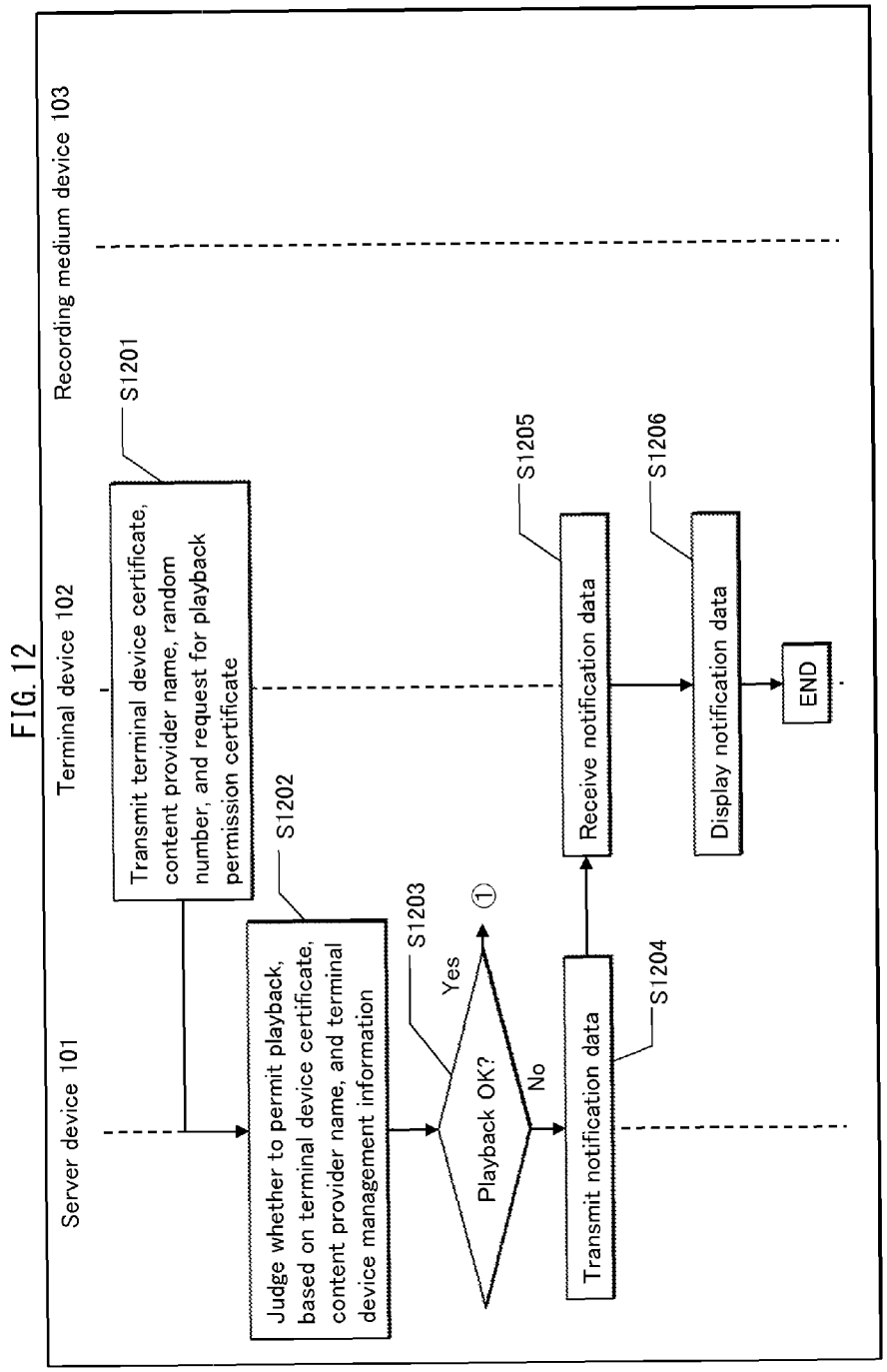
FIG. 12 is a flowchart showing operations at the time of playing back content according to Embodiment 2, and is continued from FIG. 11 and to FIG. 13.
Figure 13:
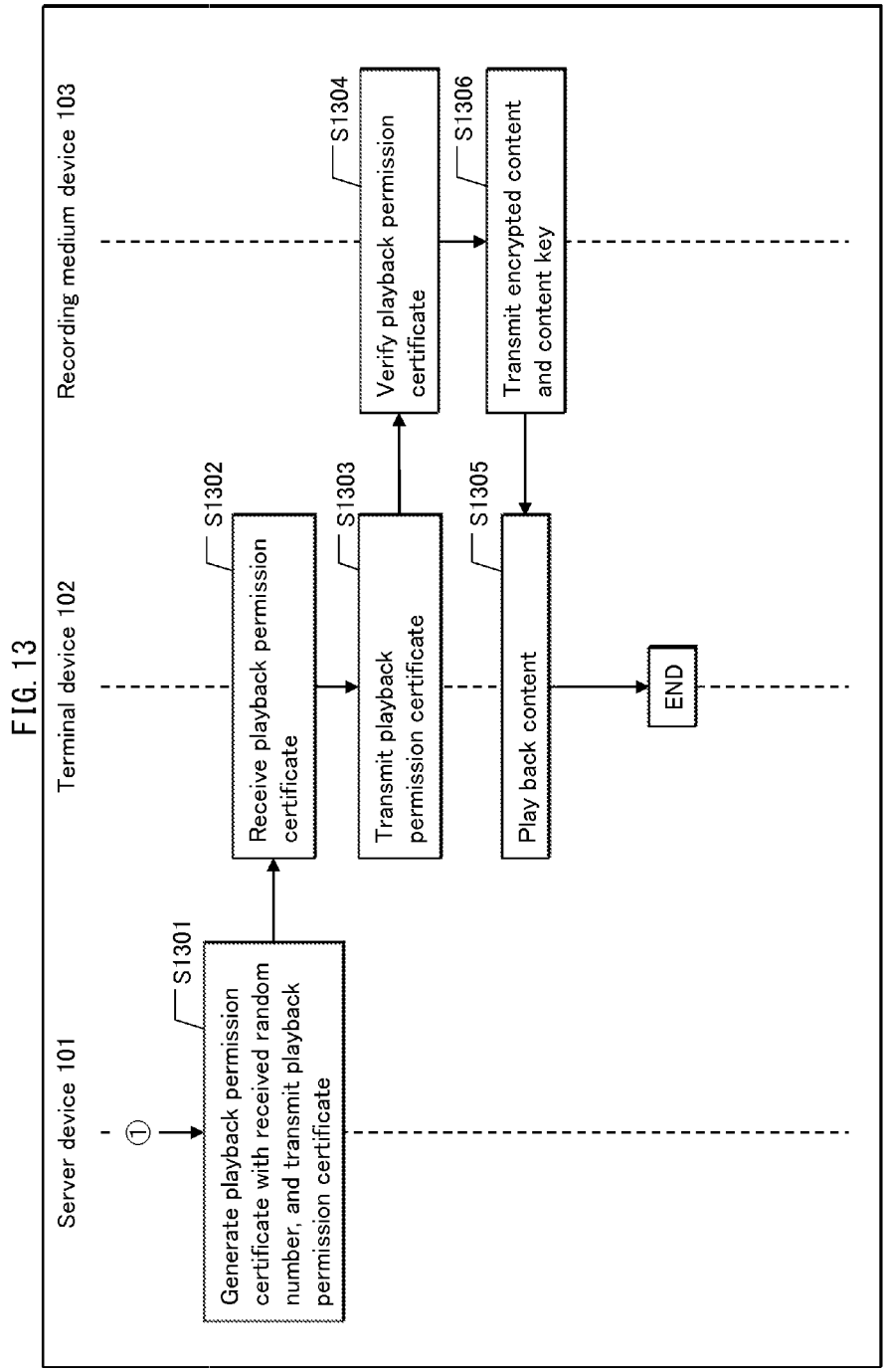
FIG. 13 is a flowchart showing operations at the time of playing back content according to Embodiment 2, and is continued from FIG. 12.

The following describes operations of the server device 101, the terminal device 102, and the recording medium device 103 when content is played back in the terminal device 102, with reference to the flowcharts of FIGS. 11 to 13.

First, the user input reception unit 303 of the terminal device 102 receives an instruction for playing back content from a user, and the transmission/reception unit 306 transmits information about the content corresponding to the instruction to the recording medium device 103 (step S1101). Specifically, for example, the display unit 301 of the terminal device 102 displays a list of contents stored in the recording medium device 103. The user selects the content to be played back from the list. The user input reception unit 303 acquires the title of the content thus selected, and transmits the title to the recording medium device 103.

Upon receiving the request for playing back the content, the judgment unit 404 of the recording medium device 103 judges whether the connection to the server device 101 is necessary, based on the content management information 701 stored in the regular region 406 of the storage unit 400 (step S1102). Specifically, the judgment unit 404 judges whether the connection to the server device 101 is necessary, based on the information under the item "server connection requirement", in the content management information 701, corresponding to the title of the content selected by the user. For example, if the item "server connection requirement" corresponding to the title of the content selected by the user indicates "necessary at all times", the judgment unit 404 judges that the connection to the server device 101 is necessary.

When the judgment unit 404 judges that the connection to the server device 101 is not necessary (step S1103: No), the recording medium device 103 reads the content key stored in the protected region 405 of the storage unit 400, and the encrypted content stored in the regular region 406 of the storage unit 400, and transmits the content key and the encrypted content to the terminal device 102 via the transmission/reception unit 402 (step S1104).

When the terminal device 102 receives the content key and the encrypted content, the decryption unit 304 of the terminal device 102 decrypts the encrypted content with use of the content key, and transmits the content thus decrypted to the playback unit 305. The playback unit 305 performs processing so as to enable the display unit 301 to display the content thus decrypted, and transmits the content to the display unit 301. The display unit 301 displays the content transmitted from the playback unit 305 (step S1105).

On the other hand, when the judgment unit 404 judges that the connection to the server device 101 is necessary (step S1103: Yes), the transmission/reception unit 402 of the recording medium device 103 transmits a random number and a request for a playback permission certificate to the terminal device 102 (step S1106). Note that the playback permission certificate is a data set obtained through the following process. First, the recording medium device 103 transmits the random number to the terminal device 102. The terminal device 102 then transmits the random number to the server device 101. Upon receiving the random number, the server device 101 provides a signature for the random number. The data set obtained by this process consists of the random number, the signature provided thereto, and a server device certificate used to verify the signature.

The transmission/reception unit 306 of the terminal device 102 and the transmission/reception unit 205 of the server device 101 perform mutual authentication processing and key sharing processing for establishing a secure communication channel (steps S1107 and S1108).

When the secure communication channel is established between the terminal device 102 and the server device 101, the transmission/reception unit 306 of the terminal device 102 transmits, to the server device 101, the terminal device certificate, the provider name of the content selected by the user for playback, and the random number received from the recording medium device 103 (step S1201).

When the server device 101 receives the terminal device certificate, the provider name, and the random number from the terminal device 102, the judgment unit 204 of the server device 101 judges whether to permit the terminal device 102 to play back the content, based on the terminal device certificate, the content provider name, and the terminal device management information 601 stored in the terminal device management information storage unit 202 (step S1202). Specifically, the judgment unit 204 compares the terminal device identifier included in the terminal device certificate to the terminal device identifiers that are under the item "terminal device identifier" in the terminal device management information 601 and that correspond to the content provider name. If there is a match, the judgment unit 204 does not permit playback. If there is no match, the judgment unit 204 permits playback.

When not permitting playback (step S1203: No), the judgment unit 204 reads, from the notification data storage unit 203, notification data that is indicated under the item "type of notification data" in the terminal device management information 601 and that corresponds to the content provider name. The transmission/reception unit 205 transmits the notification data read by the judgment unit 204 to the terminal device 102 (step S1204).

The transmission/reception unit 306 of the terminal device 102 receives the notification data from the transmission/reception unit 205 (step S1205), and transmits the notification data to the display unit 301. The display unit 301 receives and displays the notification data (step S1206).

On the other hand, when the judgment unit 204 permits playback (step S1203: Yes), the judgment unit 204 generates the playback permission certificate with use of the received random number. The transmission/reception unit 205 transmits the playback permission certificate thus generated to the terminal device 102 (step S1301).

The transmission/reception unit 306 of the terminal device 102 receives the playback permission certificate (step S1302), and transmits the playback permission certificate to the recording medium device 103 (step S1303).

The transmission/reception unit 402 of the recording medium device 103 verifies the authenticity of the signature in the playback permission certificate (step S1304). If, as a result of the verification, the transmission/reception unit 402 does not detect any tampering on the random number transmitted from the recording medium device 103, the transmission/reception unit 402 transmits the encrypted content and the content key stored in the storage unit 400 to the terminal device 102 (step S1305).

Upon receiving the content key and the encrypted content, the terminal device 102 performs the same processing as in step S1105 so as to play back content obtained by decryption of the encrypted content (step S1306).

2-4 Summary

With the above processing, the server device 101 and the terminal device 102 exchange data in the content management system according to Embodiment 2. Accordingly, the terminal device 102 and the recording medium device 103 exchange data only when the terminal device 102 acquires a list of contents used by the user to select content and when the terminal device 102 acquires the encrypted content and the content key. This reduces the amount of processing for exchanging data between the terminal device 102 and the recording medium device 103, as compared to the content management system according to Embodiment 1.

Embodiment 3

3-1. Outline

In a content management system 2 according to Embodiment 3, a server device stores content. When a recording medium device makes an inquiry regarding the content to the server device, the server device judges whether to permit storing of the content into the recording medium device. According to Embodiment 1, data pertaining to the content used by the terminal device, such as the encrypted content and the content key, are stored in the recording medium device. However, according to Embodiment 3, such data is not stored in the recording medium device. In the content management system 2, the server device receives a request for permission to store the content from the terminal device. When granting the request, the server device transmits data including the encrypted content and the content key to the recording medium device via the terminal device, and the recording medium device stores the data. After storing the content, the recording medium device in the content management system 2 will have the same structure as the recording medium device in the content management system 1 according to Embodiment 1.

When permitting storing of the content into the recording medium device, the server device transmits the data pertaining to the content to the recording medium device. The recording medium device receives and stores therein the data pertaining to the content. When not permitting storing of the content, the server device transmits notification data to the recording medium device instead of transmitting the data pertaining to the content. Upon receiving the notification data, the recording medium device transmits the notification data to the terminal device connected thereto. Upon receiving the notification data, the terminal device displays the notification data.

The following describes only the difference between the content management system 2 and the content management system according to Embodiment 1.

3-2. Structure

Figure 14:
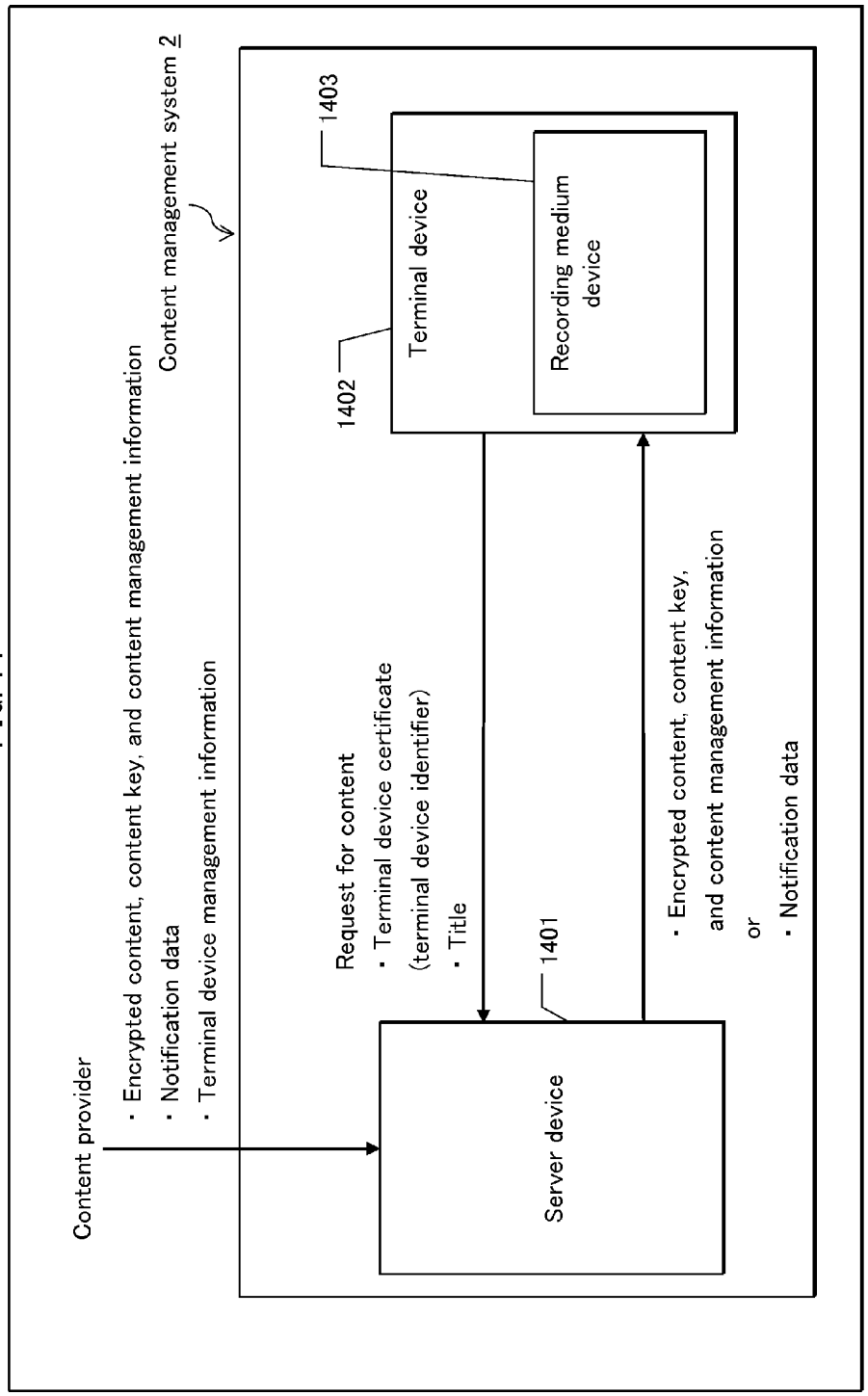
FIG. 14 schematically shows the structure of a content management system 2 according to Embodiment 3.

FIG. 14 schematically shows the structure of the content management system 2.

The content management system 2 includes a server device 1401, a terminal device 1402, and a recording medium device 1403. The server device 1401, the terminal device 1402, and the recording medium device 1403 basically have the same structure as the server device 101, the terminal device 102, and the recording medium device 103. Accordingly, a description of these devices is omitted. Also, for the convenience of description, function blocks common to those in Embodiment 1 are provided with the same reference signs as in Embodiment 1.

(Server Device 1401)

Figure 15:
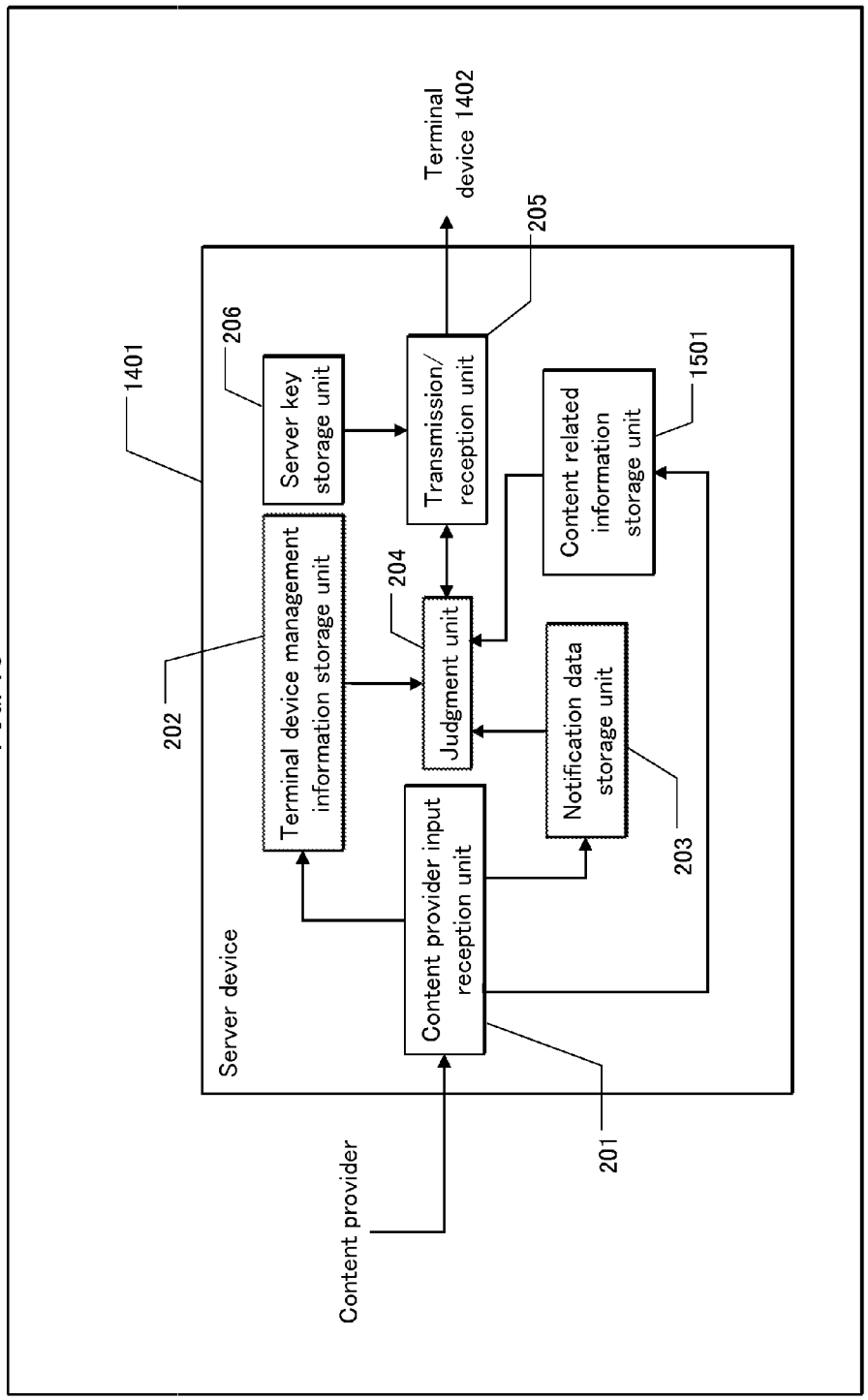
FIG. 15 is a functional block diagram showing the structure of a server device 1401.

FIG. 15 shows the structure of functional blocks of the server device 1401.

The server device 1401 basically has the same structure as the server device 101, but differs therefrom with respect to a content related information storage unit 1501 that stores encrypted content, a content key, and content management information. The server device 1401 receives the encrypted content, the content key, and the content management information from a content provider, and stores these pieces of information into the content related information storage unit 1501. Upon receiving, from the recording medium device 1403, a request for permission to store content, the server device 1401 judges whether to permit the storing. Then, depending on a result of the judgment, the server device 1401 transmits either a set of the encrypted content, the content key, and the content management information or the notification data to the recording medium device 1403.

FIG. 16A shows an example of terminal device management information 1601 stored in the terminal device management information storage unit 202. The terminal device management information 1601 is a management table for managing the following information pieces in correspondence with each other: a content provider name; a title; a terminal device identifier; and a type of notification data. The terminal device management information 1601 differs from the terminal device management information 601 in additionally including the item "title". The title is an item for indicating the titles of contents, and each title is associated with terminal devices not permitted to use the content with the title.

For example, in FIG. 16A, the title "1234" is associated with the terminal device identifiers "0x20 . . . 011" to "0x20 . . . F20" each identifying a terminal device not permitted to play back the content with this title. Also, the notification data to be displayed in this case is "type 1".

FIG. 16B shows an example of content management information 1602 stored in the content related information storage unit 1501. The content management information 1602 is a management table for managing the following information pieces in correspondence with each other: a title; a content provider name; a server connection requirement; resolution; and a window. The content management information 1602 has the same data structure as the content management information 701; therefore, a description thereof is omitted.

In Embodiment 3, the transmission/reception unit 205 receives the title of content from the recording medium device 1403 instead of a content provider name. In this respect, the transmission/reception unit 205 in Embodiment 3 differs from the transmission/reception unit 205 in Embodiments 1 and 2.

Upon the transmission/reception unit 205 receiving a terminal device identifier and the title of the content from the recording medium device 1403, the judgment unit 204 compares the terminal device identifier and the title to information pieces in the terminal device management information 1601. Then, the judgment unit 204 judges whether to permit storing of the content based on a result of the comparison.

For example, suppose that the recording medium device 1403 is connected to the terminal device having the terminal device identifier "0x20 . . . 011", and the recording medium device 1403 has requested for permission to store the content with the title "1234". In this case, since the terminal device identifier "0x20 . . . 011" matches one of the terminal device identifiers associated with the title "1234" in the terminal device management information 1601, the judgment unit 204 does not permit storing of the content into the recording medium device 1403 connected to this terminal device. Accordingly, the judgment unit 204 judges that the notification data of type 1 should be transmitted. On the other hand, suppose that the recording medium device 1403 is connected to the terminal device having the terminal device identifier "0x32 . . . 5B2", and the recording medium device 1403 has requested for permission to store the content with the title "1234". In this case, since the terminal device identifier "0x32 . . . 5B2" does not match any of the terminal device identifiers associated with the title "1234" in the terminal device management information 1601, the judgment unit 204 permits storing of the content into the recording medium device 1403 connected to this terminal device. Accordingly, the transmission/reception unit 205 transmits the encrypted content, the content key, and the content management information to the recording medium device 1403.

(Terminal Device 1402)

The terminal device 1402 basically has the same functions as the terminal device 102, but differs therefrom in transmitting the title of the content to recording medium device 1403 instead of the provider name of the content.

(Recording Medium Device 1403)

The recording medium device 1403 basically has the same functions as the recording medium device 103, but differs therefrom in not storing data pertaining to the content in advance. Specifically, the recording medium device 1403 receives, from the server device 1401, the encrypted content, the content key, and the content management information in the storage unit 400.

3-3. Operations

Figure 17:
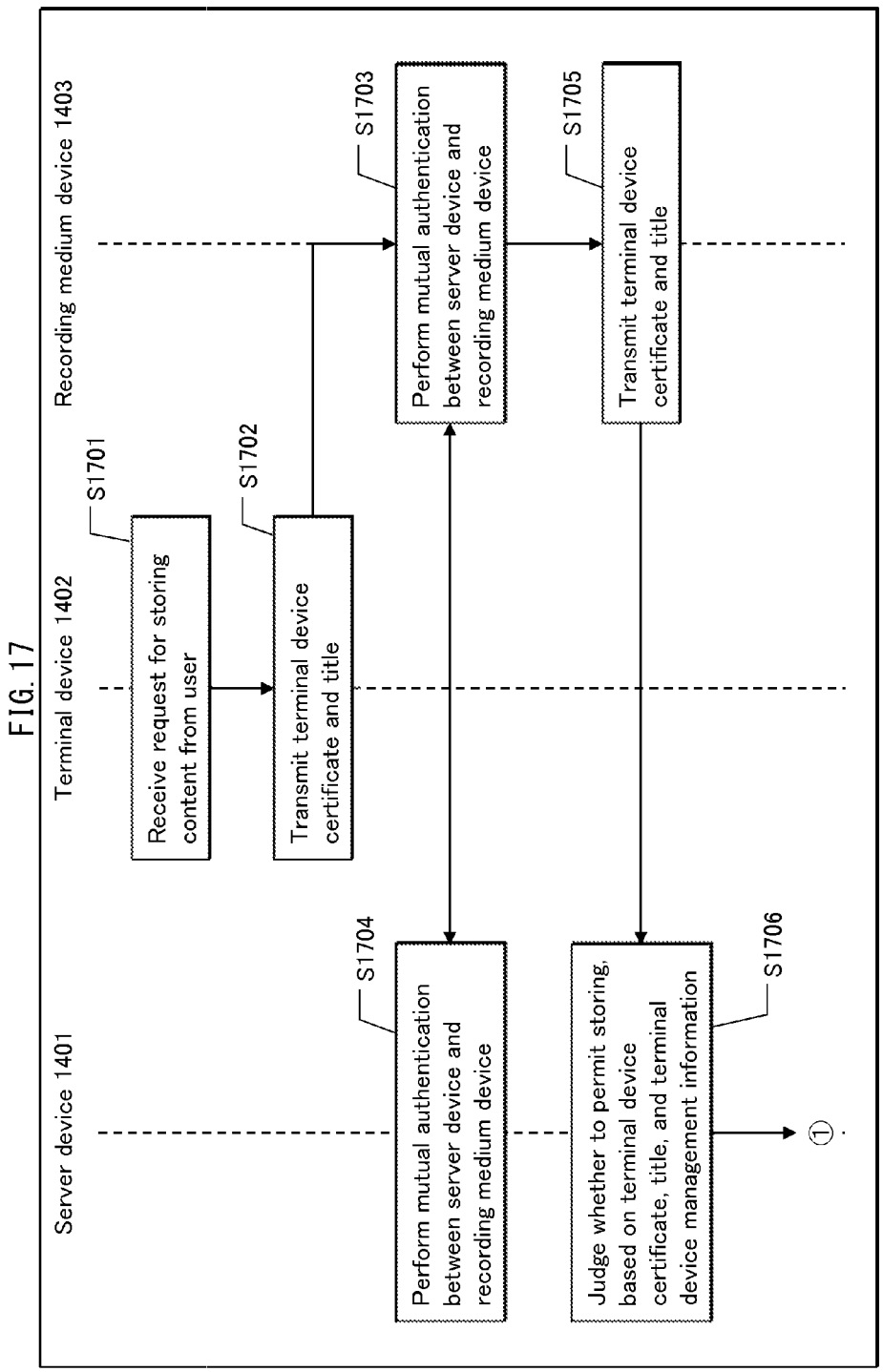
FIG. 17 is a flowchart showing operations at the time of storing content according to Embodiment 3, and is continued to FIG. 18.
Figure 18:
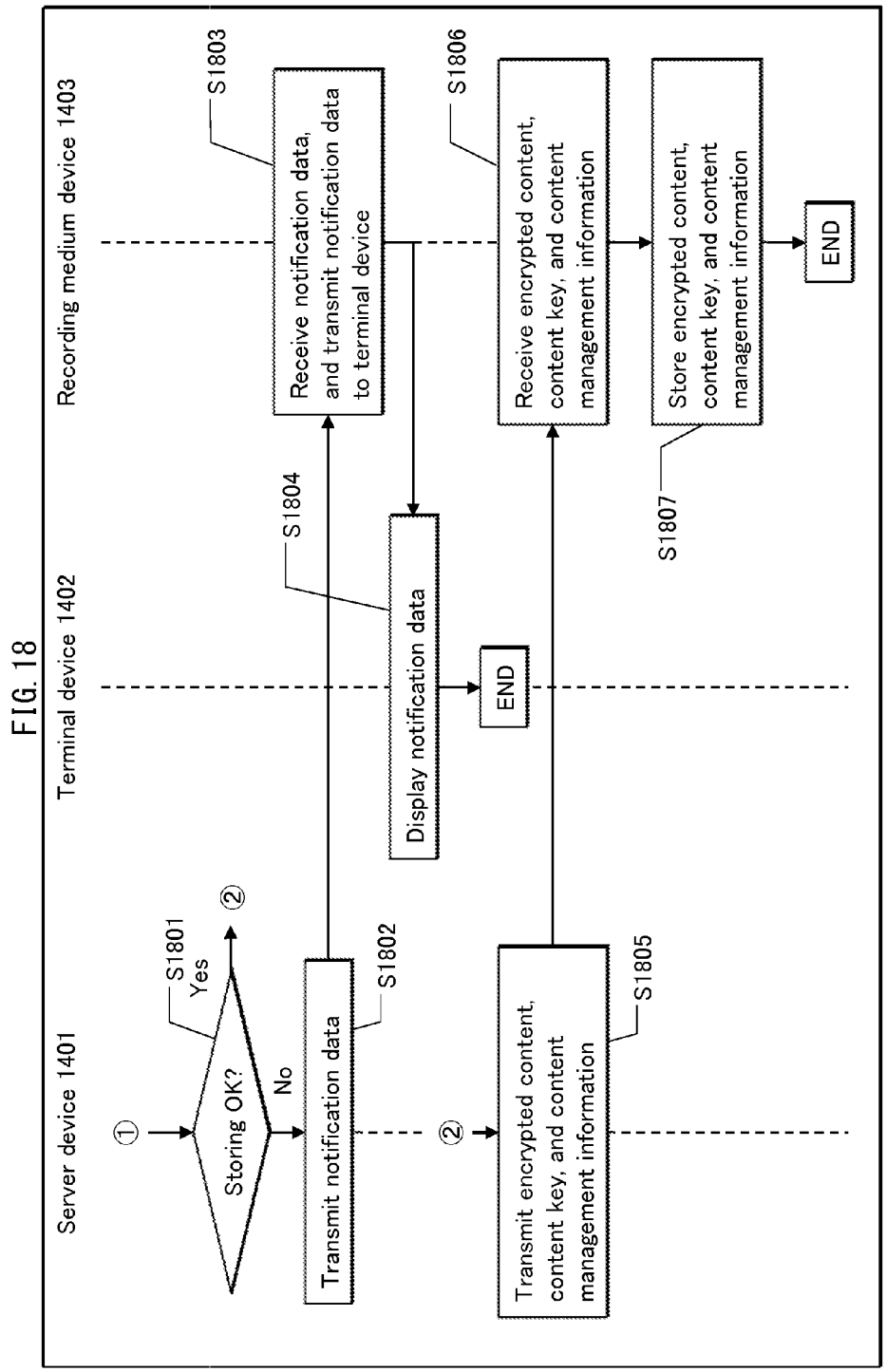
FIG. 18 is a flowchart showing operations at the time of storing content according to Embodiment 3, and is continued from FIG. 17.

The following describes operations of the server device 1401, the terminal device 1402, and the recording medium device 1403 when content is stored into the recording medium device 1403 connected to the terminal device 1402, with reference to the flowcharts of FIGS. 17 and 18.

First, the user input reception unit 303 of the terminal device 1402 receives, from a user, a request for storing the content into the recording medium device 1403 (step S1701). The transmission/reception unit 306 transmits a terminal device certificate and the title of the content to the recording medium device 1403 (step S1702).

The transmission/reception unit 402 of the recording medium device 1403 and the transmission/reception unit 205 of the server device 1401 perform mutual authentication processing and key sharing processing for establishing a secure communication channel (steps S1703 and S1704).

When the secure communication channel is established between the recording medium device 1403 and the server device 1401, the transmission/reception unit 402 of the recording medium device 1403 transmits the terminal device certificate and the title of the content to the server device 1401 (step S1705).

When the server device 1401 receives the terminal device certificate and the title of the content, the judgment unit 204 of the server device 1401 judges whether to permit storing of the content into the recording medium device 1403, based on the terminal device certificate, the title of the content, and the terminal device management information stored in the terminal device management information storage unit 202 (step S1706). Specifically, the judgment unit 204 compares the terminal device identifier included in the terminal device certificate to the terminal device identifiers that are under the item "terminal device identifier" in the terminal device management information 1601 and that correspond to the title of the content. If there is a match, the judgment unit 204 does not permit storing. If there is no match, the judgment unit 204 permits storing.

When not permitting storing of the content (step S1801: No), the judgment unit 204 reads notification data from the notification data storage unit 203. The transmission/reception unit 205 transmits the notification data read by the judgment unit 204 to the recording medium device 1403 (step S1802).

The transmission/reception unit 402 of the recording medium device 1403 receives the notification data, and transmits the notification data to the transmission/reception unit 306 (step S1803).

The transmission/reception unit 306 transmits the notification data to the display unit 301, and the display unit 301 receives and displays the notification data (step S1804).

On the other hand, when the judgment unit 204 permits storing of the content (step S1801: Yes), the transmission/reception unit 205 transmits, to the transmission/reception unit 402, encrypted content, a content key, and content management information stored in the content related information storage unit 1501 (step S1805).

Upon receiving the encrypted content, the content key, and the content management information, the transmission/reception unit 402 transmits these pieces of information to the reading/writing unit 403. The reading/writing unit 403 stores the content key into the protected region 405 of the storage unit 400, and the encrypted content and the content management information into the regular region 406 (step S1807).

3-4 Summary

With the above processing, the server device 1401 and the recording medium device 1403 in the content management system 2 establish a secure communication channel to exchange data therebetween, and the server device 1401 judges whether to permit storing of content into the recording medium device 1403. When permitting the storing, the server device 1401 transmits data pertaining to the content to the recording medium device 1403, and the recording medium device 1403 receives and stores the data therein. When not permitting the storing, the server device 1401 transmits notification data to the recording medium device 1403, and the notification data is then transmitted to the terminal device. Accordingly, the user of the terminal device can clearly identify the reason why storing of the content is not permitted. This improves the convenience of the user.

Embodiment 4

4-1. Outline

A content management system according to Embodiment 4 is similar to the content management system 2. Accordingly, the same reference signs as in the content management system 2 are used for the convenience of description. The difference from the content management system 2 is that when the content in the server device 1401 is stored into the recording medium device 1403 connected to the terminal device 1402, the server device 1401 and the terminal device 1402 establish a secure communication channel to exchange data, instead of the server device 1401 and the recording medium device 1403.

The following describes only the difference between the content management system according to Embodiment 4 and the content management system according to Embodiment 3.

4-2. Structure

In the content management system 2 according to Embodiment 3, the transmission/reception unit 402 of the recording medium device 1403 and the transmission/reception unit 205 of the server device 1401 establish a secure communication channel to exchange data. However, in the content management system according to Embodiment 4, the transmission/reception unit 402 of the terminal device 1402 and the transmission/reception unit 205 of the server device 1401 establish a secure communication channel to exchange data.

4-3. Operations

Figure 19:
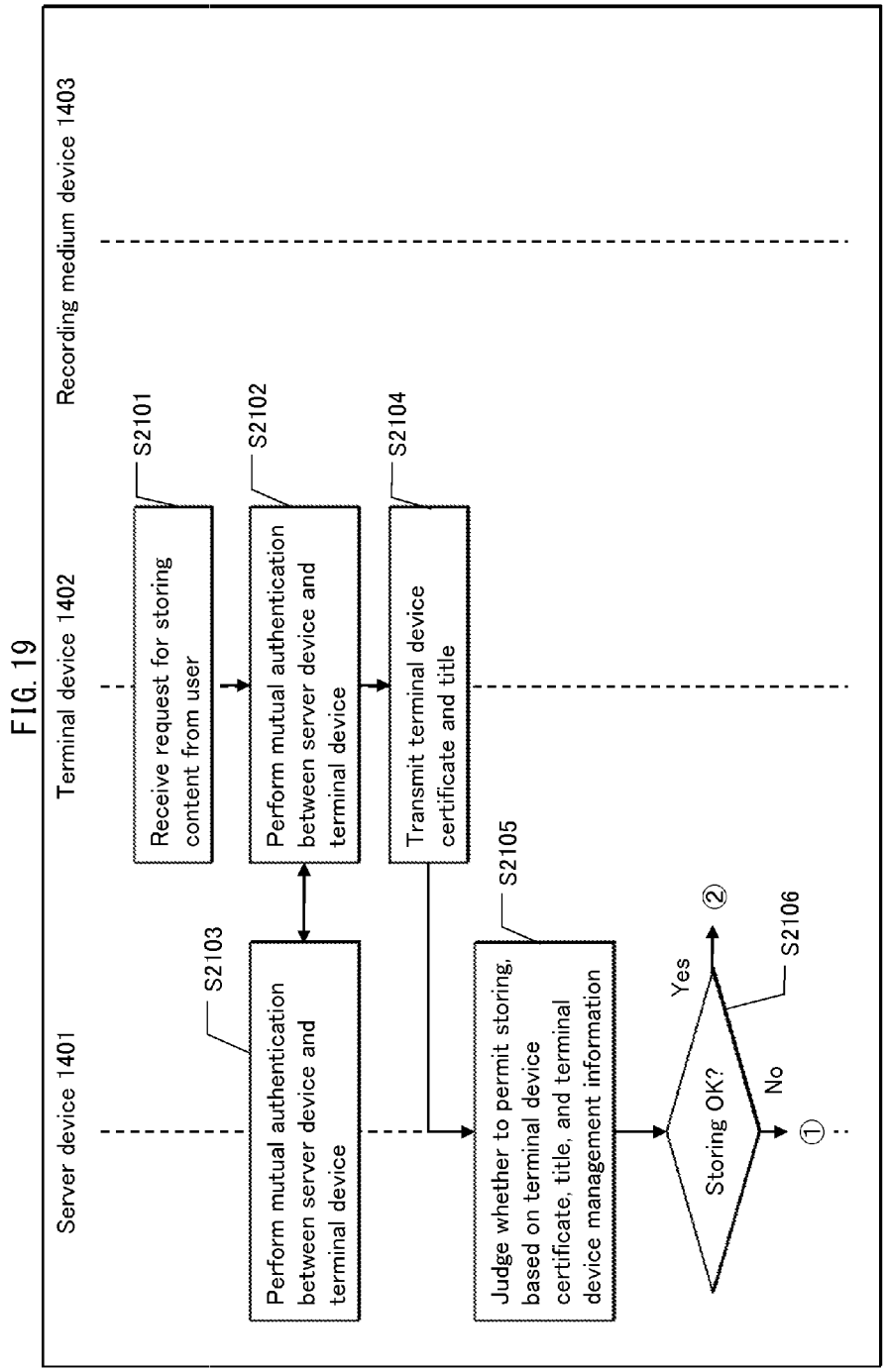
FIG. 19 is a flowchart showing operations at the time of storing content according to Embodiment 4, and is continued to FIG. 20.
Figure 20:
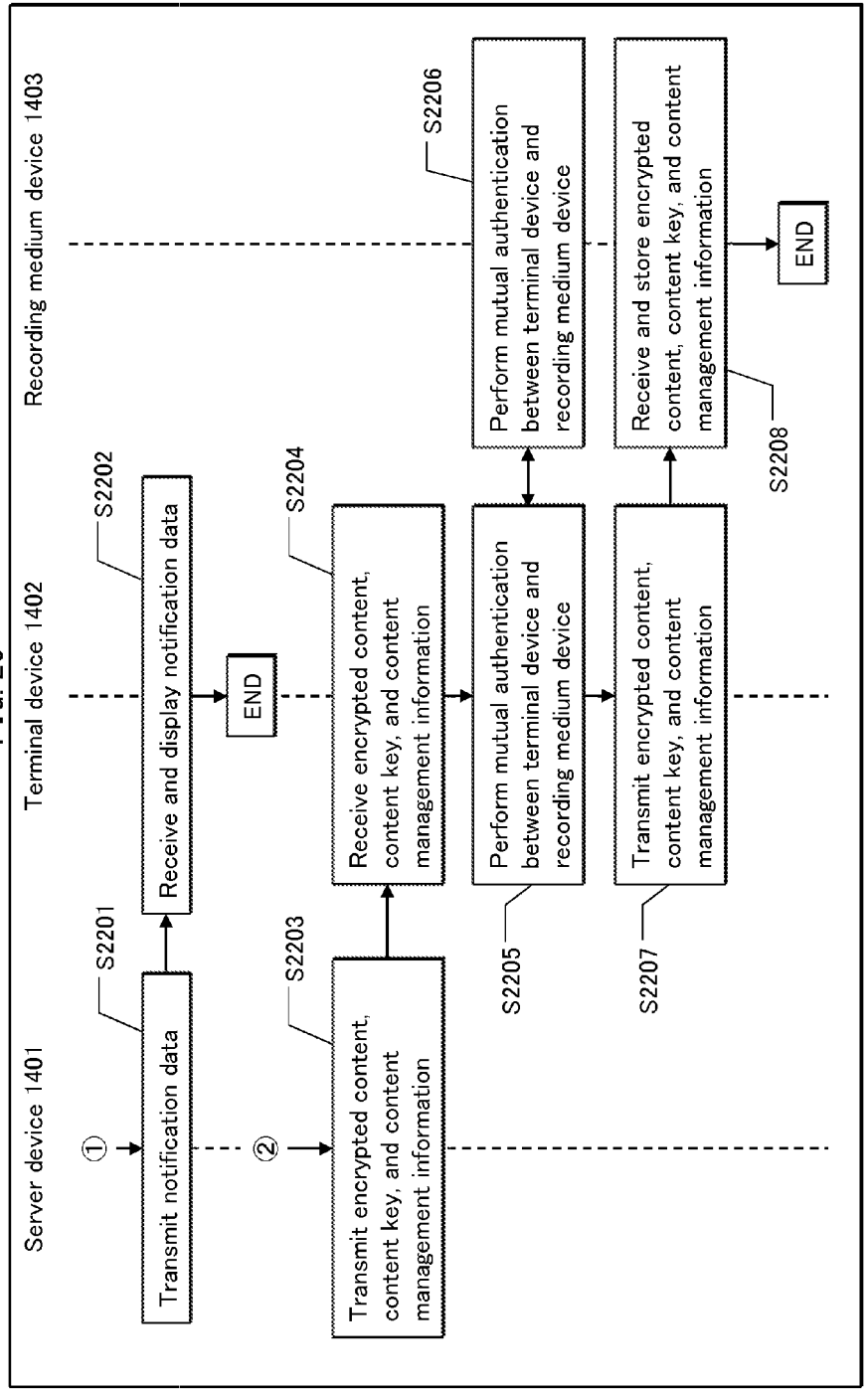
FIG. 20 is a flowchart showing operations at the time of storing content according to Embodiment 4, and is continued from FIG. 19.

The following describes operations of the server device 1401, the terminal device 1402, and the recording medium device 1403 when content is stored into the recording medium device 1403 connected to the terminal device 1402, with reference to the flowcharts of FIGS. 19 and 20.

First, the user input reception unit 303 of the terminal device 1402 receives, from a user, a request for storing the content into the recording medium device 1403 (step S2101).

The transmission/reception unit 306 of the terminal device 1402 and the transmission/reception unit 205 of the server device 1401 perform mutual authentication processing and key sharing processing for establishing a secure communication channel (steps S2102 and S2103).

When the secure communication channel is established between the terminal device 1402 and the server device 1401, the transmission/reception unit 306 of the terminal device 1402 transmits a terminal device certificate and the title of the content to the server device 1401 (step S2104).

The judgment unit 204 of the server device 1401 judges whether to permit storing of the content into the recording medium device 1403, based on the terminal device certificate, the title of the content, and the terminal device management information 1601 stored in the terminal device management information storage unit 202 (step S2105). Specifically, the judgment unit 204 compares the terminal device identifier included in the terminal device certificate to the terminal device identifiers that are under the item "terminal device identifier" in the terminal device management information 1601 and that correspond to the title of the content. If there is a match, the judgment unit 204 does not permit storing of the content into the recording medium device 1403. If there is no match, the judgment unit 204 permits storing of the content.

When not permitting storing of the content into the recording medium device 1403 (step S2106: No), the judgment unit 204 reads notification data of type 1 from the notification data storage unit 203. The transmission/reception unit 205 transmits the notification data of type 1 read by the judgment unit 204 to the terminal device 1402 (step S2201).

The transmission/reception unit 306 of the terminal device 1402 receives the notification data from the transmission/reception unit 205, and transmits the notification data to the display unit 301. The display unit 301 receives and displays the notification data (step S2202).

On the other hand, when the judgment unit 204 permits storing of the content into the recording medium device 1403 (step S2106: Yes), the transmission/reception unit 205 transmits encrypted content, a content key, and content management information to the transmission/reception unit 306 (step S2203).

The transmission/reception unit 306 receives the encrypted content, the content key, and the content management information (step S2204).

The transmission/reception unit 306 of the terminal device 1402 and the transmission/reception unit 402 of the recording medium device 1403 perform mutual authentication processing and key sharing processing for establishing a secure communication channel (steps S2205 and S2206).

When the secure communication channel is established between the terminal device 1402 and the recording medium device 1403, the transmission/reception unit 306 transmits, to the transmission/reception unit 402, the encrypted content, the content key, and the content management information received from the server device 1401 (step S2207).

Upon receiving the encrypted content, the content key, and the content management information, the transmission/reception unit 402 transmits these pieces of information to the reading/writing unit 403. The reading/writing unit 403 stores the content key into the protected region 405 of the storage unit 400, and the encrypted content and the content management information into the regular region 406 (step S2208).

4-4 Summary

With the above processing, the server device 1401 and the terminal device 1402 in the content management system according to Embodiment 4 exchange data securely. Accordingly, the terminal device 1402 and the recording medium device 1403 exchange data only when storing of the content is permitted, and the terminal device 1402 stores, into the recording medium device 1403, data pertaining to the content received from the server device 1401.

Embodiment 5

5-1. Outline

In the content management system 2 according to Embodiment 3, the encrypted content is transmitted from the server device and stored into the recording medium device. However, in a content management system 3 according to Embodiment 5, encrypted content stored on a recording medium (e.g., DVD disc), which is provided by a content provider separately from other data, is output and stored into a recording medium device.

When a server device permits storing into the recording medium device, the server device transmits a content key for decrypting the encrypted content. The recording medium device receives the content key, and also receives the encrypted content on the recording medium provided separately from the content key, and stores the content key and the encrypted content. When not permitting storing into the recording medium device, the server device transmits notification data. Upon receiving the notification data, the recording medium device transmits the notification data to a terminal device connected thereto, and the terminal device displays the notification data.

The following describes only the differences between the content management system 3 and the content management system according to Embodiment 3.

5-2. Structure

Figure 21:
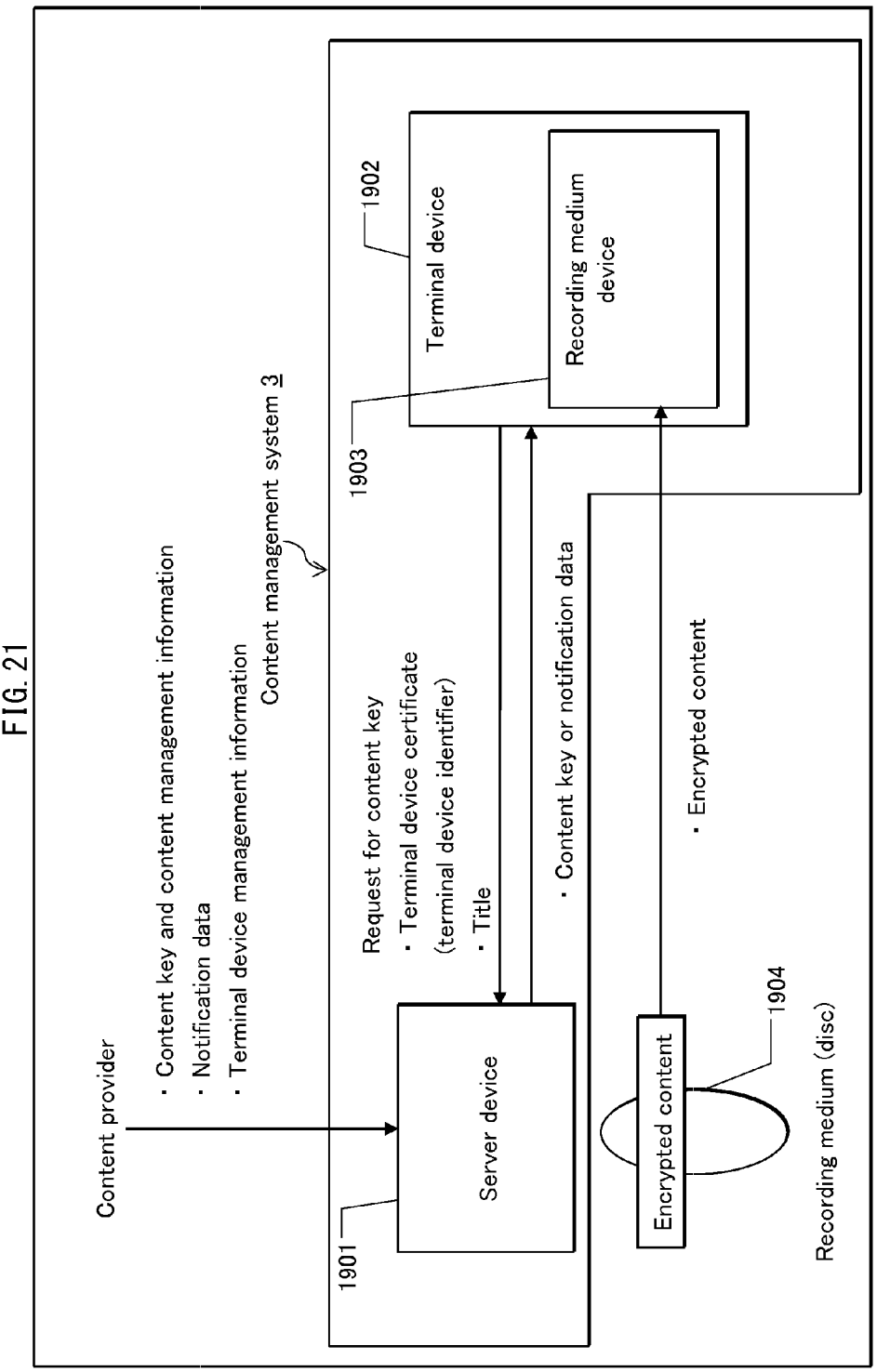
FIG. 21 schematically shows the structure of a content management system 3 according to Embodiment 5.

FIG. 21 schematically shows the structure of the content management system 3.

The content management system 3 includes a server device 1901, a terminal device 1902, and a recording medium device 1903. The server device 1901, the terminal device 1902, and the recording medium device 1903 basically have the same structure as the server device 1401, the terminal device 1402, and the recording medium device 1403. Accordingly, a description of these devices is omitted. Also, for the convenience of description, function blocks common to those in Embodiment 3 are provided with the same reference signs as in Embodiment 3.

The server device 1901 differs from the server device 1401 according to Embodiment 3 in not storing encrypted content in the content related information storage unit 1501.

The encrypted content is stored by a content provider onto a recording medium (e.g., DVD disc), and distributed separately from other data.

Another difference is that the recording medium device 1903 stores the encrypted content output from the recording medium which has been distributed separately by the content provider. In other words, the recording medium device 1903 does not receive encrypted content from the server device 1901.

5-3. Operations

The processing flow in the content management system 3 is similar to the processing flow in Embodiment 3 which is shown in the flowcharts of FIGS. 17 and 18; therefore, a description of the overall processing flow in the content management system 3 is omitted. The difference is that, in the content management system 3, the server device 1901 does not transmit the encrypted content to the recording medium device 1903 in step S1805 of FIG. 18. In step S1806, instead of receiving the encrypted content, the recording medium device 1903 acquires the encrypted content from the recording medium separately distributed by the content provider.

5-4 Summary

In the content management system 3 according to Embodiment 5, the encrypted content is not supplied from the server device 1901 to the recording medium device 1903. Instead, the encrypted content is distributed separately by means of a recording medium (e.g., DVD disc). This greatly reduces the amount of data transmitted from the server device 1901 to the recording medium device 1903, thus enabling reduction in the load of the server device and a communication channel.

Embodiment 6

6-1. Outline

In the content management system 3 according to Embodiment 5, the encrypted content stored on a recording medium (e.g., a DVD disc), which is provided separately by a content provider, is output and stored into the recording medium device. However, in a content management system 4 according to Embodiment 6, a content distribution server device is separately provided. Encrypted content is output from this content distribution server device and stored into a recording medium device.

When a server device permits storing into the recording medium device, the server device transmits a content key for decrypting the encrypted content. The recording medium device receives the content key from the server device, and the encrypted content from the content distribution server device, and stores the content key and the encrypted content. When not permitting storing into the recording medium device, the server device transmits notification data. Upon receiving the notification data, the recording medium device transmits the notification data to a terminal device connected thereto, and the terminal device displays the notification data.

The following describes only the difference between the content management system 4 and the content management system according to Embodiment 5.

6-2. Structure

Figure 22:
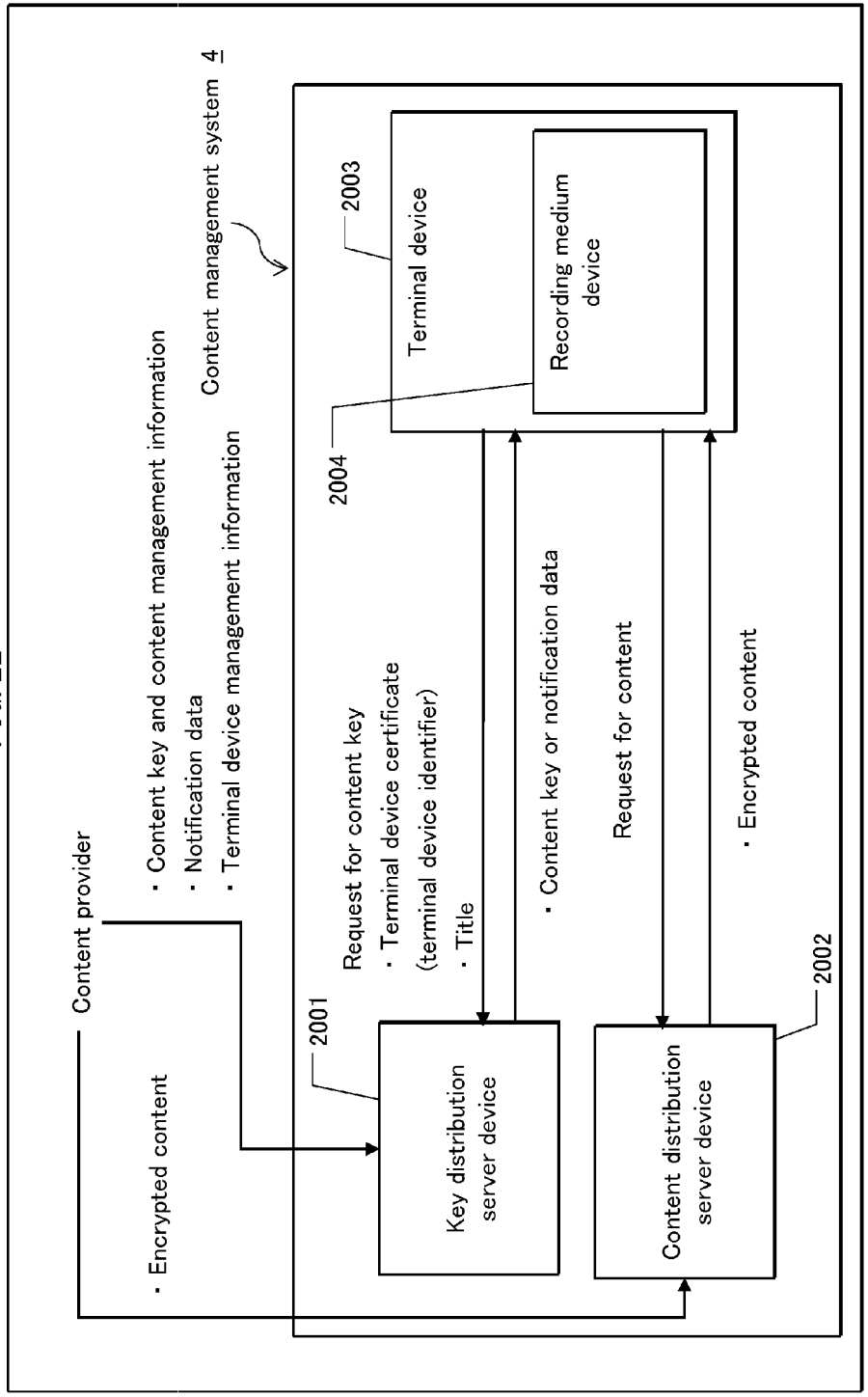
FIG. 22 schematically shows the structure of a content management system 4 according to Embodiment 6.

FIG. 22 schematically shows the structure of the content management system 4.

The content management system 4 includes a key distribution server device 2001, a content distribution server device 2002, a terminal device 2003, and a recording medium device 2004. The key distribution server device 2001, the terminal device 2003, and the recording medium device 2004 basically have the same structure as the server device 1901, the terminal device 1902, and the recording medium device 1903. Accordingly, a description of these devices is omitted. Also, for the convenience of description, function blocks common to those in Embodiment 5 are provided with the same reference signs as in Embodiment 5. Also, the content distribution server device 2002 basically has the same structure as the key distribution server device 2001, but differs therefrom in providing no other data but encrypted content.

6-3. Operations

The processing flow in a content management system 4 is similar to the processing flow in Embodiment 3 which is shown in the flowcharts of FIGS. 17 and 18; therefore, a description of the overall processing flow in the content management system 4 is omitted. The difference is that, in the content management system 4, the server device 1901 does not transmit the encrypted content to the recording medium device 1903 in step S1805 of FIG. 18. In step S1806, instead of receiving the encrypted content, the recording medium device 2004 acquires the encrypted content from the content distribution server device 2002.

6-4 Summary

In the content management system 4 according to Embodiment 6, the encrypted content is not distributed from the key distribution server device 2001 to the recording medium device 2004. Instead, the encrypted content is distributed from the content distribution server device 2002. This enables management of the encrypted content and the content key for decrypting the encrypted content separately from one another.

Embodiment 7

7-1. Outline

In a content management system 5 according to Embodiment 7, a server device judges whether to permit moving content from one recording medium device to another recording medium device.

A terminal device, which is connected to the recording medium device storing the content, transmits a request for permission to move the content to the server device. Upon receiving permission to move the content from the server device, the terminal device communicates with a terminal device connected to a recording medium device to which the content is to be moved, and moves the content to the recording medium device. If the request for permission to move the content is not granted, the terminal device does not move the content. Instead, the terminal device displays notification data received from the server device.

The following describes the content management system 5 with reference to the drawings.

7-2. Structure

Figure 23:
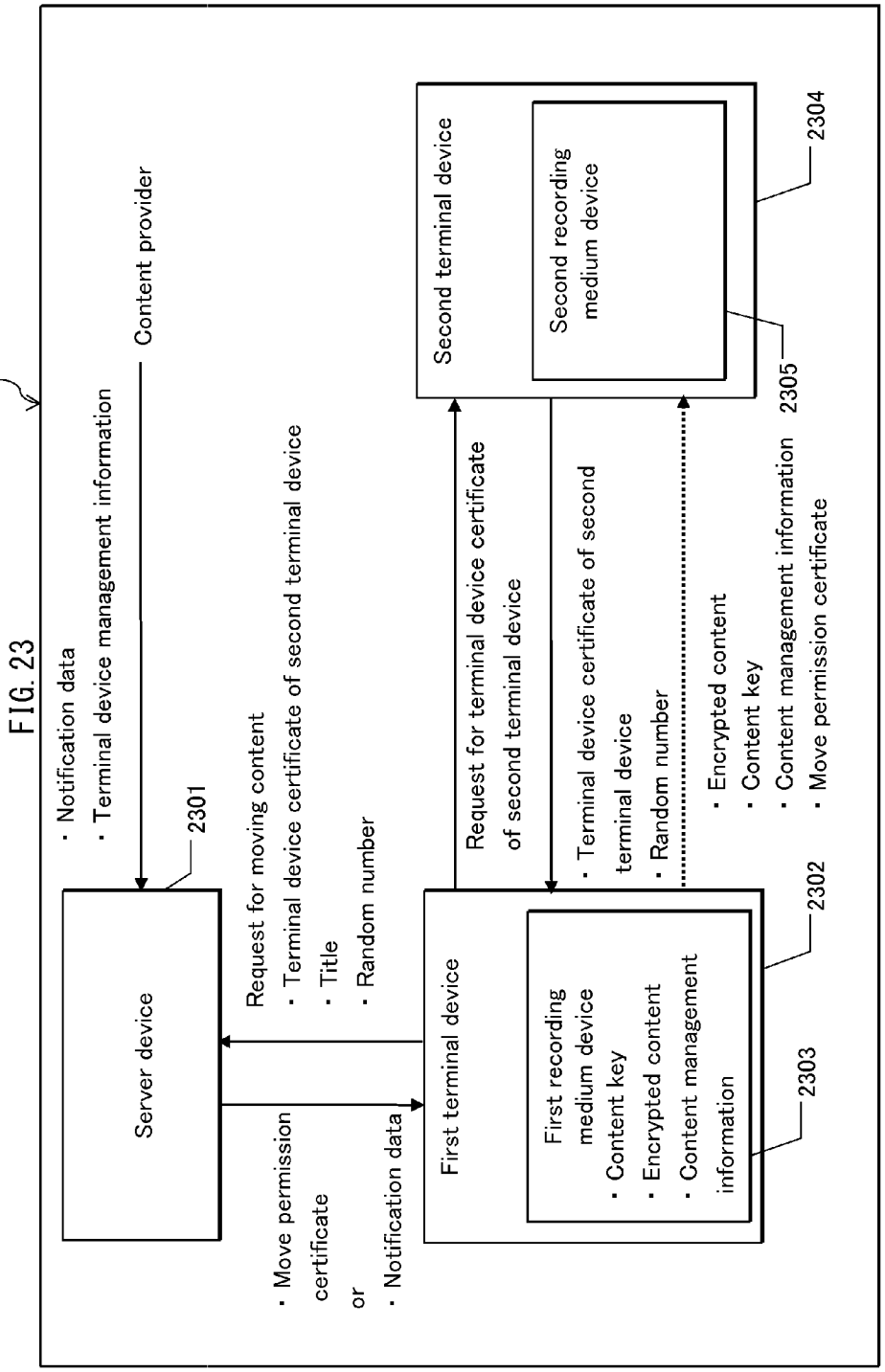
FIG. 23 schematically shows the structure of a content management system 5 according to Embodiment 7.

FIG. 23 schematically shows the structure of the content management system 5.

The content management system 5 includes a server device 2301, a first terminal device 2302, a first recording medium device 2303, a second terminal device 2304, and a second recording medium device 2305.

The server device 2301, each of the first terminal device 2302 and the second terminal device 2304, and each of the first recording medium device 2303 and the second recording medium device 2305 basically have the same structure as the server device 101, the terminal device 102, and the recording medium device 103. Accordingly, a description of these devices is omitted. Also, for the convenience of description, function blocks common to those in Embodiment 1 are provided with the same reference signs as in Embodiment 1.

The first terminal device 2302 differs from the terminal device 102 in that, instead of transmitting the content provider name and the terminal device certificate of its own, the first terminal device 2302 transmits, to the server device 2301, (i) the title of content to be moved, (ii) the terminal device certificate of the second terminal device 2304, which is received from the second terminal device 2304 and includes a terminal device identifier of the second terminal device 2304, and (iii) a random number generated by the second recording medium device 2305. Another difference is that, when the server device 2301 permits moving of the content, the first terminal device 2302 receives a move permission certificate from the server device 2301. Note that the move permission certificate is a data set obtained as a result of the server device 2301 providing a signature for a random number generated by the second recording medium device 2305. The data set includes the random number, the signature, and a server device certificate for verifying the signature.

FIG. 31 shows an example of content management information 3101 used to judge whether the first terminal device 2302 needs to connect to the server device 2301.

The content management information 3101 is a management table for managing the following information pieces in correspondence with each other: a title; a content provider; a server connection requirement; resolution; and a window.

The content management information 3101 is similar to the content management information 1602, but differs therefrom with respect to the item "server connection requirement". The item "server connection requirement" in the content management information 3101 allows for setting, for each usage form of content (e.g., playback, moving, etc. of content), whether it is necessary to connect to the server device.

In FIG. 31, for example, the provider of the content with the title "ABC" is a movie company A. Regarding this content, moving of the content requires connection to the server device 2301. Playback of the content does not require connection to the server device 2301. Also, the resolution of the content is HD (High Definition), and the content is a video window content.

The second terminal device 2304 receives, from the first terminal device 2302, the move permission certificate transmitted from the server device 2301 when the server device 2301 permits moving of content. Also, the second terminal device 2304 verifies the authenticity of the move permission certificate thus received. When the authenticity of the move permission certificate is verified, the second recording medium device 2305 establishes a secure communication channel with the first terminal device 2302. When the secure communication channel is established, the first terminal device 2302 transmits, to the second recording medium device 2305, data that pertains to the content to be moved and is stored within the first recording medium device 2303. The second recording medium device 2305 receives and stores the data.

7-3. Operations

Figure 24:
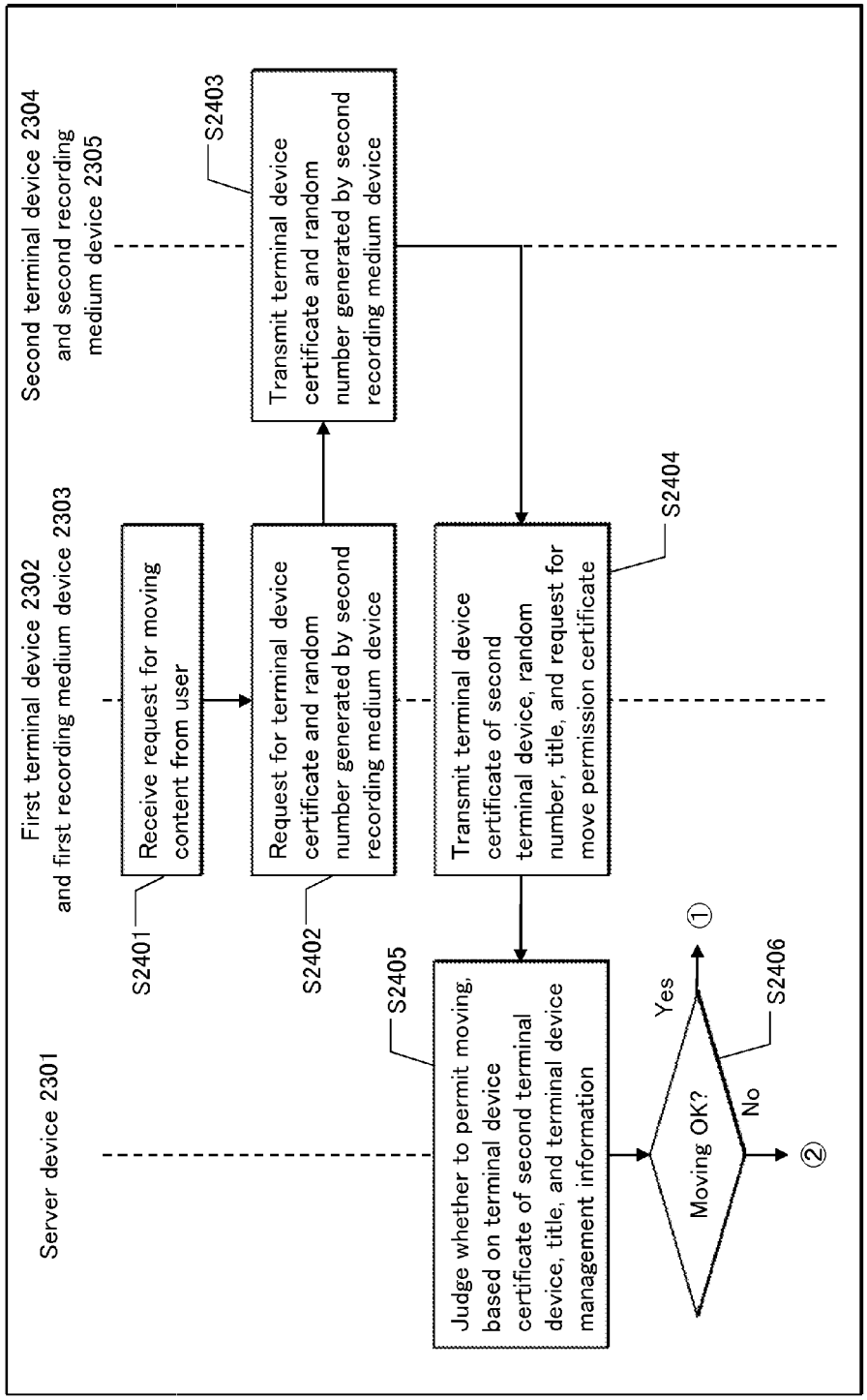
FIG. 24 is a flowchart showing operations at the time of moving content according to Embodiment 7, and is continued to FIG. 25.
Figure 25:
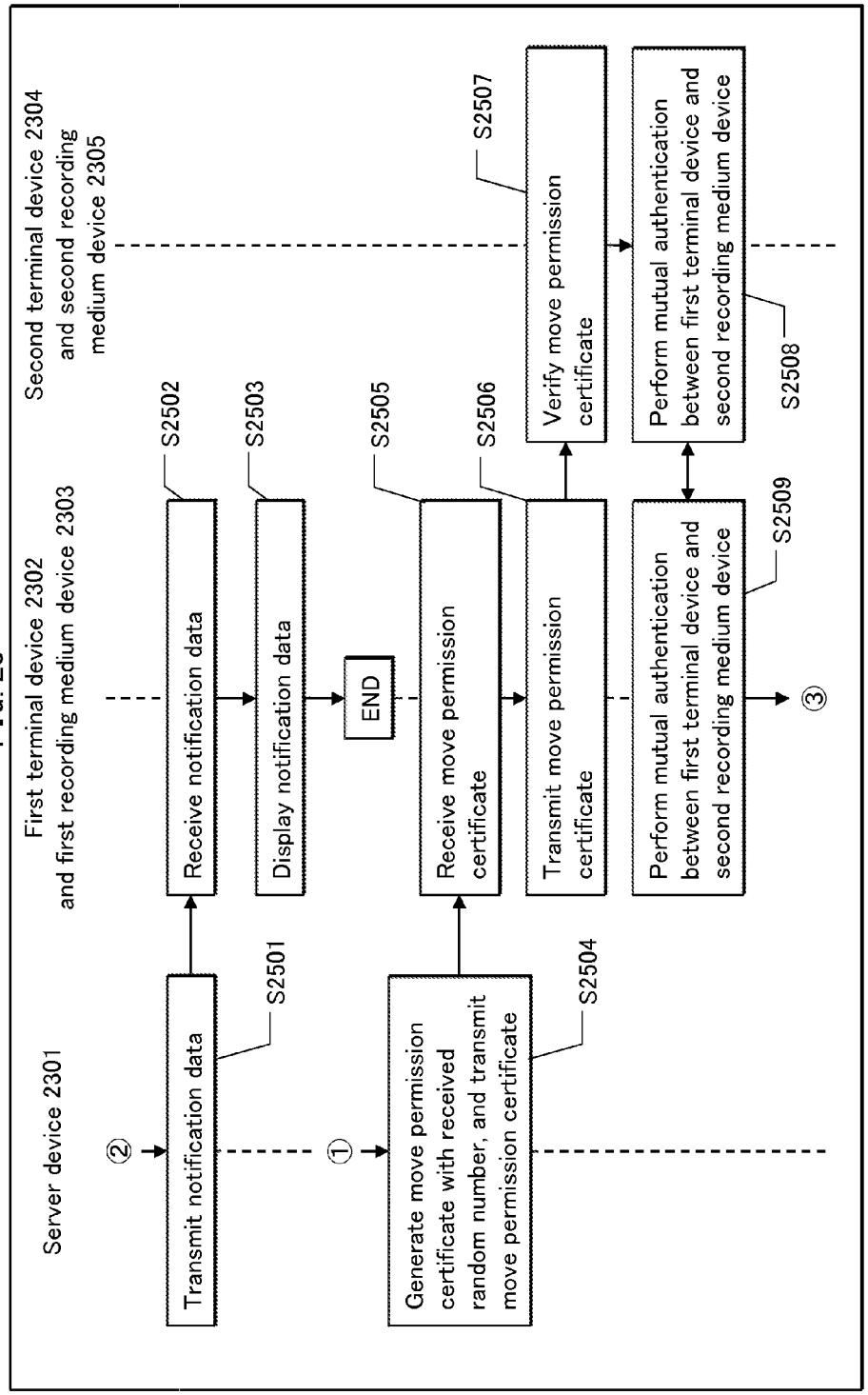
FIG. 25 is a flowchart showing operations at the time of moving content according to Embodiment 7, and is continued from FIG. 24 and to FIG. 26.
Figure 26:
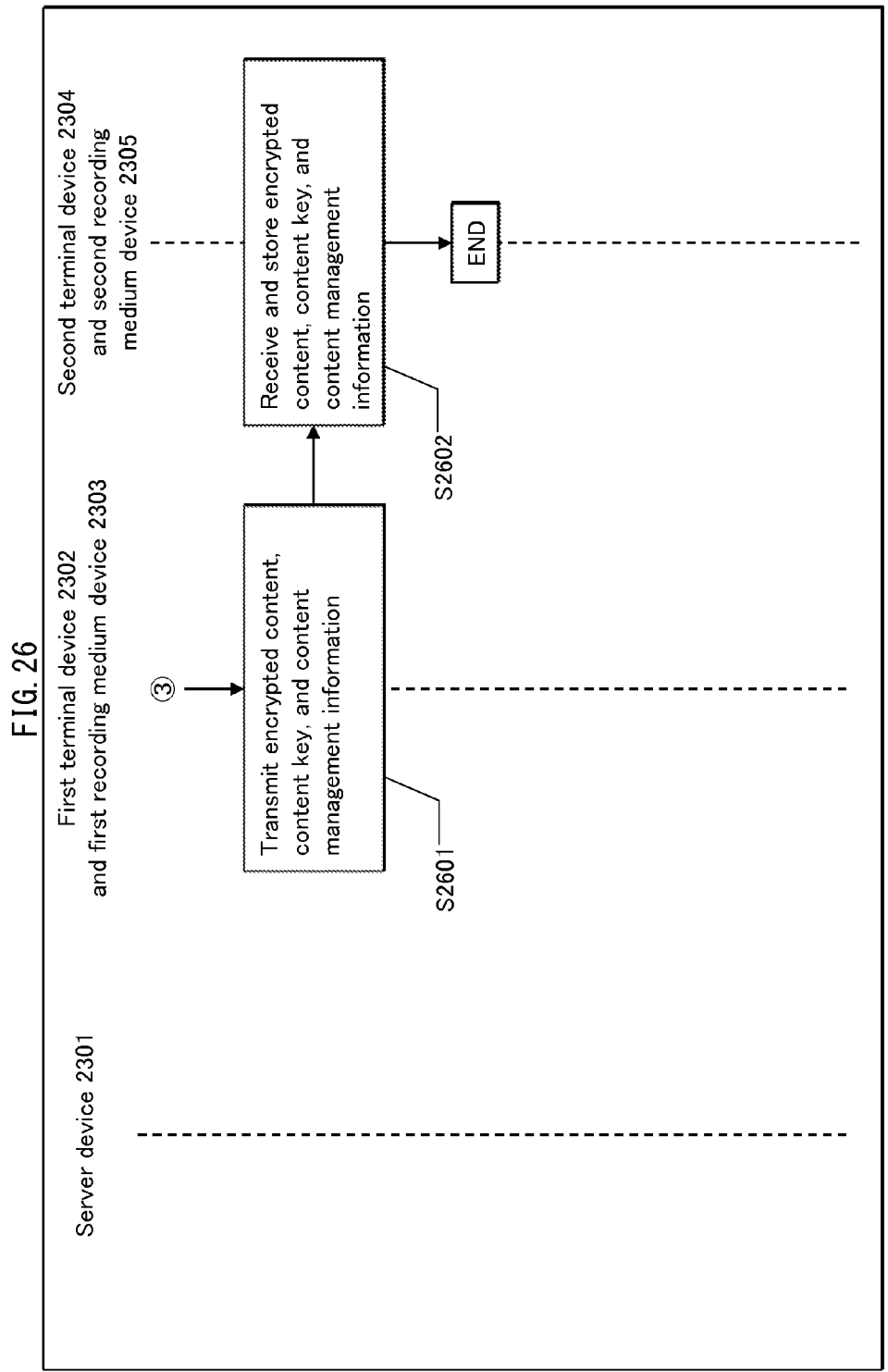
FIG. 26 is a flowchart showing operations at the time of moving content according to Embodiment 7, and is continued from FIG. 25.

The following describes operations, at the time of moving of content, performed by the server device 2301, the first terminal device 2302, the first recording medium device 2303, the second terminal device 2304, and the second recording medium device 2305, with reference to the flowcharts of FIGS. 24 to 26.

First, the user input reception unit 303 of the first terminal device 2302 receives a request for moving content from a user (step S2401).

Next, the first terminal device 2302 transmits, to the second terminal device 2304, a request for (i) the terminal device certificate of the second terminal device 2304 and (ii) a random number generated by the second recording medium device 2305 (step S2402).

The transmission/reception unit 306 of the second terminal device 2304 transmits, to the first terminal device 2302, the terminal device certificate of the second terminal device 2304 and the random number generated by the second recording medium device 2305 (step S2403).

The transmission/reception unit 306 of the first terminal device 2302 transmits, to the server device 2301, the terminal device certificate of the second terminal device 2304, the random number, and the title of the content selected by the user for moving (step S2404).

The judgment unit 204 of the server device 2301 judges whether to permit moving of the content to the second terminal device 2304, based on the terminal device certificate of the second terminal device 2304 and the title of the content thus received, and the terminal device management information 1601 stored in the terminal device management information storage unit 202 (step S2405). Specifically, the judgment unit 204 compares the terminal device identifier included in the terminal device certificate of the second terminal device 2304 to the terminal device identifiers that are under the item "terminal device identifier" in the terminal device management information 1601 and that correspond to the title of the content. If there is a match, the judgment unit 204 does not permit moving of the content to the second recording medium device 2305. If there is no match, the judgment unit 204 permits the moving.

When not permitting moving of the content to the second recording medium device 2305 (step S2406: No), the judgment unit 204 of the server device 2301 reads notification data of type 1 from the notification data storage unit 203. The transmission/reception unit 205 transmits the notification data of type 1 read by the judgment unit 204 to the first terminal device 2302 (step S2501).

The transmission/reception unit 306 of the first terminal device 2302 receives the notification data from the transmission/reception unit 205 of the server device 2301 (step S2502), and transmits the notification data to the display unit 301. The display unit 301 receives and displays the notification data (step S2503).

On the other hand, when the judgment unit 204 of the server device 2301 permits moving of the content to the second recording medium device 2305 (step S2406: Yes), the judgment unit 204 generates the move permission certificate with use of the received random number. The transmission/reception unit 205 transmits the move permission certificate thus generated to the first terminal device 2302 (step S2504).

The transmission/reception unit 306 of the first terminal device 2302 receives the move permission certificate (step S2505), and transmits the move permission certificate to the second terminal device 2304 (step S2506).

The transmission/reception unit 306 of the second terminal device 2304 receives and verifies the authenticity of the move permission certificate (step S2507).

If, as a result of the verification, the transmission/reception unit 306 does not detect any tampering on the move permission certificate, the transmission/reception unit 306 of the first terminal device 2302 and the transmission/reception unit 402 of the second recording medium device 2305 perform mutual authentication processing and key sharing processing for establishing a secure communication channel (steps S2508 and S2509).

When the secure communication channel is established, the transmission/reception unit 306 of the first terminal device 2302 transmits encrypted content, a content key, and the content management information to the transmission/reception unit 402 of the second recording medium device 2305 (step S2601).

Upon receiving the encrypted content, the content key, and the content management information, the transmission/reception unit 402 of the second recording medium device 2305 transmits these pieces of information to the reading/writing unit 403 of the second recording medium device 2305. The reading/writing unit 403 stores the content key into the protected region 405 of the storage unit 400, and the encrypted content and the content management information into the regular region 406 (step S2602).

7-4 Summary

In the content management system 5, the first terminal device, which is connected to the recording medium device from which the content is moved, receives information on the second terminal device, which is connected to the recording medium device to which the content is moved. Then, the first terminal device communicates with the server device, whereby the server device verifies whether the second terminal device is authorized, and judges whether to permit moving of the content.

This enables the server device to judge whether to permit moving of the content, without the need of direct communication with the second terminal device (i.e., the device to which the content is moved).

Embodiment 8

8-1. Outline

A content management system 6 according to Embodiment 8 is similar to the content management system 5, but differs therefrom with respect to the following point. That is, in the content management system 5, when the server device permits moving of the content, the second recording medium device receives, from the first recording medium device, the content key of the content targeted for moving. However, in the content management system 6, when the server device permits moving of the content, the server device receives the content key from the first terminal device, establishes a secure communication channel with the second recording medium device, and transmits the content key to the second recording medium device. The second recording medium device receives the content key from the server device.

The following describes only the difference between the content management system 6 and the content management system 5.

8-2. Structure

Figure 27:
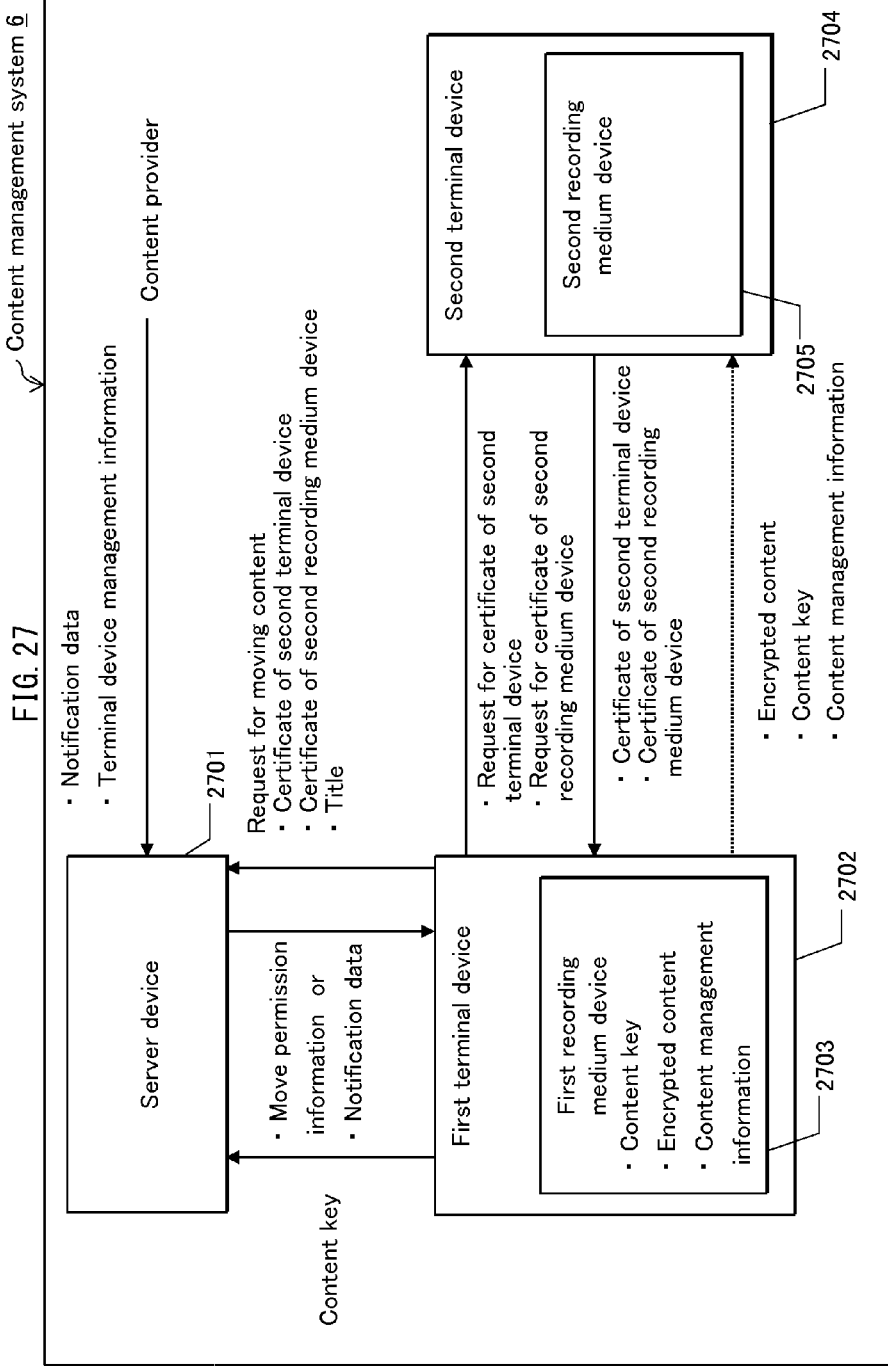
FIG. 27 schematically shows the structure of a content management system 6 according to Embodiment 8.

FIG. 27 schematically shows the structure of the content management system 6.

The content management system 6 includes a server device 2701, a first terminal device 2702, a first recording medium device 2703, a second terminal device 2704, and a second recording medium device 2705.

The server device 2701, the first terminal device 2702, the second terminal device 2704, the first recording medium device 2703, the second recording medium device 2705 basically have the same structure as the server device 2301, the first terminal device 2302, the first recording medium device 2303, the second terminal device 2304, and the second recording medium device 2305. Accordingly, a description of these devices is omitted.

The first terminal device 2702 differs from the first terminal device 2302 in not receiving a random number generated by the second recording medium device 2705 from the second terminal device 2704. Instead, the first terminal device 2702 receives the recording medium device certificate of the second recording medium device 2705, and transmits the recording medium device certificate to the server device 2701.

The server device 2701 differs from the server device 2301 on the following point. That is, when permitting moving of content, the server device 2701 receives a content key stored in the first recording medium device 2703 from the first terminal device 2702, establishes a secure communication channel with the second recording medium device 2705, and transmits the content key to the second recording medium device 2705.

8-3. Operations

Figure 28:
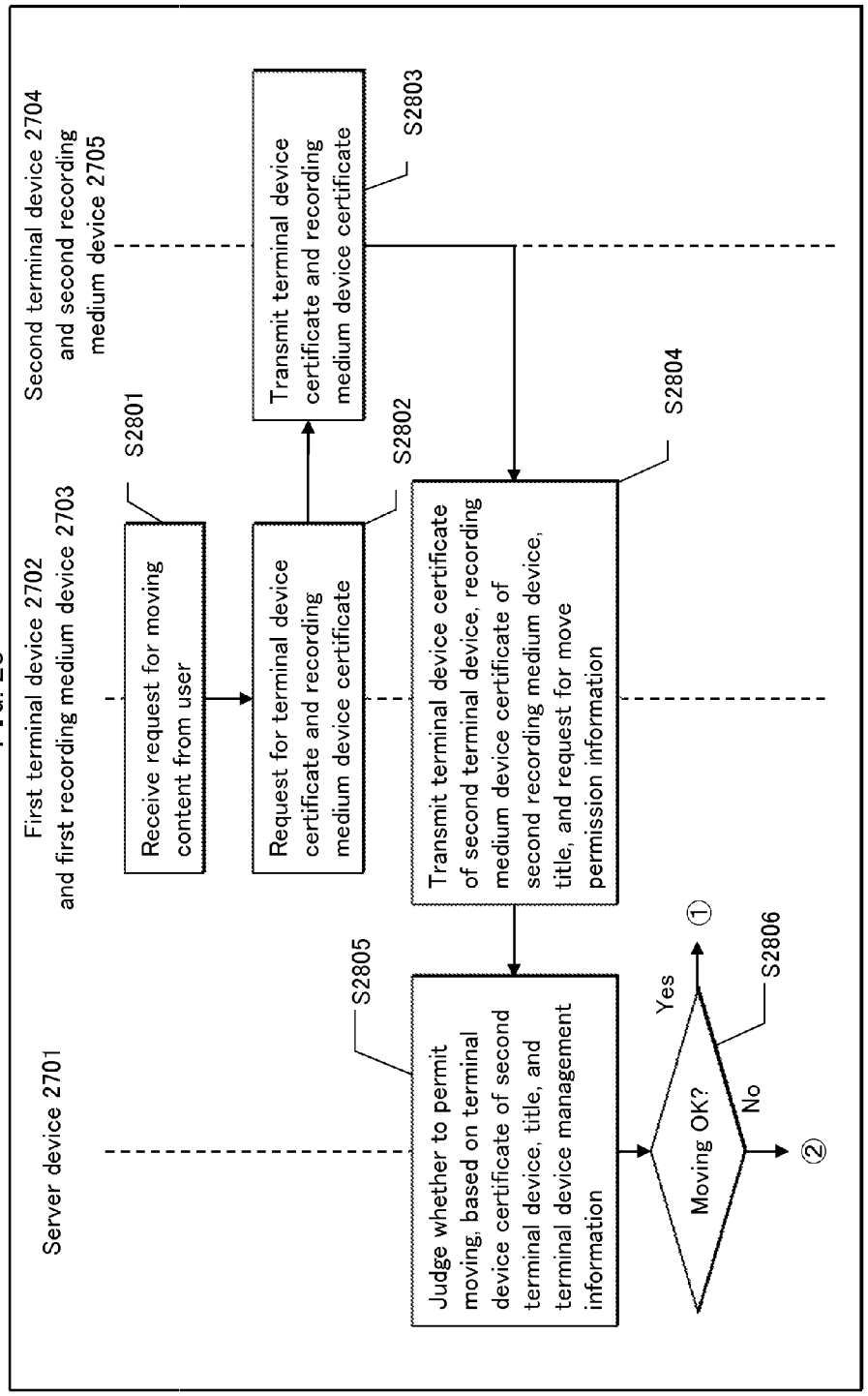
FIG. 28 is a flowchart showing operations at the time of moving content according to Embodiment 8, and is continued to FIG. 29.
Figure 29:
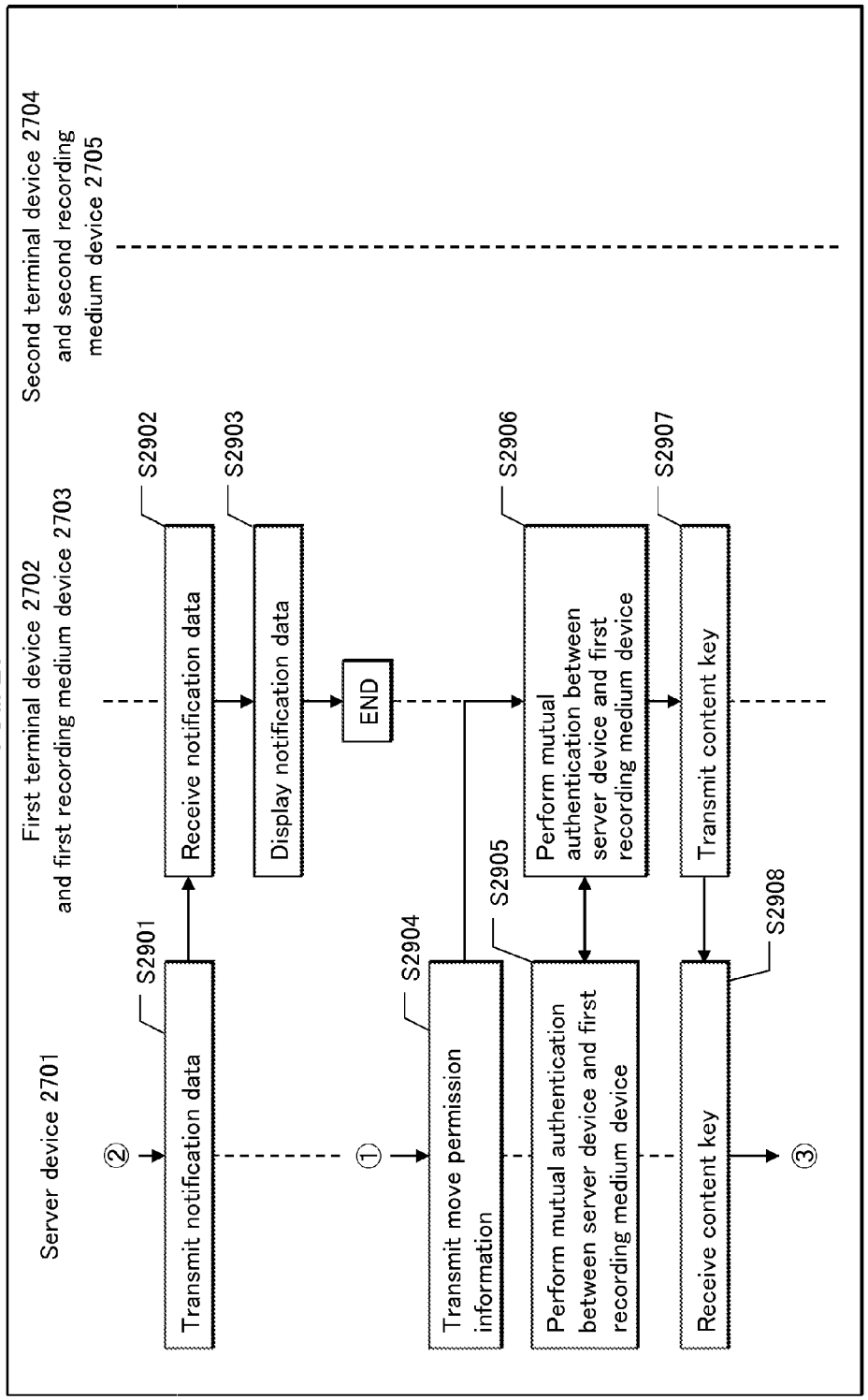
FIG. 29 is a flowchart showing operations at the time of moving content according to Embodiment 8, and is continued from FIG. 28 and to FIG. 30.
Figure 30:
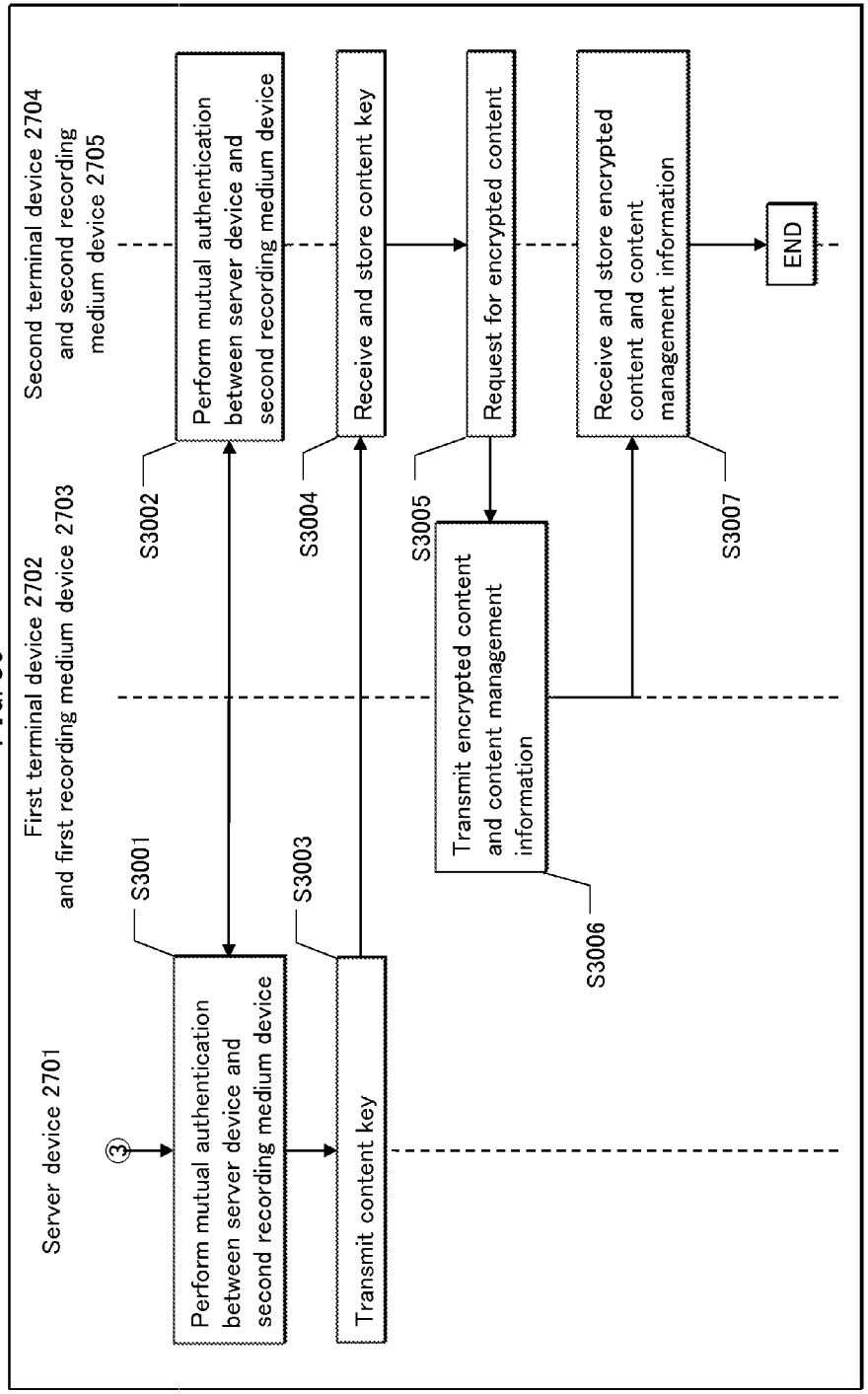
FIG. 30 is a flowchart showing operations at the time of moving content according to Embodiment 8, and is continued from FIG. 29.

The following describes operations, at the time of moving of content, performed by the server device 2701, the first terminal device 2702, the first recording medium device 2703, the second terminal device 2704, and the second recording medium device 2705, with reference to the flowcharts of FIGS. 28 to 30.

First, the user input reception unit 303 of the first terminal device 2702 receives a request for moving content from a user (step S2801).

Next, the first terminal device 2702 transmits, to the second terminal device 2704, a request for the terminal device certificate of the second terminal device 2704 and the recording medium device certificate of the second recording medium device 2705 (step S2802).

The transmission/reception unit 306 of the second terminal device 2704 transmits, to the first terminal device 2702, the terminal device certificate of the second terminal device 2704 and the recording medium device certificate of the second recording medium device 2705 (step S2803).

The transmission/reception unit 306 of the first terminal device 2702 transmits, to the server device 2701, the terminal device certificate of the second terminal device 2704, the recording medium device certificate of the second recording medium device 2705, and the title of the content (step S2804).

The judgment unit 204 of the server device 2701 judges whether to permit moving of the content to the second terminal device 2704, based on the terminal device certificate of the second terminal device 2704, the title of the content, and the terminal device management information 1601 stored in the terminal device management information storage unit 202 (step S2805). Specifically, the judgment unit 204 compares the terminal device identifier included in the terminal device certificate of the second terminal device 2704 to the terminal device identifiers that are under the item "terminal device identifier" in the terminal device management information 1601 and that correspond to the title of the content. If there is a match, the judgment unit 204 does not permit moving of the content to the second recording medium device 2705. If there is no match, the judgment unit 204 permits the moving.

When not permitting moving of the content to the second recording medium device 2705 (step S2806: No), the judgment unit 204 of the server device 2701 reads notification data of type 1 from the notification data storage unit 203. The transmission/reception unit 205 transmits the notification data of type 1 read by the judgment unit 204 to the first terminal device 2702 (step S2901).

The transmission/reception unit 306 of the first terminal device 2702 receives the notification data from the transmission/reception unit 205 of the server device 2701 (step S2902), and transmits the notification data to the display unit 301. The display unit 301 receives and displays the notification data (step S2903).

On the other hand, when the judgment unit 204 of the server device 2701 permits moving of the content to the second recording medium device 2705 (step S2806: Yes), the judgment unit 204 generates move permission information indicating permission to move the content. The transmission/reception unit 205 transmits the move permission information thus generated to the first terminal device 2702 (step S2904).

Upon receiving the move permission information, the transmission/reception unit 306 of the first terminal device 2702 performs mutual authentication processing and key sharing processing for establishing a secure communication channel with the transmission/reception unit 205 of the server device 2701 (steps S2905 and S2906).

When the secure communication channel is established, the transmission/reception unit 306 of the first terminal device 2702 transmits the content key of the content targeted for moving to the transmission/reception unit 205 of the server device 2701 (step S2907).

The transmission/reception unit 205 of the server device 2701 receives the content key (step S2908).

The transmission/reception unit 205 of the server device 2701 performs mutual authentication processing and key sharing processing for establishing a secure communication channel with the transmission/reception unit 402 of the second recording medium device 2705 (steps S3001 and S3002).

When the secure communication channel is established, the transmission/reception unit 205 of the server device 2701 transmits the content key to the transmission/reception unit 402 of the second recording medium device 2705 (step S3003).

The reading/writing unit 403 of the second recording medium device 2705 stores the content key into the protected region 405 of the storage unit 400 (step S3004).

The transmission/reception unit 402 of the second recording medium device 2705 transmits a request for encrypted content and the content management information to the transmission/reception unit 402 of the first recording medium device 2703 (step S3005).

The transmission/reception unit 402 of the first recording medium device 2703 transmits the encrypted content and the content management information to the transmission/reception unit 402 of the second recording medium device 2705 (step S3006).

The transmission/reception unit 402 of the second recording medium device 2703 receives the encrypted content and the content management information, and the reading/writing unit 403 stores the encrypted content and the content management information into the regular region 406 of the storage unit 400 (step S3007).

8-4 Summary

In the content management system 6, when the server device permits moving of content, the recording medium device from which the content is moved transmits the content key of the content to the server device. Subsequently, the recording medium device to which the content is moved communicates with the server device to receive the content key from the server device.

In this way, the server device can directly communicate with the terminal device connected to the recording medium device to which the content is moved. After verifying the authenticity of the terminal device to which the content is moved, the server device can transmit the content key to the terminal device without fail.

Embodiment 9

9-1. Outline

In a content management system 7 according to Embodiment 9, use of content is managed with use of user information indicating a user using a plurality of terminal devices. According to Embodiment 3, the judgment of whether to permit storing of content is performed with use of the terminal device management information. However, according to Embodiment 9, the judgment of whether to permit storing of content is performed with use of both the terminal device management information and the user information.

The server device stores user management information in advance. The user management information indicates a user ID identifying a user, in correspondence with terminal device identifiers identifying the terminal devices of the user.

Upon receiving a request for storing content from one of the terminal devices of a user, the server device judges, for each of the terminal devices, whether the terminal device is permitted to use the content. Specifically, the server device makes this judgment by comparing the identifiers of the respective terminal devices to the terminal device identifiers in the terminal device management information. If any of the terminal devices of the user is not permitted to use the content, the server device restricts storing of the content into the recording medium device connected to the terminal device.

The following describes only the difference between the content management system 7 and the content management system according to Embodiment 3.

9-2. Structure

Figure 32:
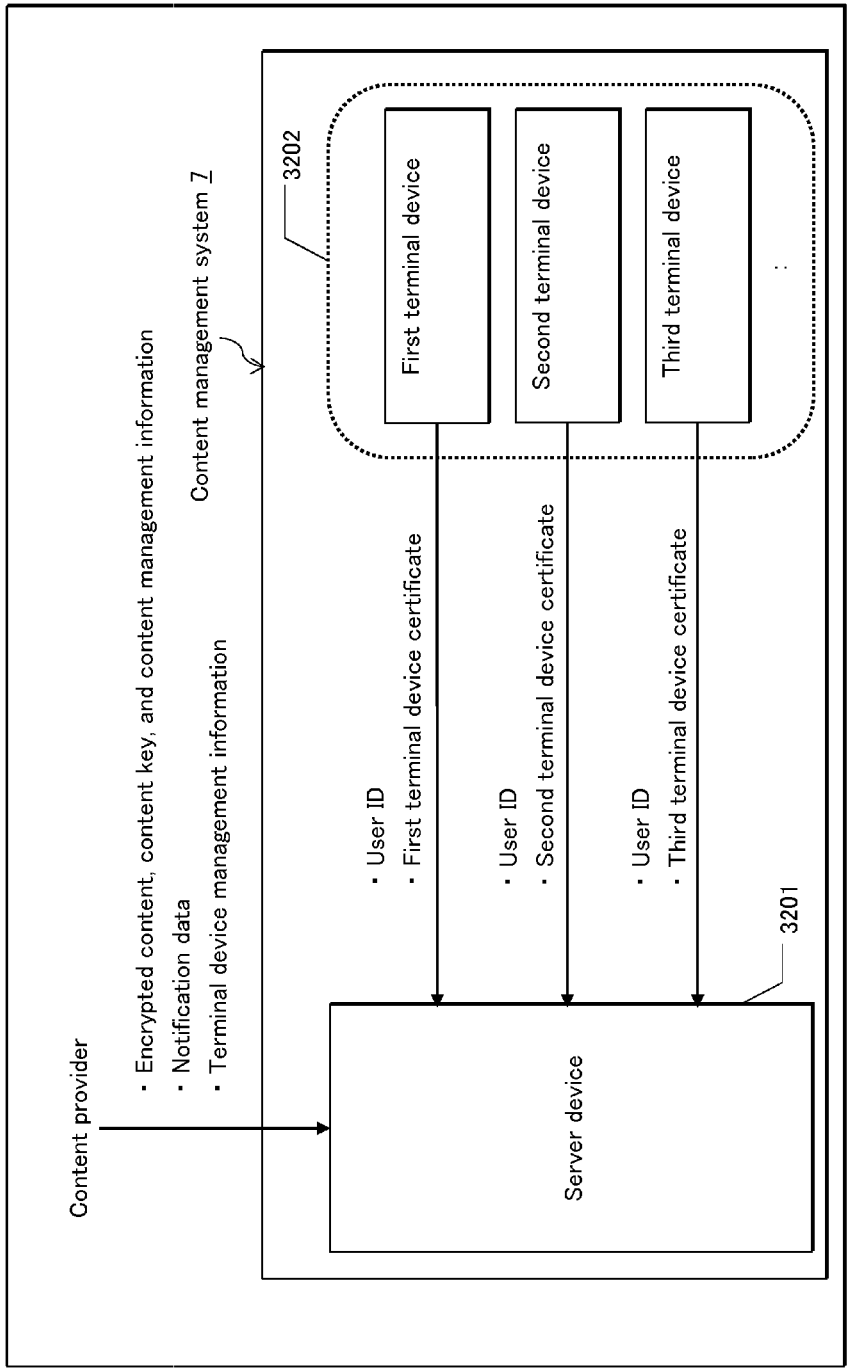
FIG. 32 schematically shows the structure of a content management system 7 according to Embodiment 9.
Figure 33:
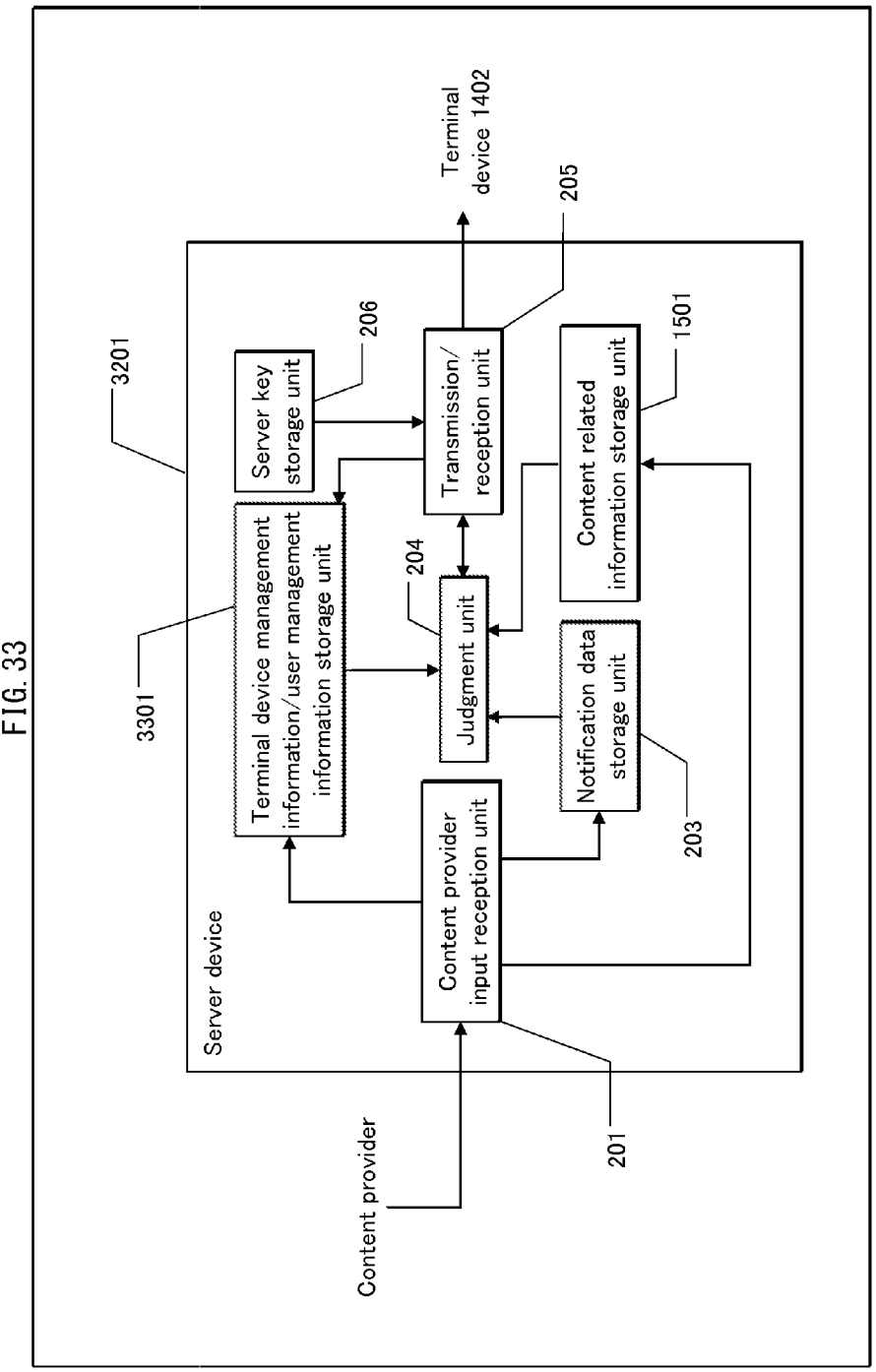
FIG. 33 is a functional block diagram showing the structure of a server device 3201.

FIG. 32 schematically shows the structure of the content management system 7.

The content management system 7 includes: a server device 3201; and a terminal device group 3202 including a plurality of terminal devices 1402.

The server device 3201 differs from the server device 1401 in including a terminal device management information/user management information storage unit 3301 instead of the terminal device management information storage unit 202. The terminal device management information/user management information storage unit 3301 stores the terminal device management information and the user management information.

The terminal device group 3202 is a group of terminal devices used by the same user. The terminal device identifiers of the terminal devices included in the terminal device group 3202 are associated with one user ID and stored in the user management information.

FIG. 34 shows an example of user management information 3401 stored in the terminal device management information/user management information storage unit 3301. The user management information 3401 is a management table for managing a user ID and terminal device identifiers in correspondence with each other.

The item "user ID" indicates a user ID identifying a user. The item "terminal device identifier" indicates terminal device identifiers identifying terminal devices used by the user identified by the user ID.

In FIG. 34, a user A having a user ID 0x11 . . . 620 is associated with three terminal devices, i.e., terminal devices having terminal device identifiers 0x3A . . . 5F2, 0xB2 . . . 892, and 0x20 . . . 011, and these terminal devices are owned by the user A.

First to third terminal devices included in the terminal device group 3202 basically have the same structure as the terminal device 1402, and are therefore provided with the same reference sign as the terminal device 1402 for the convenience of description. The first to third terminal devices each differ from the terminal device 1402 in further transmitting, to the server device 3201, the user ID of the user who uses the terminal device.

Suppose that one of the terminal devices 1402 has requested for storing content and the judgment unit 204 of the server device 3201 judges that the terminal device 1402 is permitted to use the content, based on the terminal device management information. Even in such a case, if one of the terminal devices identified by the user ID that has been received is not permitted to use the content, the judgment unit 204 does not permit storing of the content unless the recording medium device 1403 is fixedly connected to the terminal device 1402 and is not removable therefrom. For example, in the terminal device management information 1601 in FIG. 16, regarding the content with the title "1234" provided by the movie company A, the terminal device identifier "0x3A . . . 5F2" is not included in a group of identifiers identifying terminal devices not permitted to use the content. Accordingly, in the content management system 2 according to Embodiment 3, when the terminal device 1402 having the terminal device identifier "0x3A . . . 5F2" requests the server device 1401 for storing the content with the title "1234", the server device 1401 permits storing of the content.

However, in the present embodiment, the server device 3201 further judges whether to permit storing of the content, with respect to the other terminal devices of the user A who uses the terminal device 1402. In other words, the server device 3201 judges whether any of the terminal device identifiers identifying the terminal devices of the user A is included in the group of identifiers identifying terminal devices not permitted to use the content. For example, in the user management information in FIG. 34, the user A is associated with the terminal device 1402 which has requested use of the content and has the terminal device identifier "0x3A . . . 5F2", and is further associated with the terminal device having the terminal device identifier "0x20 . . . 011". In the terminal device management information 1601 shown in FIG. 16, the terminal device identifier "0x20 . . . 011" is registered as the terminal device identifier of a terminal device not permitted to use the content with the title "1234". Accordingly, the judgment unit 204 of the server device 3201 permits storing of the content only if the recording medium device 1403 is fixedly connected to the terminal device 1402 and is not removable therefrom. Whether or not the recording medium device 1403 is removable can be determined, for example, by the value of a flag bit provided for the recording medium device certificate. The terminal device 1402 sets the flag bit in the recording medium device certificate to "1" when the recording medium device connected to the terminal device 1402 is fixed thereto and is not removable therefrom, and sets "0" when the recording medium device connected to the terminal device is removable therefrom and connectable to another terminal device. Then, the terminal device 1402 transmits, to the server device 3201, the recording medium device certificate with the flag bit thus set. If the flag bit in the recording medium device certificate indicates "1", the judgment unit 204 of the server device 3201 judges that the recording medium device is unconnectable from the terminal device 1402.

9-3. Operations

Figure 35:
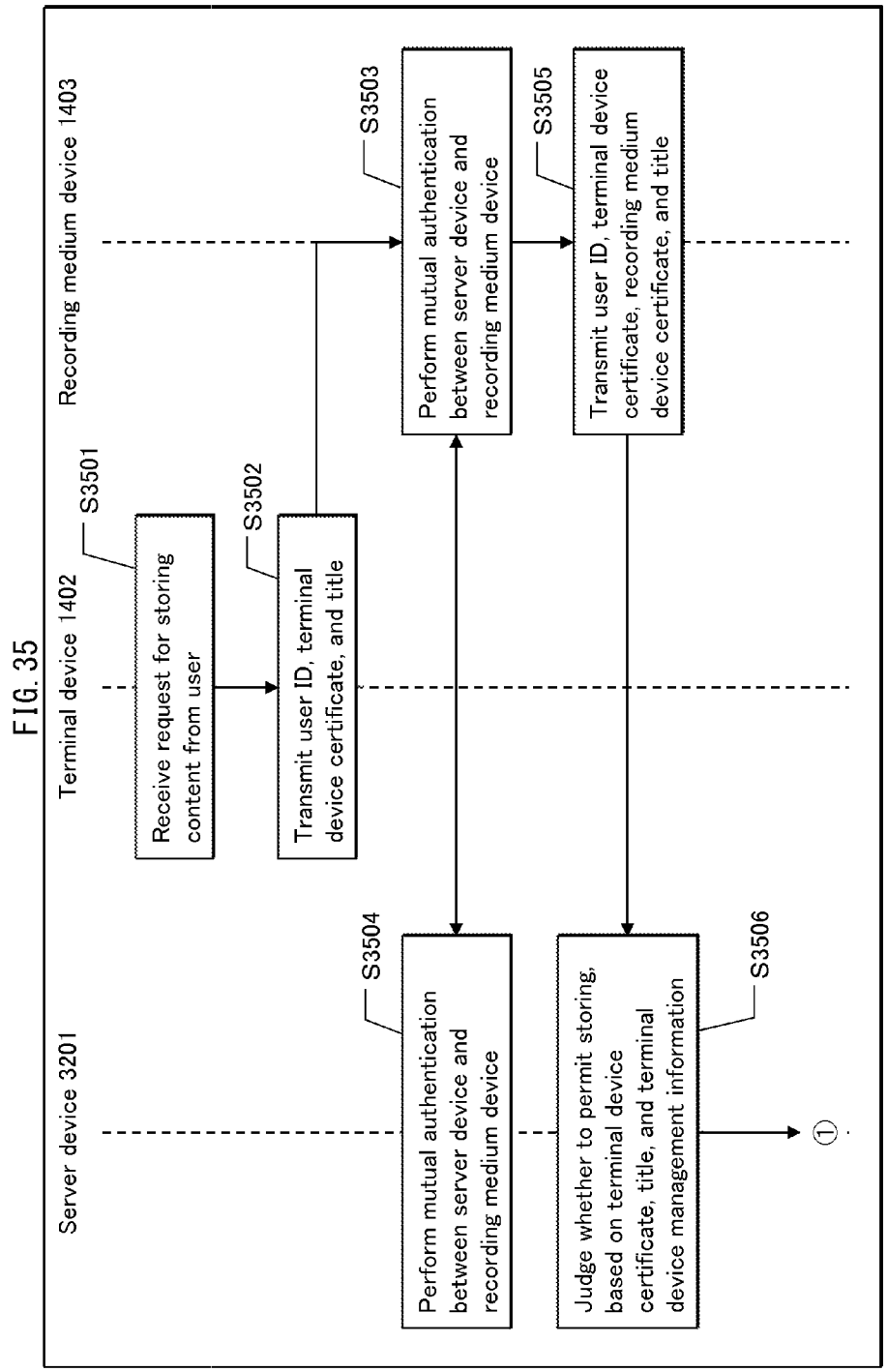
FIG. 35 is a flowchart showing operations at the time of storing content according to Embodiment 9, and is continued to FIG. 36.
Figure 36:
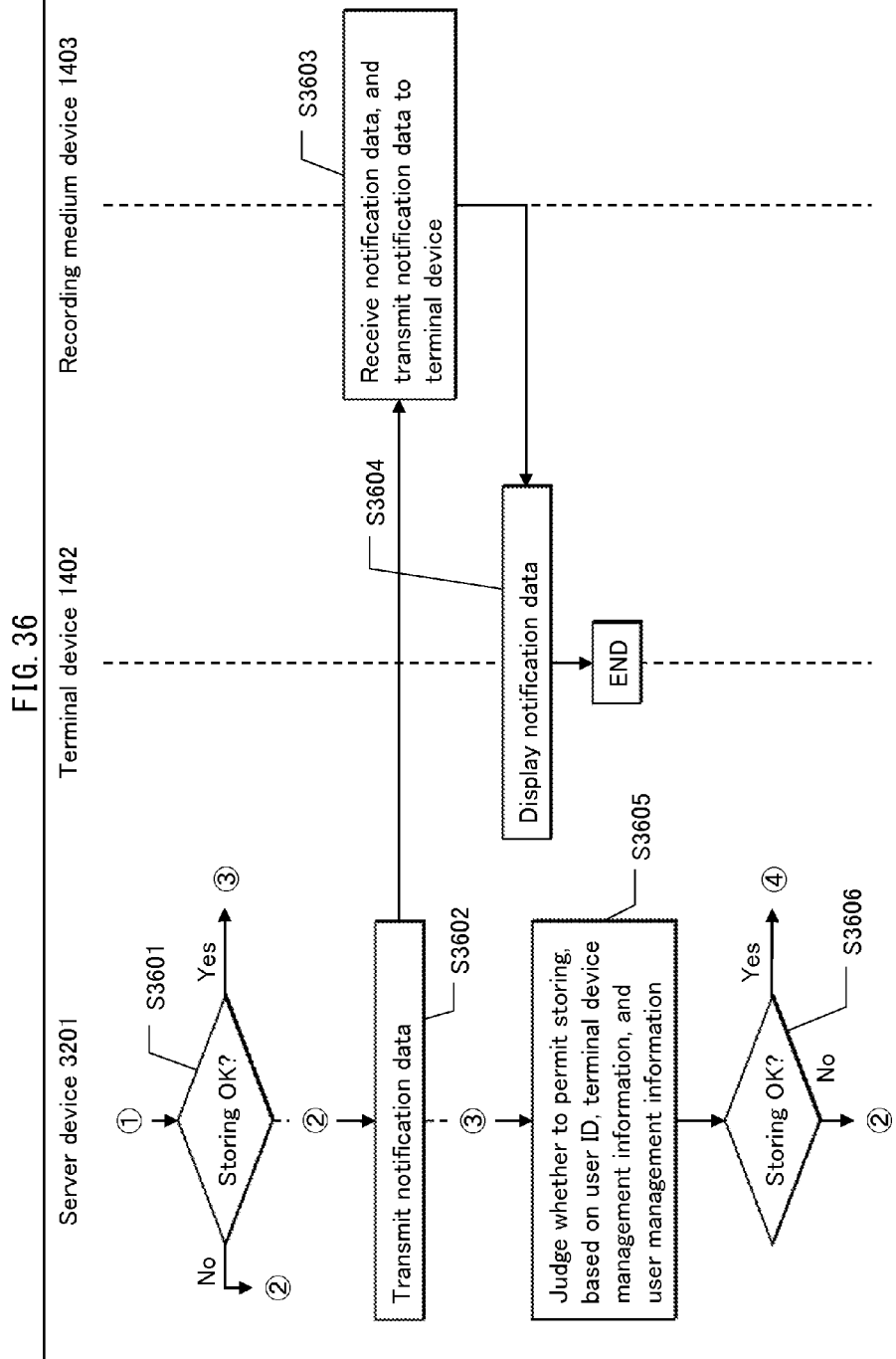
FIG. 36 is a flowchart showing operations at the time of storing content according to Embodiment 9, and is continued from FIG. 35 and to FIG. 37.
Figure 37:
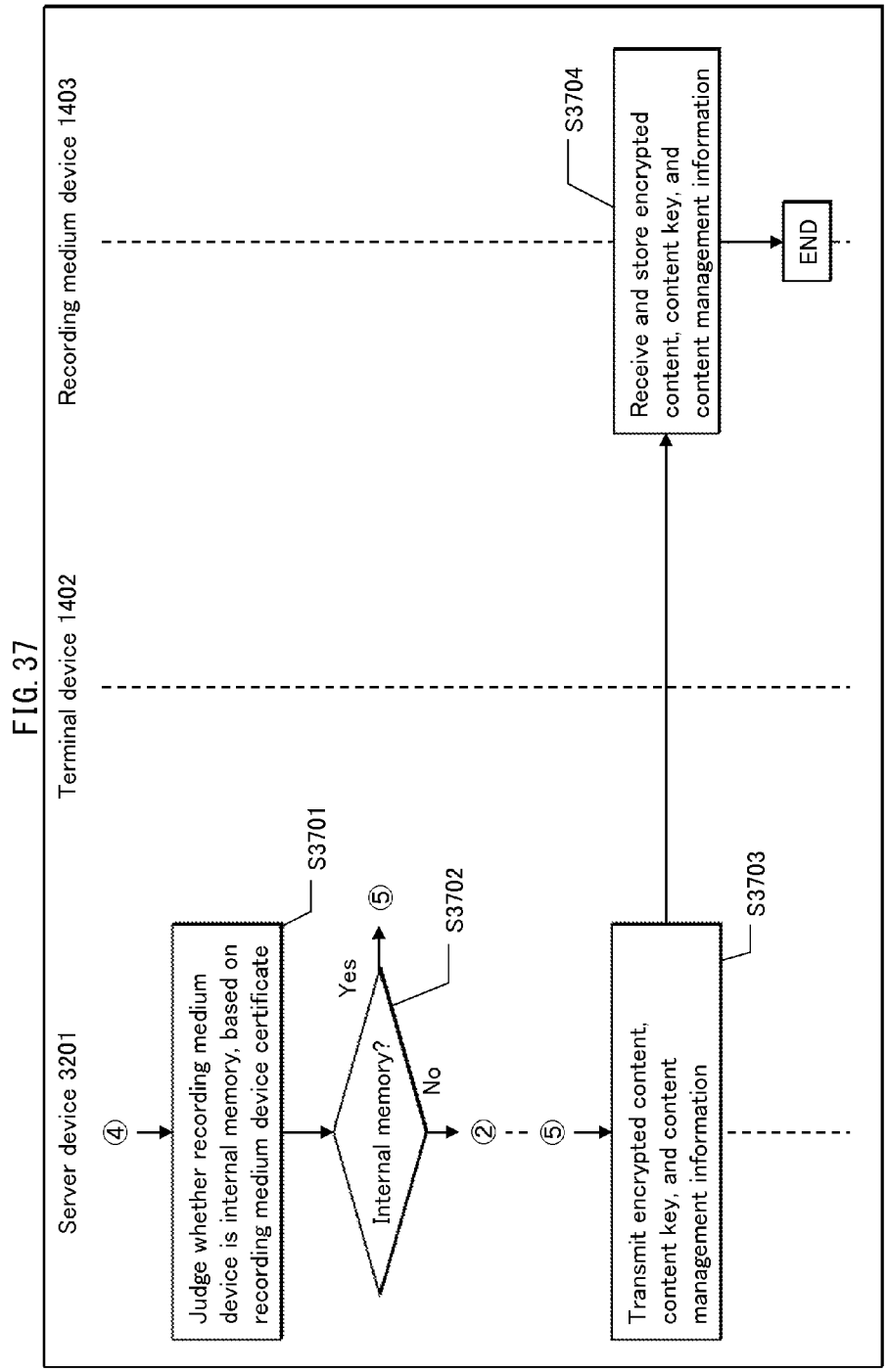
FIG. 37 is a flowchart showing operations at the time of storing content according to Embodiment 9, and is continued from FIG. 36.

The following describes operations of the server device 3201, the terminal device 1402, and the recording medium device 1403 when content is stored into the recording medium device 1403 connected to the terminal device 1402, with reference to the flowcharts of FIGS. 35 to 37.

First, the user input reception unit 303 of the terminal device 1402 receives, from a user, a request for storing the content into the recording medium device 1403 (step S3501).

The transmission/reception unit 306 of the terminal device 1402 transmits a user ID, a terminal device certificate, and the title of the content to the transmission/reception unit 402 of the recording medium device 1403 (step S3502).

The transmission/reception unit 402 of the recording medium device 1403 and the transmission/reception unit 205 of the server device 3201 perform mutual authentication processing and key sharing processing for establishing a secure communication channel (steps S3503 and S3504).

When the secure communication channel is established between the recording medium device 1403 and the server device 3201, the transmission/reception unit 402 of the recording medium device 1403 transmits the user ID, the terminal device certificate, and the title of the content to the server device 3201 (step S3505).

The judgment unit 204 of the server device 3201 judges whether to permit storing of the content into the recording medium device 1403 connected to the terminal device 1402, based on the terminal device certificate, the title of the content, and the terminal device management information stored in the terminal device management information/user management information storage unit 3301 (step S3506). Specifically, the judgment unit 204 compares the terminal device identifier included in the terminal device certificate to the terminal device identifiers that are under the item "terminal device identifier" in the terminal device management information 1601 and that correspond to the title of the content. If there is a match, the judgment unit 204 does not permit storing. If there is no match, the judgment unit 204 permits storing.

When not permitting storing of the content (step S3601: No), the judgment unit 204 reads notification data from the notification data storage unit 203. The transmission/reception unit 205 transmits the notification data read by the judgment unit 204 to the recording medium device 1403 (step S3602).

The transmission/reception unit 402 of the recording medium device 1403 receives the notification data, and transmits the notification data to the transmission/reception unit 306 (step S3603).

The transmission/reception unit 306 transmits the notification data to the display unit 301, and the display unit 301 receives and displays the notification data (step S3604).

On the other hand, when permitting storing of the content (step S3601: Yes), the judgment unit 204 further judges whether to permit storing of the content into the recording medium device 1403, based on the user ID, the terminal device certificate, the title of the content, the terminal device management information 1601, and the user management information 3401 (step 3605). Specifically, the judgment unit 204 compares (i) each of the terminal device identifiers that identify the terminal devices of the user identified by the user ID, and that are registered in the user management information 3401 to (ii) the terminal device identifiers that identify terminal devices not permitted to use the content with the received title, and that are registered in the terminal device management information 1601, and judges whether there is a match. If there is at least one match, the judgment unit 204 does not permit storing of the content into the recording medium device 1403. If there is no match, the judgment unit 204 permits storing of the content.

When the judgment unit 204 does not permit storing of the content into the recording medium device 1403 (step S3606: No), steps S3602 to S3604 are performed.

On the other hand, when permitting storing of the content into the recording medium device 1403 (step S3606: Yes), the judgment unit 204 further verifies, based on the recording medium device certificate, whether the recording medium device 1403 is fixed to the terminal device 1402 and is not removable therefrom (step S3701). Specifically, when the value of the flag bit in the recording medium device certificate is "1", the judgment unit 204 judges that the recording medium device 1403 is not removable. When the value of the flag bit is "0", the judgment unit 204 judges that the recording medium device 1403 is removable from the terminal device 1402 and is connectable to a terminal device other than the terminal device 1402.

When the judgment unit 204 judges that the recording medium device 1403 is not an internal memory and is removable from the terminal device 1402 (step S3702: No), steps S3602 to S3604 are performed.

On the other hand, when the judgment unit 204 judges that the recording medium device 1403 is an internal memory and is not removable from the terminal device 1402 (step S3702: Yes), the transmission/reception unit 205 transmits, to the transmission/reception unit 402, the encrypted content, the content key, and the content management information stored in the content related information storage unit 1501 (step S3703).

Upon receiving the encrypted content, the content key, and the content management information, the transmission/reception unit 402 transmits these pieces of information to the reading/writing unit 403. The reading/writing unit 403 stores the content key into the protected region 405 of the storage unit 400, and the encrypted content and the content management information into the regular region 406 (step S3704).

9-4 Summary

In the content management system 7, judgment is made as to whether any of the terminal devices of a user is not permitted to use content, with use of the user management information that indicates, for each user, one or more terminal devices used by the user. If at least one of the terminal devices is judged to be not permitted to use the content, use of the content is limited even when a request for use of the content is made by a terminal device permitted to use the content from among the terminal devices of the user. In the example given in the present embodiment, storing of content is permitted only when the recording medium device attempting to store the content is fixedly connected to the terminal device and cannot be used in another terminal device. This prevents the content stored in the recording medium device from being used in another terminal device not permitted to use the content.

<Modifications>

Although the content management system according to the present invention has been described based on the embodiments, the present invention is not limited to the content management system described in the above embodiments. For example, the content management system may be modified as follows.

(1) In the above embodiments, the notification data displayed by the terminal device indicates that use of the content is not permitted, and also indicates contact information. However, the notification data is not limited to such. For example, as shown in FIG. 38, the notification data may be a message that encourages the user to update a software program in order to use the content in the terminal device. The terminal device can use the content after updating the software program. Furthermore, the terminal device certificate of the terminal device may be updated as well in accordance with the update of the software program.

Alternatively, for example, the notification data may indicate a method for obtaining permission to use content. Such a method may be a message that encourages the user to purchase a license for use of the content.

(2) In the above embodiments, the notification data is text data to be displayed by the terminal device. However, the notification data is not necessarily text data.

It suffices for the notification data to indicate information intended by a content provider to users. For example, the notification data may be audio data or image data.

(3) In the above embodiments, the attributes of contents to be associated with the types of notification data are titles or content providers. However, the attributes are not limited to such. The attributes may be any pieces of information as long as they are related to the contents. For example, the attributes associated with the types of notification data may be the types of windows, resolutions, or content usage periods that are each a period in which use of content is permitted. Also, these different attributes may be combined to be associated with the types of notification data.

The content management information of the recording medium device may include, for each content, information corresponding to the attribute of the content. The terminal device may refer to the content management information, and transmit, to the server device, a request for using content, and the information corresponding to the attribute of the content pertaining to the request. When not permitting use of the content, the server device can select which notification data to transmit, based on the information transmitted from the terminal device.

(4) In the above embodiments, each content providers may manage at least one provision device that provides notification data and terminal device management information, connect to the server device with use of the provision device, and set the terminal device management information to the server device. The at least one provision device may comprise a plurality of devices such as a notification data provision device and a terminal device management information provision device. Each of the content providers may update data stored in his/her own provision device, and thereby promptly and easily updating the notification data and the terminal device management information stored in the server device.

(5) According to Embodiments 1 and 2, the judgment of whether to permit a terminal device to use content is performed with use of revocation information (i.e., terminal device management information) indicating, for each content provider name, terminal identifiers identifying terminal devices not permitted to use the content. However, the revocation information does not always need to associate the content provider names with terminal device identifiers. That is, it suffices for the revocation information to associate any information related to contents with terminal device identifiers.

For example, as shown in Embodiment 3, the revocation information may indicate the titles of the contents. Alternatively, the revocation information may indicate content provider identifiers each uniquely identifying a content provider. Yet alternatively, the revocation information may indicate terminal device manufacturers or product types.

(6) According to Embodiments 3 to 9, the judgment of whether to permit a terminal device to use content is performed with use of the revocation information indicating, for each title of contents, terminal identifiers identifying terminal devices not permitted to use the content corresponding to the title. However, the judgment of whether to permit use of content does not always need to be performed based on the revocation information.

For example, it is possible to judge that use of content is not permitted, when any of the following conditions is satisfied: (i) the content is owned by a particular content provider; (ii) the content is early window content; and (iii) the resolution of the content is full HD (FHD).

Also, the judgment of whether to permit use of content may be performed based on a route via which the content is acquired (e.g., distribution service, copying from a package medium, recording of a broadcast program, etc). In this case, use of the content is not permitted if the content is acquired via a particular route.

Also, it is possible to judge that use of content is not permitted for a certain period, or conversely, judge that use of content is permitted only for a certain period.

Furthermore, the notification data may differ for each of the conditions used for the judgment of whether to permit use of content. When use of the content is not permitted, the server device may transmit the notification data corresponding to the condition used for the judgment.

(7) In the above embodiments, an authentication method using a key pair consisting of a private key and a public key is used to establish a secure communication channel between any two of the server device, the terminal device, and the recording medium device. However, a different authentication method may be used to establish a secure communication channel. For example, an authentication technology using another cryptosystem, such as MKB (Media Key Block) technology, can be used as long as it can establish a secure communication channel.

(8) According to Embodiment 9, the server device judges whether the recording medium device for storing content is fixedly connected to the terminal device and is not removable therefrom. If judging that the recording medium device is not fixedly connected to the terminal device (i.e., is removable from the terminal device), the server device does not permit storing of content. However, a different condition may be used for the judgment of whether to permit storing of content.

For example, even if the recording medium device is removable from the terminal device and can be used in a different terminal device, storing of content may still be permitted if the resolution of the content is low. Also, suppose that content is permitted to be stored into a recording medium device usable in a different terminal device. In this case, even if the content does not originally require a terminal device to connect to the server device before the terminal device attempts to play back the content, the terminal device may connect to the server device each time the terminal device attempts to play back the content, so that the server device can judge whether to permit use of the content.

(9) In the above embodiments, data pertaining to content, which is stored in the recording medium device, includes encrypted content and a content key. However, the data is not limited to encrypted content and a content key.

For example, if the content is a commercially valuable content, such as early window content, only encrypted content corresponding to the content may be stored. Then, when the content is to be played back, a content key for decrypting the encrypted content may be transmitted by the server device.

This structure reduces the possibility of the content being used without authorization, since the content key for decrypting the encrypted content is not stored in the recording medium device.

(10) Either the terminal device or the recording medium device may include: a notification data storage unit; a control data storage unit; and a playback permission judgment unit. The control data storage unit stores control data used to judge whether to permit use of content. The playback permission judgment unit judges whether to permit playback of content. The control data stored in the terminal device or the recording medium device may be control data 3901 as shown in FIG. 39.

The control data 3901 indicates, for each content stored in the recording medium device, the following information pieces in correspondence with each other: a title; a content provider name; a server connection requirement; a content acquisition method; a notification data display requirement; playback permission; resolution; and a window.

For example, suppose that the user has selected playback of the content with the title "1234" provided by the movie company B. In this case, the playback permission judgment unit, which judges whether to permit playback of content, refers to the control data 3901 and checks the following information pieces regarding the content with the title "1234": the server connection requirement; the notification data display requirement; and playback permission. Then, according to these information pieces, the playback permission unit does not connect to the server device, and displays the notification data stored in the notification data storage unit. Thereafter, the playback permission unit permits playback of the content.

As described above, when it is judged that connection to the server device is not necessary or when connection to the server cannot be established, use of content may be controlled based on the control data stored in either the terminal device or the recording medium device.

(11) In the above embodiments, upon receiving, from the server device, the permission information indicating that use of content is permitted, the recording medium device judges whether the permission information is tampered with by verifying the random number generated by the recording medium device itself. However, the judgment of tampering may be performed with use of information other than a random number. For example, it is possible to use a hash value of the recording medium device certificate or a hash value of the private key included in the recording medium device certificate. Alternatively, it is possible to use data obtained by providing a signature to any combination of a content provider name, a content provider identifier, a title, a title identifier, and so on. As described above, the information used for the judgment of tampering may be any data as long as the data allows the recording medium device to detect whether the information from the server device has been tampered with while being transmitted via a communication channel.

(12) The items in the content management information in the above embodiments are merely an example and not intended to limit the scope of the invention. For example, time-related information, such as the time period during which use of content is permitted or the time elapsed since a reference time point, may be used as an item in the content management information. The time-related information may be used as one of the conditions to judge whether to permit use of content.

This structure of using the time-related information to judge whether to permit use of content is applicable to a content rental service.

Also, in the above embodiments, before content is used, an inquiry is made once to the server device as to whether use of the content is permitted. However, the inquiry to the server device may be made multiple times during use of the content, such as during playback of the content.

(13) In the above embodiments, the server device compares the terminal device identifier to terminal identifiers in the revocation information (i.e., terminal device management information), and judges whether to permit use of content. However, the judgment regarding use of content is not necessarily performed with use of the terminal device identifiers.

For example, the judgment may be performed with use of a recording medium device identifier uniquely identifying a recording medium device and revocation information indicating recording medium devices not permitted to use content, so as to compare the recording medium device identifier to the recording medium device identifiers in the revocation information. Alternatively, the judgment may be performed with use of both the terminal device identifier and the recording medium identifier, so as to compare the terminal device identifier and the recording medium device identifier to the terminal device identifiers indicated in the corresponding revocation information and the recording medium device identifiers indicated in the corresponding revocation information, respectively.

Alternatively, the server device may transmit, to the terminal device, a program for checking a security level of the terminal device, so that the terminal device can use content. For example, the program may check the version of a software program of the terminal device, whether an update program has been installed or not, or whether a virus check software program has been installed or not. When being installed in the terminal device, the program may judge whether to permit use of the content and control the terminal device.

(14) The server device in the above embodiments may include an analysis unit for analyzing, for each terminal device connected to the server device or for each terminal device manufacturer, the number of times use of content was not permitted or the number of times the notification data was transmitted.

This enables ranking the terminal device manufacturers based on the number of times use of content was not permitted, and flexibly determining whether to permit use of content, depending on the rank of each terminal device manufacturer. For example, suppose that terminal devices made by a certain manufacturer were denied permission to use content a great number of times. In this case, these terminal devices are likely to allow a malicious attacker to fraudulently use contents without difficulty. Accordingly, it is possible to set such that the server device restricts use of content in the terminal devices made by this manufacturer.

(15) In Embodiment 9, the recording medium device certificate includes the flag bit so as to judge whether the recording medium device is fixed to the terminal device and is not removable therefrom. However, it is not limited to such.

For example, the recording medium identifier may be data consisting of multiple bits, and a particular bit (e.g., most significant bit) out of the multiple bits may be used to make the above judgment. Specifically, if the bit indicates "1", it may be judged that the recording medium device is fixed to the terminal device. If the bit indicates "0", it may be judged that the recording medium device is a portable recording medium device. As described above, the information used to make the above judgment is sufficient as long as it indicates whether the recording medium device is fixed to the terminal device or not.

(16) The user ID of a user according to Embodiment 9 is not limited to an arbitrary numeral sign as shown in FIG. 34. For example, the user ID may be the name of the user, the user account for the user to use a content service, a credit card number of the user, or the like. To sum up, it suffices for the user ID to be information that uniquely identifies the user. Also, the user ID may be a combination of these information pieces.

(17) According to the above embodiments, the recording medium device can be a memory card such as an SD card. However, the recording medium device is not limited to such.

For example, the recording medium device may be a combination of a storage device (e.g., HDD) and a control LSI. Alternatively, the recording medium device may not be a removable medium such as a memory card, but may be a combination of a control LSI and a non-removable memory device that is built in a mobile telephone, a computer, or the like.

(18) Part or all of the components described in the above embodiments may be realized as integrated circuits each consisting of one or more chips, as a computer program, or as any other forms.

The components described in the above embodiments cooperate with the processors of the server device, the terminal device, and the recording medium device, and thereby realize their functions.

(19) The present invention may be the above-described method. The present invention may be a computer program that realizes the method with a computer or may be a digital signal including the computer program.

The present invention may be a computer-readable recording medium storing thereon the computer program or the digital signal. Such a computer-readable recording medium may be a flexible disk, a hard disk, a CD-ROM, an MO, a DVD, a DVD-ROM, a DVD-RAM, a BD (Blu-ray Disc™), or a semiconductor memory. The present invention may also be the computer program or the digital signal stored on the recording medium.

The present invention may also be the computer program or the digital signal transmitted via an electric communication line, a wireless or wired communication line, a network of which the Internet is representative, a data broadcast or the like.

(20) The above embodiments and modifications may be combined with one another.

(21) The following describes the structure of a content management system as an embodiment of the present invention, and also describes modifications and effects thereof.

(a) One aspect of the present invention is a content management system including: a recording medium for storing content; a terminal device for using the content; and a server for communicating with the terminal device and judging whether to permit use of the content, the server comprising: a notification storage unit storing notifications to be presented to a user of the terminal device; a usage permission judgment unit configured to receive, from the terminal device, (i) a request for permission to use the content and (ii) information necessary for judgment of whether to permit use of the content, and to judge whether to permit use of the content based on the request and the information; and a communication unit configured to transmit, to the terminal device, information necessary for use of the content when the usage permission judgment unit judges affirmatively, and to transmit, to the terminal device, a corresponding one of the notifications when the usage permission judgment unit judges negatively, the recording medium comprising a request unit configured to output, to the terminal device, the request and the information necessary for the judgment of whether to permit use of the content, and the terminal device comprising: a transmission/reception unit configured to transmit the request and the information necessary for the judgment to the server, and receive either the information necessary for use of the content or the notification from the server; and a presentation unit configured to present the notification.

Note that the server and the terminal device described above respectively correspond to the server device and the terminal device according to the above embodiments. Also, the notification storage unit, the usage permission judgment unit, the communication unit, the request unit, the transmission/reception unit, and the presentation unit correspond to the notification data storage unit 203, the judgment unit 204, the transmission/reception unit 205, the judgment unit 404, the transmission/reception unit 306, and the display unit 301, respectively.

According to the above content management system, the terminal device connects to the server, and the server judges whether to permit use of the content. This prevents unauthorized use of the content in the terminal device by flexibly responding to various situations in which the content is used without authorization. When not permitting use of the content, the server transmits, to the terminal device, the notification intended for the user. The terminal device receives the notification from the server, and presents the notification to the user.

(b) The notifications may correspond to attributes of contents. The communication unit may be further configured to receive the request for permission to use the content, and, as the information necessary for the judgment, information that includes the attribute of the content, and transmit the notification corresponding to the attribute of the content when the usage permission judgment unit judges negatively.

According to the content management system having the above structure, upon receiving the request for permission to use the content from the terminal device, the server transmits the notification corresponding to the attribute of the content, from among the notifications stored in the notification storage unit.

(c) The attributes of the contents may be titles of the contents, and the communication unit may receive the title of the content corresponding to the request, as the attribute of the content.

According to the content management system having the above structure, upon receiving the request for permission to use the content from the terminal device, the server transmits the notification corresponding to the title of the content, from among the notifications stored in the notification storage unit.

(d) The server may further comprise a revocation information storage unit storing, for each content, revocation information indicating the attribute of the content and one or more revoked terminal devices not permitted to use the content. The information necessary for the judgment of whether to permit use of the content, transmitted by the transmission/reception unit to the server, may include the attribute of the content corresponding to the request, and terminal device information for identifying a terminal device. The usage permission judgment unit may judge negatively with respect to the request, if the terminal device identified by the terminal device information is indicated by the revocation information corresponding to the content pertaining to the request, and judge affirmatively with respect to the request if the terminal device identified by the terminal device information is not indicated by the revocation information The communication unit may transmit the notification corresponding to the attribute of the content to the terminal device that has transmitted the request, when the usage permission judgment unit judges negatively with respect to the request.

According to the content management system having the above structure, the server judges whether to permit use of the content, based on the revocation information indicating one or more revoked terminal devices not permitted to use the content.

(e) Also, the server may further comprise a user device management information storage unit storing user device management information indicating, for each of users, one or more terminal devices used by the user. The transmission/reception unit may be further configured to transmit user information for identifying a user to the server. The usage permission judgment unit may further refer to the user device management information, verify whether any of terminal devices of the user identified by the user information is indicated by the revocation information corresponding to the content pertaining to the request, and judge negatively with respect to the request when at least one of the terminal devices of the user is indicated by the revocation information.

According to the content management system having the above structure, the server manages, for each user, one or more terminal devices used by the user. If any of the terminal devices of a user is not permitted to use content, the other one or more terminal devices of that user can be restricted from using the content.

(f) When the following conditions are satisfied: the terminal device identified by the terminal device information is not indicated by the revocation information corresponding to the content pertaining to the request; and the recording medium is unconnectable to a terminal device other than the terminal device, then even if any of the terminal devices that belong to the user identified by the user information and that are indicated by the user device management information is indicated by the revocation information, the usage permission judgment unit may judge affirmatively as an exception with respect to the request.

According to the content management system having the above structure, even if a user owns a terminal device not permitted to use content, the server device permits use of the content as long as the following conditions are satisfied: the user uses the content in a terminal device permitted to use the content; and the recording medium is connected to the terminal device permitted to use the content and cannot be used in any other terminal devices.

(g) The recording medium may further comprise: a data storage unit storing revocation information for identifying one or more revoked terminal devices not permitted to use the content pertaining to the request, and a notification to be presented to the user of the terminal device; a permission judgment unit configured to judge whether to permit use of the content; and a transmission unit configured to transmit the notification. The permission judgment unit may judge negatively, when the permission judgment unit cannot exchange data with the server, and the terminal device identified by the terminal device information is indicated by the revocation information stored in the data storage unit. When the permission judgment unit judges negatively, the transmission unit may transmit, to the terminal device to which the recording medium is connected, the notification stored in the data storage unit.

According to the content management system having the above structure, the recording medium stores the revocation information and the notification. When not being able to exchange data with the server, the recording medium judges whether to permit use of the content, based on the information stored in the recording medium itself, and transmits the notification to the terminal device when not permitting use of the content.

(h) The request may be for playing back the content in the terminal device. The recording medium may further comprise: a content data storage unit configured to store encrypted content and a content key, the encrypted content being generated through encryption of the content, and the content key being for decrypting the encrypted content; a server connection judgment unit configured to judge whether to transmit the request to the server; and a transmission unit configured to transmit the encrypted content and the content key to the terminal device, when the server connection judgment unit judges negatively. When the server connection judgment unit judges affirmatively, the transmission/reception unit of the terminal device may transmit, to the server, the request and the information necessary for judgment of whether to permit use of the content, the information including the attribute of the content and the terminal device information. When the usage permission judgment unit judges affirmatively, the communication unit may transmit, as the information necessary for use of the content, information indicating permission for the terminal device to play back the content. When the transmission/reception unit receives the information indicating permission for the terminal device to play back the content, the transmission unit may transmit the encrypted content and the content key to the terminal device. Upon receiving the content key and the encrypted content, the terminal device may decrypt the encrypted content with use of the content key and thereby obtains the content, and plays back the content thus decrypted.

According to the content management system having the above structure, when the server permits the terminal device to use the content, the terminal device decrypts the encrypted content transmitted from the recording medium connected thereto, obtains the content resulting from the decryption, and plays back the content.

(i) The request may be for permission to store, into the recording medium, encrypted content and a content key stored in the server, the encrypted content being generated through encryption of the content, and the content key being for decrypting the encrypted content. The server may further comprise a content data storage unit storing the encrypted content and the content key. When the usage permission judgment unit judges affirmatively with respect to the request, the communication unit may transmit the encrypted content and the content key. Upon receiving the encrypted content and the content key, the recording medium may store the encrypted content and the content key.

According to the content management system, when permitting the recording medium to store the content, the server transmits the encrypted content and the content key stored therein to the recording medium. The recording medium receives and stores therein the encrypted content and the content key.

(j) The recording medium may be connected to the terminal device. The request may be for moving data necessary for use of the content from the recording medium to a different recording medium, the different recording medium being connected to a different terminal device that exchanges data with the terminal device. The terminal device may further comprise an inter-terminal transmission/reception unit configured to exchange data with the different terminal device. The different terminal may comprise an inter-terminal transmission/reception unit configured to exchange data with the terminal device. The inter-terminal transmission/reception unit of the terminal device may receive terminal device information for identifying the different terminal device. The terminal device information, included in the information necessary for the judgment of whether to permit use of the content and transmitted by the transmission/reception unit of the terminal device, may be the terminal device information for identifying the different terminal device. When the usage permission judgment unit judges affirmatively with respect to the request, the communication unit may transmit, to the transmission/reception unit of the terminal device, information indicating permission to move the content from the recording medium to the different recording medium, and when the usage permission judgment unit judges negatively with respect to the request, the communication unit may transmit the notification corresponding to the attribute of the content. When the information indicating permission to move the content is received by the transmission/reception unit, the inter-terminal transmission/reception unit of the terminal device may move, to the different recording medium, encrypted content and a content key each corresponding to the content, and, when the transmission/reception unit receives the notification, the inter-terminal transmission/reception unit may transmit the notification to the presentation unit of the terminal device, instead of moving the encrypted content and the content key to the different recording medium. The presentation unit may present the notification.

According to the content management system having the above structure, when the server receives the request for moving the content from the terminal device and grants the request, the data that pertains to the content and that is stored in the recording medium connected to the terminal device is moved from the recording medium to the different recording medium connected to the different terminal device.

(k) The server may further comprise a revocation information storage unit storing revocation information indicating one or more revoked terminal devices not permitted to use the content. The information necessary for the judgment of whether to permit use of the content, transmitted by the transmission/reception unit to the server, may include terminal device information for identifying a terminal device. The usage permission judgment unit may judge negatively with respect to the request, if the terminal device identified by the terminal device information is indicated by the revocation information, and judge affirmatively with respect to the request if the terminal device identified by the terminal device information is not indicated by the revocation information.

According to the content management system having the above structure, the server judges whether to permit the terminal device to use the content, based on the revocation information indicating one or more revoked terminal devices not permitted to use the content.

(l) The server may further comprise a user device management information storage unit storing user device management information indicating, for each of users, one or more terminal devices used by the user. The transmission/reception unit may be further configured to transmit, to the server, terminal device information for identifying a terminal device, and user information for identifying a user. The usage permission judgment unit may verify whether the terminal device identified by the terminal device information is indicated, by the user device management information, as a terminal device of the user identified by the user information, and may judge negatively with respect to the request when the terminal device is not indicated by the user device management information.

According to the content management system having the above structure, the server manages the user device management information for each user. The server uses the user device management information to judge whether the terminal device attempting to use the content is registered as a terminal device of the user who has requested for use of the content. If the terminal device is not registered as a terminal device of the user, the unregistered terminal device can be restricted from using the content.

(m) The server may further comprise an input reception unit configured to receive inputs of notifications each being set by a different content provider, and the notification storage unit may store the notifications received by the input reception unit.

According to the content management system having the above structure, each content provider can provide the server, as necessary, with a notification corresponding to content of the content provider.

(n) One aspect of the present invention is a server for communicating with a terminal device for using content, and judging whether to permit use of the content, the server comprising: a notification storage unit storing notifications to be presented to a user of the terminal device; a usage permission judgment unit configured to receive, from the terminal device, a request for permission to use the content, and judge whether to permit use of the content based on the request; and a communication unit configured to transmit, to the terminal device, information necessary for use of the content when the usage permission judgment unit judges affirmatively, and to transmit, to the terminal device, a corresponding one of the notifications when the usage permission judgment unit judges negatively.

With the above structure, upon receiving the request for permission to use the content from the terminal device, the server device judges whether to permit the terminal device to use the content. When not permitting use of the content, the server transmits the notification to be presented to the user. When permitting use of the content, the server transmits the information necessary for use of the content to the terminal device.

(o) The server may further comprise an input reception unit configured to receive inputs of notifications each being set by a different content provider. The notification storage unit may store the notifications received by the input reception unit.

According to the above structure, each content provider can provide the server, as necessary, with a notification corresponding to content of the content provider.

(p) One aspect of the present invention is a recording medium connected to a terminal device and for storing content used in the terminal device, the recording medium comprising: a content data storage unit configured to store encrypted content and a content key, the encrypted content being generated through encryption of the content, and the content key being for decrypting the encrypted content; a request unit configured to output a request for permission to use the content; and a server connection judgment unit configured to judge whether to transmit the request to the server; and a communication unit configured to exchange data with the terminal device and with the server, wherein the communication unit (i) transmits the encrypted content and the content key to the terminal device, when the server connection judgment unit judges negatively, (ii) transmits, to the server, terminal device information received from the terminal device and for identifying a terminal device, when the server connection judgment unit judges affirmatively, (iii) transmits a notification to the terminal device to which the recording medium is connected, when receiving the notification from the server, and (iv) transmits the encrypted content and the content key to the terminal device to which the recording medium is connected, when receiving information indicating permission to use the content.

According to the above structure, when using the content, the recording medium makes an inquiry to the server as to whether the recording medium is permitted to use the content. When being permitted to use the content, the recording medium receives, from the server, the information necessary for use of the content (i.e., the encrypted content and the content key). When not being permitted to use the content, the recording medium receives the notification from the server. Also, the recording medium transmits either the information necessary for use of the content or the notification to the terminal device, depending on whether use of the content is permitted or not.

(q) The recording medium may further comprise: a data storage unit storing, for each content, revocation information indicating an attribute of the content and one or more revoked terminal devices not permitted to use the content, and a notification to be presented to a user of the terminal device; and a permission judgment unit configured to judge whether to permit use of the content, wherein when the permission judgment unit cannot exchange data with the server, and the terminal device identified by the terminal device information is indicated by the revocation information corresponding to the content pertaining to the request, the permission judgment unit may judge negatively, and when the permission judgment unit judges negatively, the communication unit may transmit, to the terminal device to which the recording medium is connected, the notification stored in the data storage unit.

According to the above structure, the recording medium stores the revocation information and the notification. When not being able to exchange data with the server, the recording medium judges whether to permit use of the content, based on the information stored in the recording medium itself, and transmits the notification to the terminal device when not permitting use of the content.

(r) One aspect of the present invention is a recording medium connected to a terminal device and for storing content used in the terminal device, the recording medium comprising: a content data storage unit configured to store encrypted content and a content key, the encrypted content being generated through encryption of the content, and the content key being for decrypting the encrypted content; a data storage unit storing revocation information for identifying one or more revoked terminal devices not permitted to use the content, and a notification to be presented to a user of the terminal device; a permission judgment unit configured to judge whether to permit use of the content; and a communication unit configured to exchange data with the terminal device. The communication unit receives, from the terminal device, terminal device information for identifying the terminal device. The permission judgment unit judges negatively, when the terminal device identified by the terminal device information is indicated by the revocation information. When the permission judgment unit judges negatively, the communication unit refrains from transmitting the content key to the terminal device. In response to a request from the terminal device, the communication unit transmits the notification stored in the data storage unit.

According to the above structure, the recording medium stores the revocation information and the notification. The recording medium judges whether to permit use of the content based on the information stored in the recording medium itself. When not permitting use of the content, the recording medium refrains from transmitting the content key to the terminal device and transmits the notification to the terminal device.

A content management system according to the present invention is useful, for example, for technology for preventing a terminal device connected to a server device from using content without authorization.

REFERENCE SIGNS LIST 1, 2, 3, 4, 5, 6, 7 content management system
101, 1401, 1901, 2001 server device
102, 1402, 1902, 2003 terminal device
103, 1403, 1903, 2004 recording medium device
202 terminal device management information storage unit
203 notification data storage unit
204, 404 judgment unit
205, 306, 402 transmission/reception unit
301 display unit
400 storage unit
403 reading/writing unit
501, 3801 notification data
601, 1601 terminal device management information
1501 content related information storage unit
3401 user management information

The invention claimed is:

1. A content management system including: a recording medium for storing content; a terminal device for using the content; and a server for communicating with the terminal device and judging whether to permit use of the content,
the server comprising:
a notification storage unit storing notifications to be presented to a user of the terminal device;
a usage permission judgment unit configured to receive, from the terminal device, (i) a request for permission to use the content and (ii) information necessary for judgment of whether to permit use of the content, and to judge whether to permit use of the content based on the request and the information; and
a communication unit configured to transmit, to the terminal device, information necessary for use of the content when the usage permission judgment unit judges affirmatively, and to transmit, to the terminal device, a corresponding one of the notifications when the usage permission judgment unit judges negatively,
the recording medium comprising
a request unit configured to output, to the terminal device, the request and the information necessary for the judgment of whether to permit use of the content, and
the terminal device comprising:
a transmission/reception unit configured to transmit the request and the information necessary for the judgment to the server, and receive either the information necessary for use of the content or the notification from the server; and
a presentation unit configured to present the notification, wherein
the notifications correspond to attributes of contents,
the communication unit is further configured to receive the request for permission to use the content, and, as the information necessary for the judgment, information that includes the attribute of the content, and transmit the notification corresponding to the attribute of the content when the usage permission judgment unit judges negatively,
the server further comprises a revocation information storage unit storing, for each content, revocation information indicating the attribute of the content and one or more revoked terminal devices not permitted to use the content,
the information necessary for the judgment of whether to permit use of the content, transmitted by the transmission/reception unit to the server, includes the attribute of the content corresponding to the request, and terminal device information for identifying a terminal device, the usage permission judgment unit judges negatively with respect to the request, if the terminal device identified by the terminal device information is indicated by the revocation information corresponding to the content pertaining to the request, and judges affirmatively with respect to the request if the terminal device identified by the terminal device information is not indicated by the revocation information, and the communication unit transmits the notification corresponding to the attribute of the content to the terminal device that has transmitted the request, when the usage permission judgment unit judges negatively with respect to the request.

2. The content management system of claim 1, wherein the attributes of the contents are titles of the contents, and the communication unit receives the title of the content corresponding to the request, as the attribute of the content.

3. The content management system of claim 1, wherein the server further comprises a user device management information storage unit storing user device management information indicating, for each of users, one or more terminal devices used by the user, the transmission/reception unit is further configured to transmit user information for identifying a user to the server, and the usage permission judgment unit further refers to the user device management information, verifies whether any of terminal devices of the user identified by the user information is indicated by the revocation information corresponding to the content pertaining to the request, and judges negatively with respect to the request when at least one of the terminal devices of the user is indicated by the revocation information.

4. The content management system of claim 3, wherein when the following conditions are satisfied: the terminal device identified by the terminal device information is not indicated by the revocation information corresponding to the content pertaining to the request; and the recording medium is unconnectable to a terminal device other than the terminal device, then even if any of the terminal devices that belong to the user identified by the user information and that are indicated by the user device management information is indicated by the revocation information, the usage permission judgment unit judges affirmatively as an exception with respect to the request.

5. The content management system of claim 1, wherein the recording medium further comprises:

a data storage unit storing revocation information for identifying one or more revoked terminal devices not permitted to use the content pertaining to the request, and a notification to be presented to the user of the terminal device;

a permission judgment unit configured to judge whether to permit use of the content; and a transmission unit configured to transmit the notification, the permission judgment unit judges negatively, when the permission judgment unit cannot exchange data with the server, and the terminal device identified by the terminal device information is indicated by the revocation information stored in the data storage unit, and when the permission judgment unit judges negatively, the transmission unit transmits, to the terminal device to which the recording medium is connected, the notification stored in the data storage unit.

6. The content management system of claim 1, wherein the request is for playing back the content in the terminal device, the recording medium further comprises:

a content data storage unit configured to store encrypted content and a content key, the encrypted content being generated through encryption of the content, and the content key being for decrypting the encrypted content;

a server connection judgment unit configured to judge whether to transmit the request to the server; and a transmission unit configured to transmit the encrypted content and the content key to the terminal device, when the server connection judgment unit judges negatively, when the server connection judgment unit judges affirmatively, the transmission/reception unit of the terminal device transmits, to the server, the request and the information necessary for judgment of whether to permit use of the content, the information including the attribute of the content and the terminal device information, when the usage permission judgment unit judges affirmatively, the communication unit transmits, as the information necessary for use of the content, information indicating permission for the terminal device to play back the content, when the transmission/reception unit receives the information indicating permission for the terminal device to play back the content, the transmission unit transmits the encrypted content and the content key to the terminal device, and upon receiving the content key and the encrypted content, the terminal device decrypts the encrypted content with use of the content key and thereby obtains the content, and plays back the content thus decrypted.

7. The content management system of claim 1, wherein the request is for permission to store, into the recording medium, encrypted content and a content key stored in the server, the encrypted content being generated through encryption of the content, and the content key being for decrypting the encrypted content, the server further comprises a content data storage unit storing the encrypted content and the content key, when the usage permission judgment unit judges affirmatively with respect to the request, the communication unit transmits the encrypted content and the content key, and upon receiving the encrypted content and the content key, the recording medium stores the encrypted content and the content key.

8. The content management system of claim 1, wherein the recording medium is connected to the terminal device, the request is for moving data necessary for use of the content from the recording medium to a different recording medium, the different recording medium being connected to a different terminal device that exchanges data with the terminal device, the terminal device further comprises an inter-terminal transmission/reception unit configured to exchange data with the different terminal device, the different terminal comprises an inter-terminal transmission/reception unit configured to exchange data with the terminal device, the inter-terminal transmission/reception unit of the terminal device receives terminal device information for identifying the different terminal device, the terminal device information, included in the information necessary for the judgment of whether to permit use of the content and transmitted by the transmission/reception unit of the terminal device, is the terminal device information for identifying the different terminal device, when the usage permission judgment unit judges affirmatively with respect to the request, the communication unit transmits, to the transmission/reception unit of the terminal device, information indicating permission to move the content from the recording medium to the different recording medium, and when the usage permission judgment unit judges negatively with respect to the request, the communication unit transmits the notification corresponding to the attribute of the content, when the information indicating permission to move the content is received by the transmission/reception unit, the inter-terminal transmission/reception unit of the terminal device moves, to the different recording medium, encrypted content and a content key each corresponding to the content, and, when the transmission/reception unit receives the notification, the inter-terminal transmission/reception unit transmits the notification to the presentation unit of the terminal device, instead of moving the encrypted content and the content key to the different recording medium, and the presentation unit presents the notification.

9. The content management system of claim 1, wherein the server further comprises an input reception unit configured to receive inputs of notifications each being set by a different content provider, and the notification storage unit stores the notifications received by the input reception unit.

10. A server for communicating with a terminal device in a content management system, the content management system including a recording medium for storing content, the terminal device for using the content and the server for judging whether to permit use of the content, the recording medium outputting, to the terminal device, a request and information necessary for the judgment of whether to permit use of the content, the server comprising:

a notification storage unit storing notifications to be presented to a user of the terminal device;

a usage permission judgment unit configured to receive, from the terminal device, a request for permission to use the content, and judge whether to permit use of the content based on the request; and a communication unit configured to transmit, to the terminal device, information necessary for use of the content when the usage permission judgment unit judges affirmatively, and to transmit, to the terminal device, a corresponding one of the notifications when the usage permission judgment unit judges negatively, wherein the notifications correspond to attributes of contents, the communication unit is further configured to receive the request for permission to use the content, and, as the information necessary for the judgment, information that includes the attribute of the content, and transmit the notification corresponding to the attribute of the content when the usage permission judgment unit judges negatively, the server further comprises a revocation information storage unit storing, for each content, revocation information indicating the attribute of the content and one or more revoked terminal devices not permitted to use the content, the information necessary for the judgment of whether to permit use of the content includes the attribute of the content corresponding to the request, and terminal device information for identifying a terminal device, the usage permission judgment unit judges negatively with respect to the request, if the terminal device identified by the terminal device information is indicated by the revocation information corresponding to the content pertaining to the request, and judges affirmatively with respect to the request if the terminal device identified by the terminal device information is not indicated by the revocation information, and the communication unit transmits the notification corresponding to the attribute of the content to the terminal device that has transmitted the request, when the usage permission judgment unit judges negatively with respect to the request.

11. The server of claim 10, further comprising an input reception unit configured to receive inputs of notifications each being set by a different content provider, wherein the notification storage unit stores the notifications received by the input reception unit.

12. A processing method used in a server for communicating with a terminal device in a content management system, the content management system including a recording medium for storing content, the terminal device for using the content and the server for judging whether to permit use of the content, the recording medium outputting, to the terminal device, a request and information necessary for the judgment of whether to permit use of the content, the processing method comprising:

a notification information storage step of storing notifications to be presented to a user of the terminal device;

a usage permission judgment step of receiving, from the terminal device, a request for permission to use the content, and judging whether to permit use of the content based on the request; and a communication step of transmitting, to the terminal device, information necessary for use of the content when the usage permission judgment unit judges affirmatively, and transmitting, to the terminal device, a corresponding one of the notifications when the usage permission judgment unit judges negatively, wherein the notifications correspond to attributes of contents, the communication step further receives the request for permission to use the content, and, as the information necessary for the judgment, information that includes the attribute of the content, and transmit the notification corresponding to the attribute of the content when the usage permission judgment step judges negatively, the server further performs a revocation information storage step of storing, for each content, revocation information indicating the attribute of the content and one or more revoked terminal devices not permitted to use the content, the information necessary for the judgment of whether to permit use of the content includes the attribute of the content corresponding to the request, and terminal device information for identifying a terminal device, the usage permission judgment step judges negatively with respect to the request, if the terminal device identified by the terminal device information is indicated by the revocation information corresponding to the content pertaining to the request, and judges affirmatively with respect to the request if the terminal device identified by the terminal device information is not indicated by the revocation information, and the communication step transmits the notification corresponding to the attribute of the content to the terminal device that has transmitted the request, when the usage permission judgment step judges negatively with respect to the request.

13. The processing method of claim 12, further comprising:
a revocation information storage step of storing revocation information indicating, for each of contents, an attribute of the content and one or more revoked terminal devices not permitted to use the content in correspondence with each other; and
a reception step of receiving, from the terminal device, the request for permission to use the content, and information necessary for the judgment of whether to permit use of the content, the information including the attribute of the content and terminal device information for identifying a terminal device, wherein
the usage permission judgment step judges negatively with respect to the request, if the terminal device identified by the terminal device information is indicated by the revocation information corresponding to the content pertaining to the request, and judges affirmatively with respect to the request if the terminal device identified by the terminal device information is not indicated by the revocation information, and
the communication step transmits the notification corresponding to the attribute of the content to the terminal device that has transmitted the request, when the usage permission judgment step judges negatively with respect to the request.

14. The processing method of claim 13, further comprising
a user device management information storage step of storing user device management information indicating, for each of users, one or more terminal devices used by the user, wherein
the reception step further receives information for identifying a user from the terminal device that has transmitted the request, and
the usage permission judgment step further refers to the user device management information, verifies whether any of terminal devices of the user identified by the user information is indicated by the revocation information corresponding to the content pertaining to the request, and judges negatively with respect to the request when at least one of the terminal devices is indicated by the revocation information.

15. The processing method of claim 14, wherein
when the following conditions are satisfied: the terminal device identified by the terminal device information is not indicated by the revocation information corresponding to the content pertaining to the request; and a recording medium is unconnectable to a terminal device other than the terminal device, then even if any of the terminal devices that belong to the user identified by the user information and that are indicated by the user device management information is indicated by the revocation information, the usage permission judgment step judges affirmatively as an exception with respect to the request.

16. The processing method of claim 12, further comprising:
a user device management information storage step of storing user device management information indicating, for each of users, one or more terminal devices used by the user; and
a reception step of receiving, from the terminal device that has transmitted the request, terminal device information for identifying a terminal device, and user information for identifying a user, wherein
the usage permission judgment step verifies whether the terminal device identified by the terminal device information is indicated, by the user device management information, as a terminal device of the user identified by the user information, and judges negatively with respect to the request when the terminal device is not indicated by the user device management information.

* * * * *